(12) United States Patent
Fink et al.

(10) Patent No.: US 12,141,680 B2
(45) Date of Patent: Nov. 12, 2024

(54) FIBER AND FABRIC COMPUTERS

(71) Applicant: Massachusetts Institute of Technology, Cambridge, MA (US)

(72) Inventors: Yoel Fink, Brookline, MA (US); Gabriel Zi Jie Loke, Cambridge, MA (US); Tural Khudiyev, Revere, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 960 days.

(21) Appl. No.: 17/086,154

(22) Filed: Oct. 30, 2020

(65) Prior Publication Data

US 2021/0201121 A1 Jul. 1, 2021

Related U.S. Application Data

(60) Provisional application No. 62/955,333, filed on Dec. 30, 2019.

(51) Int. Cl.
*G06N 3/063* (2023.01)
*D01F 1/10* (2006.01)
(Continued)

(52) U.S. Cl.
CPC .............. *G06N 3/063* (2013.01); *D01F 1/10* (2013.01); *D03D 1/0088* (2013.01); *G06N 3/08* (2013.01);
(Continued)

(58) Field of Classification Search
CPC ............ G06N 3/063; G06N 3/08; G06N 3/02; G06N 3/045; D03D 1/0088;
(Continued)

(56) References Cited

U.S. PATENT DOCUMENTS

| 4,234,907 A | 11/1980 | Daniel |
| 4,515,432 A | 5/1985 | Sherwin |

(Continued)

FOREIGN PATENT DOCUMENTS

| CN | 104233579 A | 12/2014 |
| JP | 4922482 B2 | 4/2012 |

(Continued)

OTHER PUBLICATIONS

Bae et al., "Fiber Supercapacitors Made of Nanowire-Fiber Hybrid Structures for Wearable/Flexible Energy Storage," Angew. Chem. Int. Ed., vol. 50, pp. 1683-1687, Jan. 2011.

(Continued)

*Primary Examiner* — Jennifer A Steele
(74) *Attorney, Agent, or Firm* — Theresa A. Lober

(57) ABSTRACT

A fiber computer has a fiber body including electrically insulating fiber body material along the length of the fiber body. Electrical conductors are disposed within the fiber body and are operative to transmit electrical power, electrical ground, clock signals, and data signals through the fiber body. Input units disposed within the fiber body accept external stimuli. Microcontroller microchips disposed within the fiber body process stimuli accepted by an input unit. Memory module microchips within the fiber body store data and communicate with microcontroller microchips. Output units produce an output directed out of the fiber body. A clock signal generator within the fiber body synchronizes operation of input units, microcontroller microchips, memory module microchips, and output units. Each of the computer input units, microcontroller microchips, memory module microchips, and computer output units are disposed in electrical connection with the plurality of electrical conductors for fiber computer operation within the fiber body.

38 Claims, 26 Drawing Sheets

(51) Int. Cl.
  *D03D 1/00* (2006.01)
  *G06N 3/02* (2006.01)
  *G06N 3/08* (2023.01)
  *H01B 1/02* (2006.01)
  *H01B 3/30* (2006.01)
  *H04R 1/02* (2006.01)
  *H04R 1/08* (2006.01)

(52) U.S. Cl.
  CPC .............. *H01B 1/02* (2013.01); *H01B 3/30* (2013.01); *H04R 1/028* (2013.01); *H04R 1/08* (2013.01); *D10B 2401/18* (2013.01); *D10B 2403/02431* (2013.01); *G06N 3/02* (2013.01)

(58) Field of Classification Search
  CPC ...... D10B 2403/02431; D01B 2401/18; H01B 1/02; H01B 3/30; Y10T 428/29; H04R 1/028; H04R 1/08; H04R 1/04; H04R 2201/023
  See application file for complete search history.

(56) References Cited

U.S. PATENT DOCUMENTS

| | | |
|---|---|---|
| 4,726,651 A | 2/1988 | Wei et al. |
| 4,742,318 A | 5/1988 | Jen et al. |
| 5,135,295 A | 8/1992 | Jen et al. |
| 5,546,413 A | 8/1996 | Lebby et al. |
| 5,906,004 A | 5/1999 | Lebby et al. |
| 6,228,228 B1 | 5/2001 | Singh et al. |
| 6,337,835 B1 | 1/2002 | Sporn et al. |
| 6,385,377 B1 | 5/2002 | Brueck et al. |
| 6,560,398 B1 | 5/2003 | Roach et al. |
| 6,619,835 B2 | 9/2003 | Kita |
| 6,620,287 B2 | 9/2003 | Cass |
| 6,801,698 B2 | 10/2004 | King et al. |
| 7,047,800 B2 | 5/2006 | Thiesen et al. |
| 7,292,758 B2 | 11/2007 | Bayindir et al. |
| 7,295,734 B2 | 11/2007 | Bayindir et al. |
| 7,567,740 B2 | 7/2009 | Bayindir et al. |
| 7,629,727 B2 | 12/2009 | Whinnery |
| 7,805,029 B2 | 9/2010 | Bayindir et al. |
| 7,834,527 B2 | 11/2010 | Alvarez Icaza Rivera et al. |
| 7,845,023 B2 * | 12/2010 | Swatee ............... H01L 29/0657 2/243.1 |
| 8,098,966 B2 | 1/2012 | Bayindir et al. |
| 8,406,889 B2 | 3/2013 | Llinas et al. |
| 8,541,940 B2 | 9/2013 | Moran-Mirabal et al. |
| 8,863,556 B2 | 10/2014 | Bayindir et al. |
| 8,946,974 B2 | 2/2015 | Yu et al. |
| 9,263,614 B2 | 2/2016 | Deng et al. |
| 9,365,013 B2 | 6/2016 | Fink et al. |
| 9,373,807 B2 | 6/2016 | Pan et al. |
| 9,512,036 B2 | 12/2016 | Abouraddy et al. |
| 9,583,190 B2 | 2/2017 | Miller |
| 10,081,887 B2 | 9/2018 | Manipatruni et al. |
| 10,112,321 B2 | 10/2018 | Gumennik et al. |
| 10,338,000 B2 | 7/2019 | Gumennik et al. |
| 10,406,723 B2 | 9/2019 | Fink et al. |
| 10,509,186 B2 | 12/2019 | Fink et al. |
| 10,756,251 B2 | 8/2020 | Kim et al. |
| 10,978,217 B2 | 4/2021 | Fink et al. |
| 11,260,586 B2 | 3/2022 | Fink et al. |
| 11,269,149 B2 | 3/2022 | Fink |
| 11,355,774 B2 | 6/2022 | Lee et al. |
| 2002/0182397 A1 | 12/2002 | Whatley |
| 2003/0075210 A1 | 4/2003 | Stollwerck et al. |
| 2003/0141785 A1 | 7/2003 | Sato et al. |
| 2004/0009729 A1 | 1/2004 | Hill et al. |
| 2005/0018975 A1 | 1/2005 | Ho et al. |
| 2005/0053345 A1 | 3/2005 | Bayindir et al. |
| 2005/0227059 A1 | 10/2005 | Granstrom et al. |
| 2007/0019917 A1 | 1/2007 | Bayindir et al. |
| 2007/0053637 A1 | 3/2007 | Golwalkar et al. |
| 2008/0087047 A1 | 4/2008 | Bayindir et al. |
| 2008/0227349 A1 | 9/2008 | Eyck et al. |
| 2009/0085444 A1 | 4/2009 | Rivera et al. |
| 2009/0097805 A1 | 4/2009 | Bayindir et al. |
| 2009/0169158 A1 | 7/2009 | Bayindir et al. |
| 2010/0316088 A1 | 12/2010 | Bayindir et al. |
| 2014/0025007 A1 | 1/2014 | Fink et al. |
| 2014/0180624 A1 | 6/2014 | Nikonov et al. |
| 2014/0212084 A1 | 7/2014 | Gumennik et al. |
| 2015/0044463 A1 | 2/2015 | Fink et al. |
| 2015/0051470 A1 | 2/2015 | Bailey et al. |
| 2015/0276506 A1 | 10/2015 | Djeu |
| 2015/0357078 A1 | 12/2015 | Lessing et al. |
| 2015/0360080 A1 | 12/2015 | Hadaschik |
| 2016/0028102 A1 | 1/2016 | Bae et al. |
| 2016/0155534 A1 | 6/2016 | Fink et al. |
| 2016/0233399 A1 | 8/2016 | Maki |
| 2016/0266341 A1 | 9/2016 | Park |
| 2017/0005504 A1 | 1/2017 | Rho et al. |
| 2017/0029985 A1 | 2/2017 | Tajitsu et al. |
| 2018/0017248 A1 | 1/2018 | Athauda et al. |
| 2018/0023801 A1 | 1/2018 | Athauda et al. |
| 2018/0039036 A1* | 2/2018 | Fink ..................... F21S 4/15 |
| 2018/0141274 A1 | 5/2018 | Fink et al. |
| 2019/0003905 A1 | 1/2019 | Yoshida et al. |
| 2019/0047240 A1 | 2/2019 | Sorin et al. |
| 2019/0136413 A1 | 5/2019 | Fink et al. |
| 2019/0267538 A1 | 8/2019 | Yoshida et al. |
| 2019/0273199 A1 | 9/2019 | Tajitsu et al. |
| 2020/0028198 A1 | 1/2020 | Lee |
| 2023/0304197 A1 | 9/2023 | Fink et al. |

FOREIGN PATENT DOCUMENTS

| | | |
|---|---|---|
| WO | 2007143237 A2 | 12/2007 |
| WO | 2022055610 A1 | 3/2022 |

OTHER PUBLICATIONS

Chen, "Novel Electric Double-Layer Capacitor with a Coaxial Fiber Structure," Adv. Mater. vol. 25, pp. 6436-6441, Aug. 2013.
Chen, "Electrochromic Fiber-Shaped Supercapacitors" Adv. Mater. vol. 26, pp. 8126-8132, Oct. 2014.
Chen et al., "High-Performance, Stretchable, Wire-Shaped Supercapacitors," Angew. Chem. Int. Ed., vol. 54, pp. 618-622, Nov. 2014.
Choi et al., "Flexible Supercapactor Made of Carbon Nanotube Yarn with Internal Pores," Adv., Mater., vol. 26, pp. 2059-2065, Dec. 2013.
Fu et al., "Fiber Supercapacitors Utilizing Pen Ink for Flexible/Wearable Energy Storage," Adv. Mater., vol. 24, pp. 5713-5718, Aug. 2012.
Hu et al., "All-in-one graphene fiber supercapacitor," Nanoscale, vol. 6, pp. 6448-6451, Apr. 2014.
Kou et al., "Coaxial wet-spun yarn supercapacitors for high-energy density and safe wearable electronics," Nature Communications, V. 5, pp. 3754(1-10), May 2014.
Kwon et al., "Cable-Type Flexible Lithium Ion Battery Based on Hollow Multi-Helix Electrodes," Avd. Mater., vol. 24, pp. 5192-5197, Aug. 2012.
Le et al., "Coaxial Fiber Supercapacitor Using All-Carbon Material Electrodes," ACSNano, vol. 7, No. 7, pp. 5940-5947, Jun. 2013.
Lee et al., "Ultrafast charge and discharge biscrolled yarn supercapacitors for textiles and microdevices," Nature Communications, vol. 4, pp. 1970(1-8), Jun. 2013.
Liang et al., "Series of in-fibergraphene supercapacitors for flexible wearable devices," J. Mater. Chem. A., vol. 3, pp. 2547-2551, Dec. 2014.
Lima et al., "Biscrolling Nanotube Sheets and Functional Guests into Yarns," Science, vol. 33, pp. 51-55, Jan. 2011.
Lin et al., "Twisted Aligned Carbon Nanotube/Silicon Composite Fiber Anode for Flexible Wire-Shaped Lithium-Ion Battery," Adv. Mater., vol. 26, pp. 1217-1222, Nov. 2013.
Liu et al., "Cable-Type Supercapacitors of Three-Dimensional Cotton Thread Based Multi-Grade Nanostructures for Wearable Energy Storage," Adv. Mater., vol. 25, pp. 4925-4931, Jul. 2013.

(56) References Cited

OTHER PUBLICATIONS

Neudecker et al., "Power fibers: Thin-Film Batteries on Fiber Substrates," Unclassified OMB Report, Report Documentation page and Report pp. 1-9, ITN Energy Systems, Inc., Littleton, CO, 2003.

Ren et al., "Twisting Carbon Nanotube Fibers for Both Wire-Shaped Micro-Supercapacitor and Micro-Battery," Adv. Mater., vol. 25, pp. 1155-1159, Nov. 2012.

Ren et al., "Elastic and Wearable Wire-Shaped Lithium-Ion Battery with High Electrochemical Performance," Angew. Chem. Int., Ed., vol. 53, pp. 7864-7869, Jun. 2014.

Wang et al., "Fiber-Based Flexible All-Solid-State Asymmetric Supercapacitors for Integrated Photodetecting System," Angew. Chem. Int. Ed., vol. 53, pp. 1849-1853, Jan. 2014.

Weng et al., "Winding Aligned Carbon Nanotube Composite Yarns into Coaxial Fiber Full Batteries with High Performances," Nano Lett., vol. 14, pp. 3432-3438, May 2014.

Xiao et al., "Fiber-Based All-Solid-State Flexible Supercapacitors for Self-Powered Systems," ACSNano, vol. 6, No. 10, pp. 9200-9206, Sep. 2012.

Xu et al., "Carbon Nanotube Fiber Based Stretchable Wire-Shaped Supercapacitors," Adv. Energy Mater., vol. 4, pp. 1300759(1-6), Oct. 2013.

Yang et al., "A Highly Stretchable, Fiber-Shaped Supercapacitor," Angew. Chem. Int. Ed., vol. 52, pp. 13453-13457, Nov. 2013.

Yu et al., "Scalable synthesis of hierarchically structured carbon nanotube-graphene fibres for capacitive energy storage," Nature Nanotechnology, vol. 9, pp. 555-562, Corrigendum one p. Supplementary Information pp. S1-S32, Jul. 2014.

Zhang et al., "Integrated Polymer Solar Cell and Electrochemical Supercapacitor in a Flexible and Stable Fiber Format," Adv. Mater., vol. 26, pp. 466-470, Oct. 2013.

Zhang et al., "Superelastic Supercapacitors with High Performances during Stretching," Adv. Mater., vol. 27, pp. 356-362, Nov. 2014.

Zhang et al. "Flexible and Stretchable Lithium-Ion Batteries and Supercapacitors Based on Electrically Conducting Carbon Nanotube Fiber Springs," Angew. Chem. Int. Ed., vol. 53, pp. 14564-14568, Oct. 2014.

Zhang et al., "Super-stretchy lithium-ion battery based on carbon nanotube fiber," J. Mater. Chem. A., vol. 2, pp. 11054-11059, May 2014.

Lestoquoy et al., "Fabrication and characterization of thermally drawn fiber capacitors," Appl. Phys. Letts., No. 102, pp. 152908-1-152908-5, Apr. 2013.

Qu et al., "Flexible fiber batteries for applications in smart textiles," 2012 MRS Fall Meeting, Invited Talk A4.01, Symposium A: Compliant Energy Sources, Manuscript ID: 1445687, pp. 1-8, Boston, MA, Oct. 2012.

Grena, "Towards a Lithium-ion Fiber Battery," Masters of Science in Materials Science and Engineering, Thesis, Massachusetts Institute of Technology, pp. 1-47, Jul. 2013.

Liu et al., "Flexible, Solid Electrolyte-Based Lithium Battery Composed of LifePO4 Cathode and Li4Ti5O10 Anode for Applications in Smart Textiles," Jnl. Of the Electrochmical Society, N. 159, pp. A349-A356, Jan. 2012.

Grena et al., "Porous polymeric domains in thermally drawn fibers," 2014 MRS Spring Meeting, Session R9, Poster Session III: Energy Conversion and Storage, Poster R9.15, San Francisco, CA, Apr. 2014.

Wypych, "Handbook of Flllers," 3rd Edition, Section 5.4: "Particle Shape," ChemTec Publishing, pp. 232-233, Available online at: https://app.knowvel.com/hotlink/pdf/id:kt00C18G4/handbook-fillers-3rd/particle-shape, 2010.

Hamilton, "Geochemical Remote Sensing of the Sub-Surface-3.3 Voltaic Cells." Elsevier, 86-91, Online version available at: https://app.knovel.com/hotlink/pdf/id:kt004OUTU2/geochemical-remote-sensing/voltaic-cells, 2000.

Nayeem et al., "All-nanofiber-based, ultrasensitive, gas-permeable mechanoacoustic sensors for continuous long-term heart monitoring," PNAS pp. 1-8, www.pnas.org/cig/doi/10.1073/pnas.1920911117, Mar. 2020.

Schut, "New Cyclic Olefins," Plastics Technology, Mar. 2000, Online version available at: https://ptonline.com/articles/new-cyclic-olefins, 2000.

Liu et al., "Wearable energy-dense and power-dense supercapacitor yarns enabled by scalable graphene-metallic textile composite electrodes," nature communications, :6:7260 pp. 1-9, DOI: 10.1038/ncomms8260, 2015.

Lin et al., "Dopant Induced Hollow BaTiO3 Nanostructures for Application in High Performance Capacitors," Journal of Materials Chemistry, Vo. 21, No. 41, pp. 16500-16504, 2011.

Vali et al., "Vinylene Carbonate as Co-Solvent for Low-Temperature Mixed Electrolyte Based Supercapacitors," Jnl. of the Electrochemical Society, vol. 163, No. 6, pp. A851-A857, Mar. 2016.

Qu et al., "Flexible fiber batteries for applications in smart textiles," Smart Mater. Struct., vol. 24, pp. 025012:1-13, Dec. 2014.

Ma et al., "Highly Oriented Electrospun P(VDF-TrFE) Fibers via Mechanical Stretching for Wearable Motion Sensing," Adv. Mater. Technol. vol. 3, pp. 1800033:1-7, DOI: 10.1002/admt.201800033.

Qu et al., "Superelastic Multimaterial Electronic and Photonic Fibers and Devices via Thermal Drawing," Adv. Mater., vol. 30, pp. 1707251:1-8, May 2018.

Shi et al., "Smart Textile-Integrated Microelectronic Systems for Wearable Applications," Adv. Mater., vol. 32, pp. 1901958: 1-37, Jul. 2019.

Lang et al., "High-sensitivity acoustic sensors from nanofibre webs," Nature Comms., pp. 1-7, DOI: 10.1038/ ncomms11108, Mar. 2016.

Lee et al., "An ultrathin conformable vibration-responsive electronic skin for quantitative vocal recognition," Nature Comms., pp. 1-11, DOI: 10.1038/s41467-019-10465-w, 2019.

Li et al., "Nanogenerator-based dual-functional and self-powered thin patch loudspeaker or microphone for flexible electronics," Nature Comms. pp. 1-9, DOI: 10.1038/ncomms15310, May 2017.

Lu, et al., "Piezoelectric Microstructured Fibers via Drawing of Multimaterial Preforms," Scientific Reports, vol. 7:2907, pp. 1-12, DOI: 10.1038/s41598-017-01738-9, Jun. 2017.

PCT/US2020/058412, International Search Report, Form PCT/ISA/210 First Sheet, Second Sheet, Continuation of Second Sheet, Feb. 2021.

PCT/US2020/058412, Written Opinion of the International Searching Authority, Form PCT/ISA/237 Cover Sheet, Box No. 1 Sheet, Box No. V Sheet, Box No. VIII Sheet, Supplemental Box—8 sheets, Feb. 2021.

Rein et al., "Self-assembled fibre optoelectronics with discrete translational symmetry," Nature Communications, vol. 7, No. 12807, pp. 1-8, "Methods" 12 pages, Oct. 2016.

Rein et al., "Diode fibres for fabric-based optical communications," Nature, vol. 560, pp. 214-218, Aug. 2018.

Guo et al., "Polymer Composite with Carbon Nanofibers Aligned during Thermal Drawing as a Microelectrode for Chronic Neural Interfaces," ACS Nano, vol. 11, pp. 66574-6585, Jun. 2017.

Loke et al., "Computing Fabrics," Matter, vol. 2, No. 4, pp. 786-788, Apr. 2020.

Park et al., "Flexible fiber-based optoelectronics for neural interfaces," Chem. Soc. Rev., vol. 48, pp. 1826-1852, Feb. 2019.

Lin et al., "A wearable sensor module with a neural network-based activity classification algorithm for daily energy expenditure estimation," IEEE Transactions on Information Technology in Biomedicine, vol. 16, No. 5, pp. 991-998, Sep. 2012.

Yan et al., "Thermally drawn advanced functional fibers: New frontier of flexible electronics," Materials Today, vol. 35, pp. 168-194, May 2020.

Ghebrebrhan et al., "Fabrication and measurement of 3D printed retroreflective fibers," Optical Materials Express, vol. 9, No. 8, pp. 3432-3438, Jul. 2019.

Loke et al., "Recent Progress and Perspectives of Thermally Drawn Multimaterial Fiber Electronics," Advanced Materials, vol. 32, No. 1, pp. 1904911 1-30, Oct. 2019.

Clemens et al., "Computing Fibers: A Novel Fiber for Intelligent Fabrics?," Advanced Engineering Materials, vol. 5, No. 9, pp. 682-687, Sep. 2003.

(56) References Cited

OTHER PUBLICATIONS

Qiu et al., "A Curriculum for Teaching Computer Science Through Computational Textiles," ACM International Conference Proceeding Series, pp. 20-27, Jun. 2013.

Buechley et al., "The LilyPad Arduino: Toward Wearable Engineering for Everyone," IEEE Pervasive Computing, vol. 7, No. 2, pp. 12-15, Apr./Jun. 2008.

Buechley et al., "The LilyPad Arduino: Using Computational Textiles to Investigate Engagement, Aesthetics, and Diversity in Computer Science Education," Proceedings of the 2008 SIGCHI Conference on Human Factors in Computing Systems, pp. 423-432, 2008.

Ngai et al., "The TeeBoard: an Education-Friendly Construction Platform for E-Textiles and Wearable Computing," Proceedings of the 2009 SIGCHI Conference on Human Factors in Computing Systems, pp. 249-258, Apr. 2009.

Gould et al., "Textiles gain intelligence," Materials Today, vol. 6, No. 10, pp. 38-43, Oct. 2003.

Graumann et al., "Large Surface Area Electronic Textiles for Ubiquitous Computing: A System Approach," 2007 Fourth Annual International Conference on Mobile and Ubiquitous Systems: Networking & Services, pp. 1-8, Aug. 2007.

Sorin et al., "Multimaterial multifunctional fiber devices," Paper No. 5.1.6, 35th European Conference on Optical Communication, Vienna, Austria, pp. 1-4, Sep. 2009.

Shi et al., "Smart Textile-Integrated Microelectronic Systems for Wearable Applications," Adv. Mater., No. 32, pp. 1901958 1-37, Jul. 2019.

Yan et al., "Advanced Multimaterial Electronic and Optoelectronic Fibers and Textiles," Adv. Mater., No. 31, pp. 1802348 1-28, Sep. 2018.

European Patent Application No. 20908724.6-1017/4085163, Supplemental European Search Report, sheet 1, Annex to the European Search Report, Sheet 1, European Search Opinion, Sheets 1-6, Mar. 2024.

European Patent Application No. 20908724.6-1017/4085163, Correspondence to European Patent Office, letter pp. 1-2, Listing of Amended Claims (clean copy) pp. 1-5, Listing of Amended Claims (marked-up copy) pp. 1-10, Acknowledgement Receipt, one page, Jan. 2023.

Bayindir et al., "Integrated fibres for self-monitored optical transport," Nature Materials vol. 4, pp. 820-825, Nov. 2005.

Carpi et al., "Electroactive Polymer-Based Devices for e-Textiles in Biomedicine," IEEE Trans. Inf. Tech in Biomedicine, vol. 9, No. 3, pp. 295-318, Sep. 2005.

Clemens et al., "Computing Fibers: A Novel Fiber for Intelligent Fabrics?," Adv. Eng. Mats. vol. 5, No. 9, p. 682, 2003.

Chocat, "Multimaterial Acoustic Fibers," Ph.D. Thesis, p. 1-150, Massachusetts Institute of Technology, May 2013.

Loke et al., "Structured multimaterial filaments for 3D printing of optoelectronics," Nature Communications, https://doi.org/10.1038/s41467-019-11986-0, 10:4010, Sep. 2019.

Bayindir et al., "Metal-insulator-semiconductor optoelectronic fibres," Nature vol. 431, pp. 826-829, Oct. 2004.

PCT/US2021/41080, PCT Written Opinion of the International Searching Authority, Form PCT/ISA/237 cover sheet, Box No. 1 sheet, Box No. V sheet, Box No. VII sheet, and Supplemental Box sheet, Oct. 2021.

PCT/US2021/41080, PCT International Search Report, Form PCT/ISA/210 first sheet and second sheet, Oct. 2021.

Abouraddy et al., "Towards multimaterial multifunctional fibres that see, hear, sense and communicate," Nature Materials, vol. 6, p. 344, May 2007.

Abouraddy et al., "Large-scale optical-field measurements with geometric fibre constructs," Nature Materials, vol. 5, pp. 532-536, 2006.

Liu et al., Cable-Type Supercapacitors of Three-Dimensional Cotton Thread Based Multi-Grade Nanostructures for Wearable Energy Storage, Advanced Materials, 25, pp. 4925-4931, 2013.

Choi et al., "Stretchable, Weavable Coiled Carbon Nanotube/$MnO_2$/Polymer Fiber Solid-State Supercapacitors," Scientific Reports, vol. 5, No. 9387, pp. 1-6, Mar. 2015.

Grena et al., "Thermally-drawn fibers with spatially-selective porous domains," Nature Communications, vol. 8, No. 364, pp. 1-8, Aug. 2017.

Wang et al., "3D-Printed All-Fiber Li-Ion Battery toward Wearable Energy Storage," Advanced Functional Materials, vol. 27, pp. 1703140 1-8, Sep. 2017.

Choi et al., "Improvement of system capacitance via weavable superelastic biscrolled yarn supercapacitors," Nature Communications, vol. 7, No. 13811, pp. 1-8, Dec. 2016.

Shen et al., "Wearable woven supercapacitor fabrics with high energy density and load-bearing capability," Scientific Reports, vol. 7, No. 14324, pp. 1-8, Oct. 2017.

\* cited by examiner

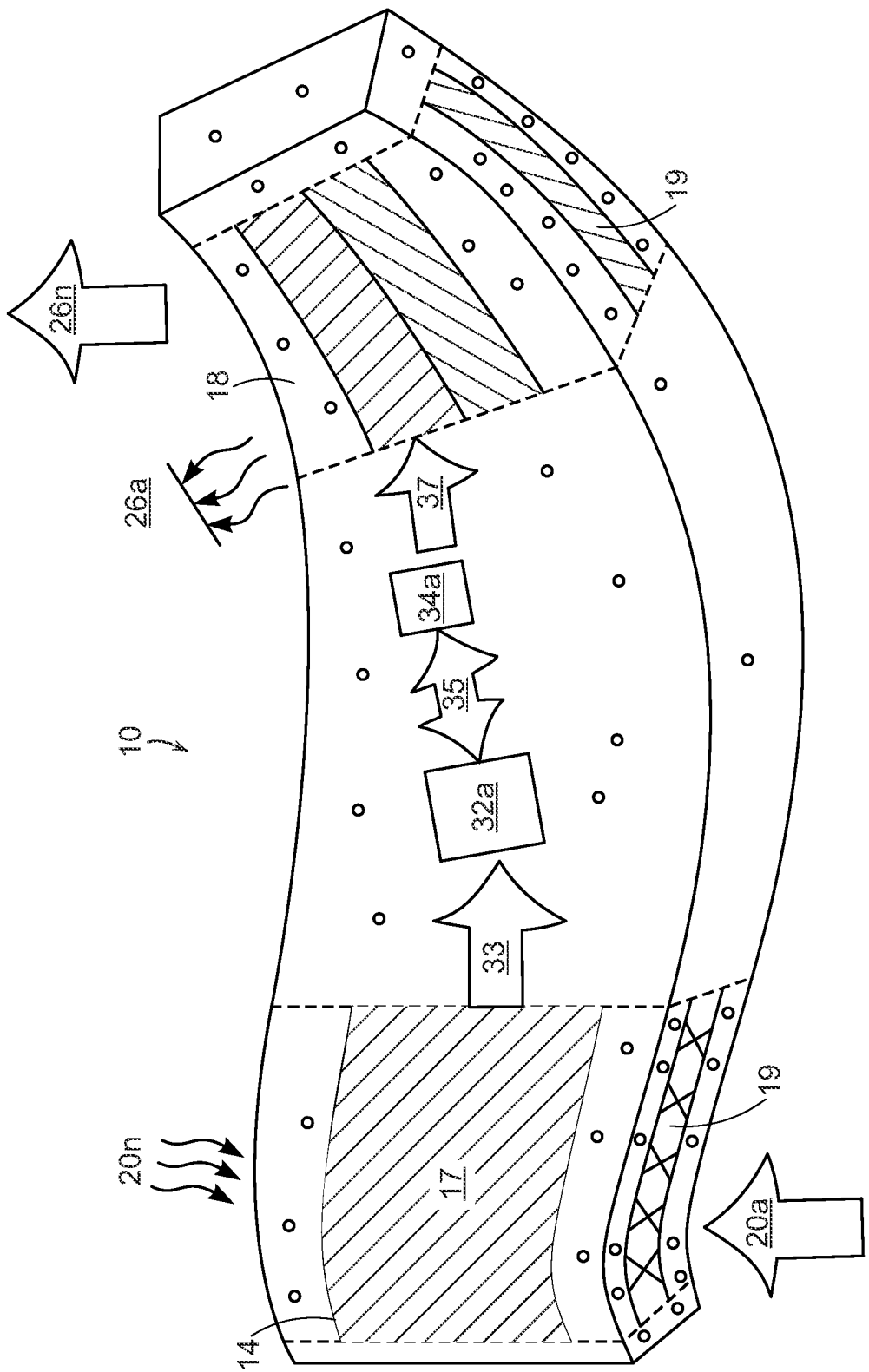

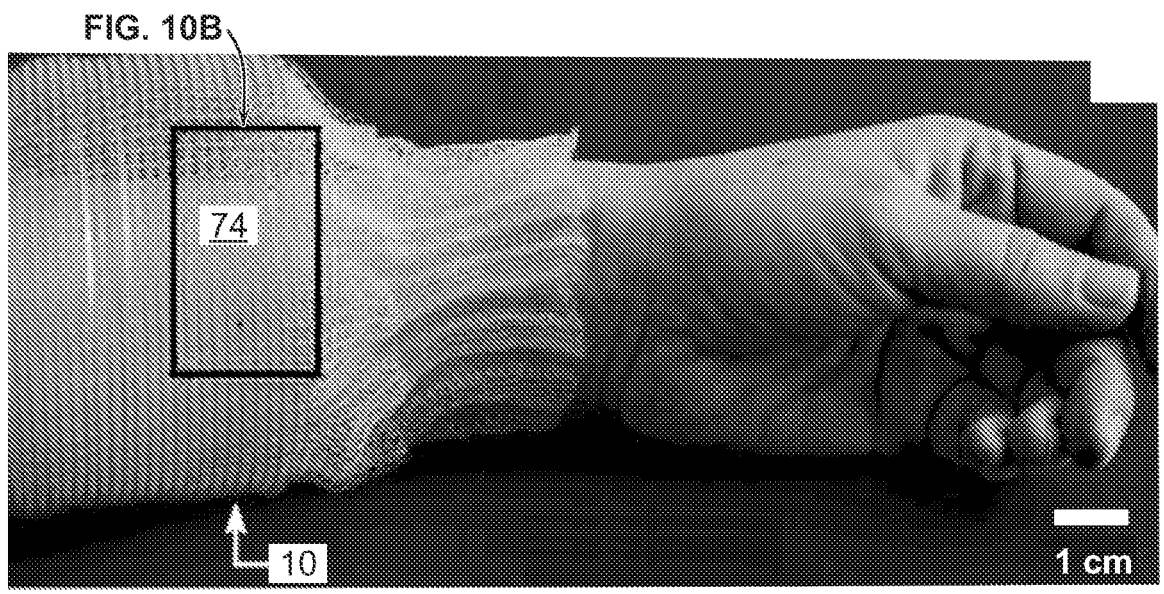
FIG. 10A
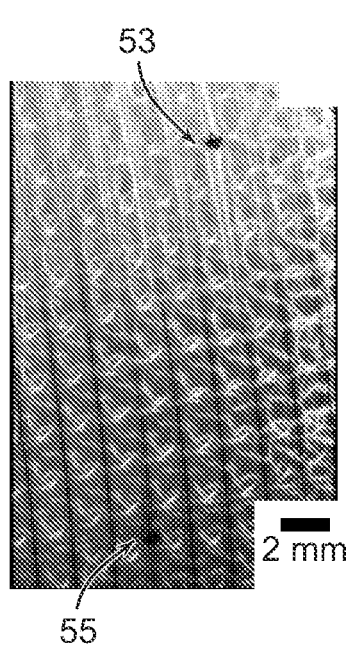 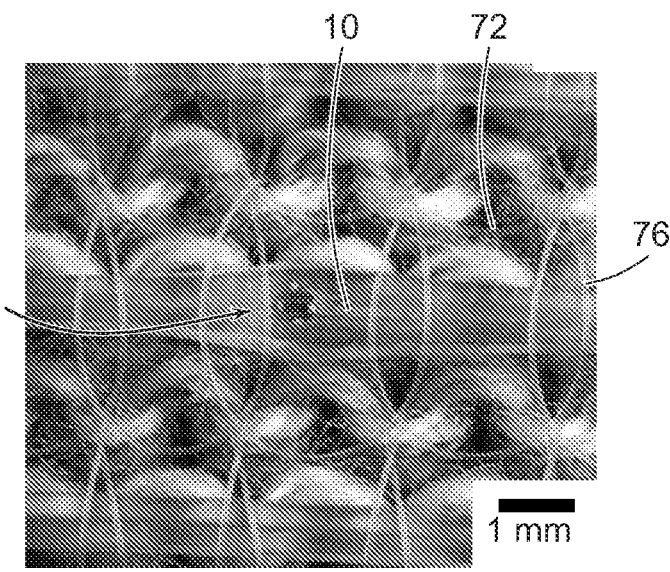
FIG. 10B  FIG. 10C

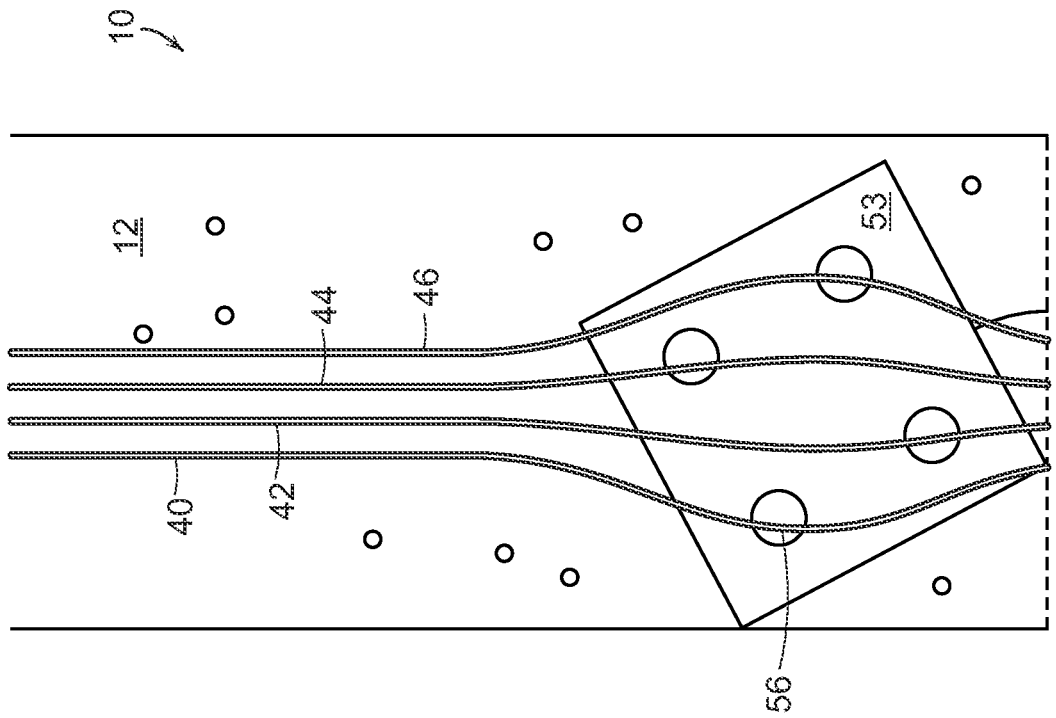
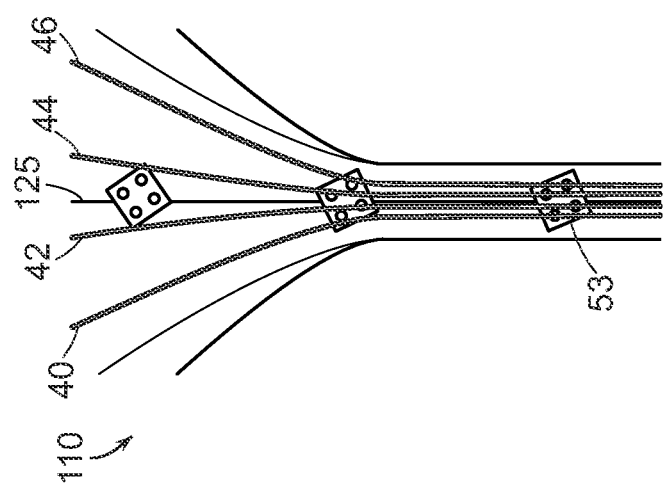

Critical Angle

$L = 0.4\cos(90° - \theta) = 0.5657 \cos(45° + \theta)$
$\theta = 26.56$

Minimum Angle

$\sin(\theta) = 0.163/0.4$
$\theta_{min} = 24.05$

Maximum Angle

$\cos(45° + \theta) = 0.0815/0.2828$
$\theta_{max} = 28.24$

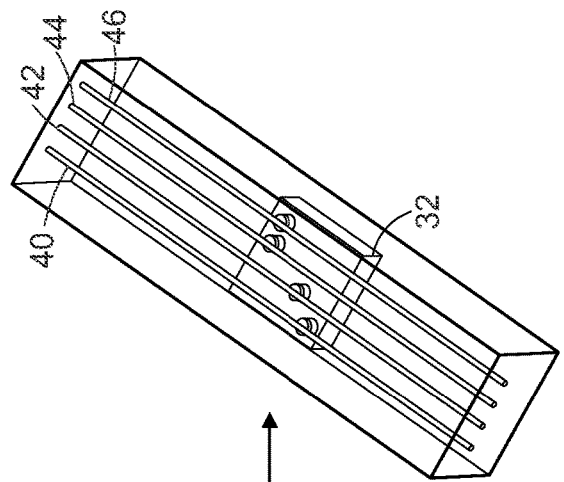
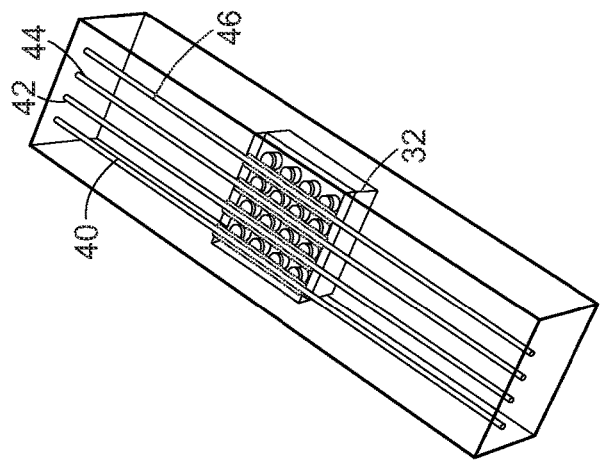
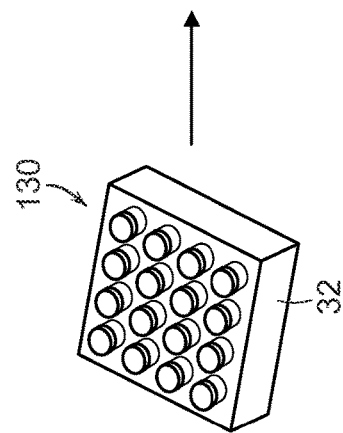
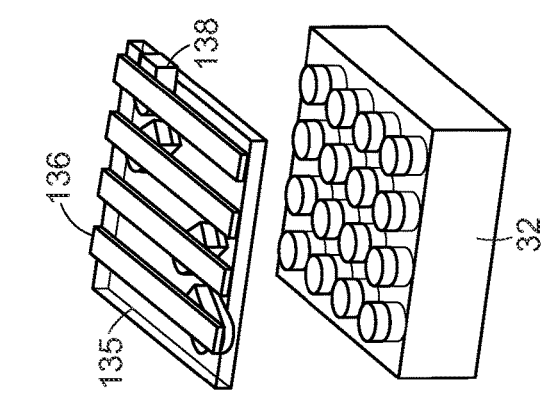
FIG. 20A
FIG. 20B

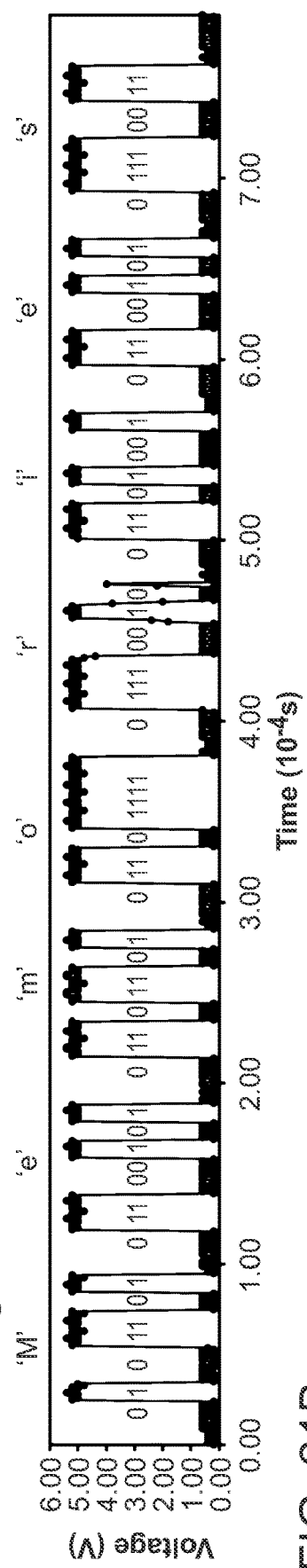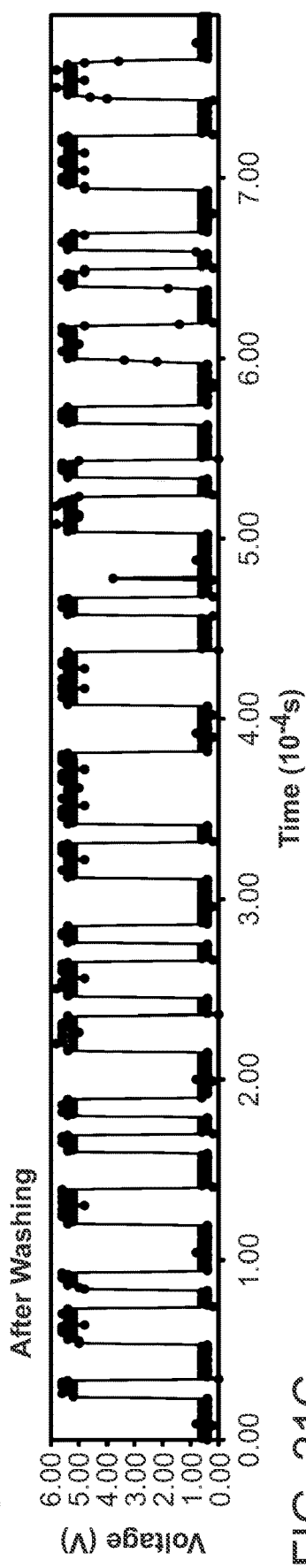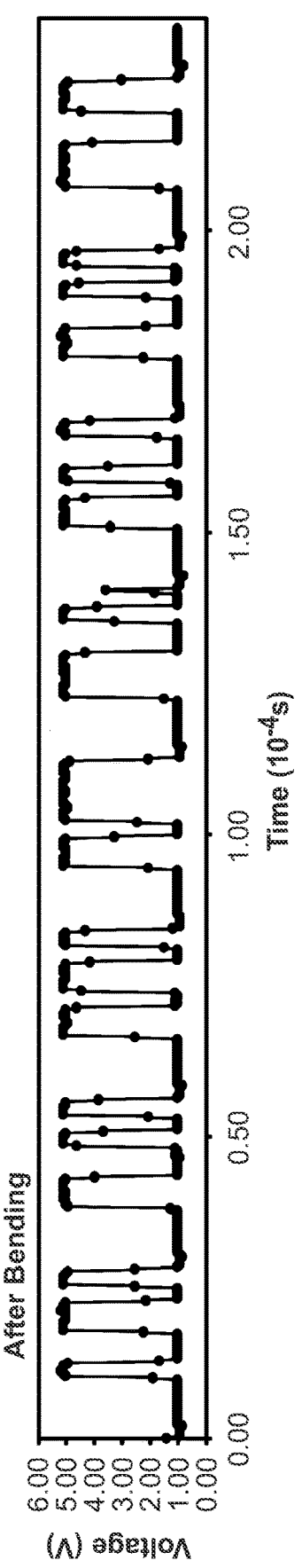
FIG. 21A Original Filter
FIG. 21B After Washing
FIG. 21C After Bending

FIBER AND FABRIC COMPUTERS

CROSS-REFERENCE TO RELATED APPLICATION

This application claims the benefit of U.S. Provisional Patent Application No. 62/955,333, filed Dec. 30, 2019, the entirety of which is hereby incorporated by reference.

STATEMENT REGARDING FEDERALLY SPONSORED RESEARCH

This invention was made with Government support under Contract No. DMR-1419807, awarded by the National Science Foundation, and under Contract No. W911NF-18-2-0048, awarded by the United States Army Research Office. The Government has certain rights in the invention.

BACKGROUND

This invention relates generally to fibers, and more particularly relates to fiber-based and fabric-based microelectronic systems.

There is a growing interest in the collection and processing of data from devices on or in the vicinity of the human body. Prime examples of this trend are smart phones and watches that incorporate sensing and memory functionality to collect and store information about the human body for health and activity monitoring. In an extension of this paradigm, the field of wearable electronics has amply demonstrated the desirability of such human-interfaced digital systems, for physiological monitoring, medical intervention, human-machine interaction, robotic assistance, communication, and even fashion.

Working toward the production of so-called 'wearable electronics,' there has been demonstrated the use of fabric fibers with sophisticated functions, such as sensing, optical communication, and the supply of power. But complex electronic system embodiment in fiber and fabric form has been unattainable due to lack of suitable materials and fabrication approaches that could incorporate both analog and digital processing capability in a fiber or fabric without interfering with the fabric qualities such as comfort and aesthetics, which are the basis of the garment industry.

SUMMARY

Herein is provided a fiber computer that includes the necessary materials and components for analog and digital processing of external inputs. In one embodiment, there is provided a fiber computer having a fiber body including at least one electrically insulating fiber body material and having a longitudinal axis along a fiber body length. A plurality of electrical conductors is disposed within the fiber body material along at least a portion of the fiber body length. The electrical conductors are operative to transmit electrical power, electrical ground, clock signals, and data signals through the fiber body. At least one fiber computer input unit is disposed within the fiber body and arranged to accept stimuli external to the fiber body. At least one microcontroller microchip is disposed within the fiber body and operatively connected to process stimuli accepted by a fiber computer input unit. At least one memory module microchip is disposed within the fiber body and operatively connected to store data and communicate with at least one microcontroller microchip. At least one fiber computer output unit is disposed within the fiber body and arranged to produce a fiber computer output directed external to the fiber body. A clock signal generator is disposed within the fiber body to synchronize operation of the fiber computer input units, microcontroller microchips, memory module microchips, and fiber computer output units. Each of the computer input units, microcontroller microchips, memory module microchips, and computer output units are disposed in electrical connection with the plurality of electrical conductors for fiber computer operation within the fiber body.

In a further embodiment, the fiber computer includes a fiber battery domain disposed within the fiber body and operatively connected to deliver electrical power and ground to electrical conductors within the fiber body. In a further embodiment, the computer input units, microcontroller microchips, and memory module microchips, each include combinatorial logic with a unique digital identifier value for individual access.

In a further embodiment there is provided a fiber neural network having a fiber body including at least one electrically insulating fiber body material and having a longitudinal axis along a fiber body length. A plurality of electrical conductors is disposed within the fiber body material along at least a portion of the fiber body length and are operative to transmit electrical power, electrical ground, clock signals, and data signals through the fiber body. At least one neural network input unit is disposed within the fiber body and arranged to accept stimuli external to the fiber body. At least one microcontroller microchip disposed within the fiber body and operatively connected to process stimuli accepted by the at least one fiber computer input unit. At least one memory module microchip is disposed within the fiber body and contains neural network data. At least one neural network computer output unit is disposed within the fiber body and arranged to produce a fiber computer output directed external to the fiber body. Each of the neural network input units, microcontroller microchips, memory module microchips, neural network output unit are in electrical connection with the plurality of electrical conductors for neural network operation within the fiber body.

In a further embodiment there is provided a fabric computer. The fabric computer includes a plurality of fibers, each fiber having a fiber body of at least one electrically insulating polymeric fiber body material and having a longitudinal axis along a fiber body length. At least one fabric computer input unit is disposed within at least one of the fiber bodies and is arranged to accept stimuli external to that one fiber body. At least one microcontroller microchip is disposed within at least one of the fiber bodies and is operatively connected to process stimuli accepted by fabric computer input units. At least one memory module microchip is disposed within at least one fiber body and is operatively connected to store data and communicate with microcontroller microchips. At least one fabric computer output unit is disposed within at least one of the fiber bodies and is arranged to produce a fabric computer output directed out of the fiber body. A clock signal generator is disposed within at least one of the fiber bodies to synchronize operation of fabric computer input units, microcontroller microchips, memory module microchips, and fabric computer output units. Each of the computer input units, microcontroller microchips, memory module microchips, computer output units are disposed in electrical connection for fabric computer operation within the plurality of fibers.

An input to the fiber and fabric computers, such as a stimulus from the fiber and fabric computers' external environment, can be accepted by the fiber and fabric computers, often in analog form, and converted to a digital representation that is internally processed by the fiber fabric computer. In-fiber memory communicates with a microcontroller, and there is produced a fiber and fabric computer output that can be a digital or analog signal, or some other output indication. The fiber and fabric computers thereby conduct digital logic operations on inputs; analog input stimuli are converted into a digital data stream that is processed for an output action or indication.

The substantially one-dimensional form factor of the fiber computer enables ubiquitous integration of the fiber and fabric computers with the environment, bringing digital computer processing to any location. Further features and advantages will be apparent from the following description and accompanying drawings, and from the claims.

BRIEF DESCRIPTION OF THE DRAWINGS

FIG. 4B is a schematic view of a second embodiment of fiber computer components and communication into, out of, and within the fiber computer of FIG. 1;

FIG. 10A is a photograph of a fabric computer arranged as a garment as provided herein;

FIG. 10B is a magnified view of a section of the fabric computer of FIG. 10A;

FIG. 10C is a photograph of a section of a fabric computer provided herein;

FIG. 18A is a magnified schematic view of the thermal draw process of FIG. 17 at the draw site at which in-fiber wire connections are made to in-fiber microchips of the fiber computer provided herein;

FIG. 18B is a longitudinal cross-sectional view a microchip in a fiber computer provided herein with in-fiber electrically conducting lines connected to the microchip bond pads;

FIG. 20A is a schematic view of the steps for removing bond pads from a microcontroller microchip and making connection to in-fiber electrical conductors in the fiber computer provided herein;

FIG. 20B is a schematic view of the steps for adding to a microcontroller microchip an electrical conductor interposer with selectively arranged bond pads for making connection to in-fiber electrical conductors in the fiber computer provided herein;

FIG. 21A is a plot of binary information representing the word 'memories' as-read out of a fiber computer provided herein;

FIG. 21B is a plot of binary information representing the word 'memories' as-read out of a fiber computer provided herein after putting the fiber computer through ten washing cycles;

FIG. 21C is a plot of binary information representing the word 'memories' as-read out of a fiber computer provided herein with the fiber curved in a radius of 12 mm;

DETAILED DESCRIPTION

The fiber-based computer provided herein can be embodied as a single fiber or as a collection of two or more fibers, and the single fiber or fiber collection can be configured in or as a fabric—such as a fabric garment; hence the terms "fiber computer" and "fabric computer." In embodiments described below, all components of the computer can be disposed within a single fiber or alternatively provided together by a collection of fibers. The terms "fiber computer" and "fabric computer" are therefore used herein to refer to a single-fiber computer system and to a fabric computer system, respectively, with the components of the fabric computer system provided by one or more fibers. The one or more fibers providing the components of a fabric computer can be arranged in any suitable fashion as a fabric, with a selected fabric configuration.

Figure 1:
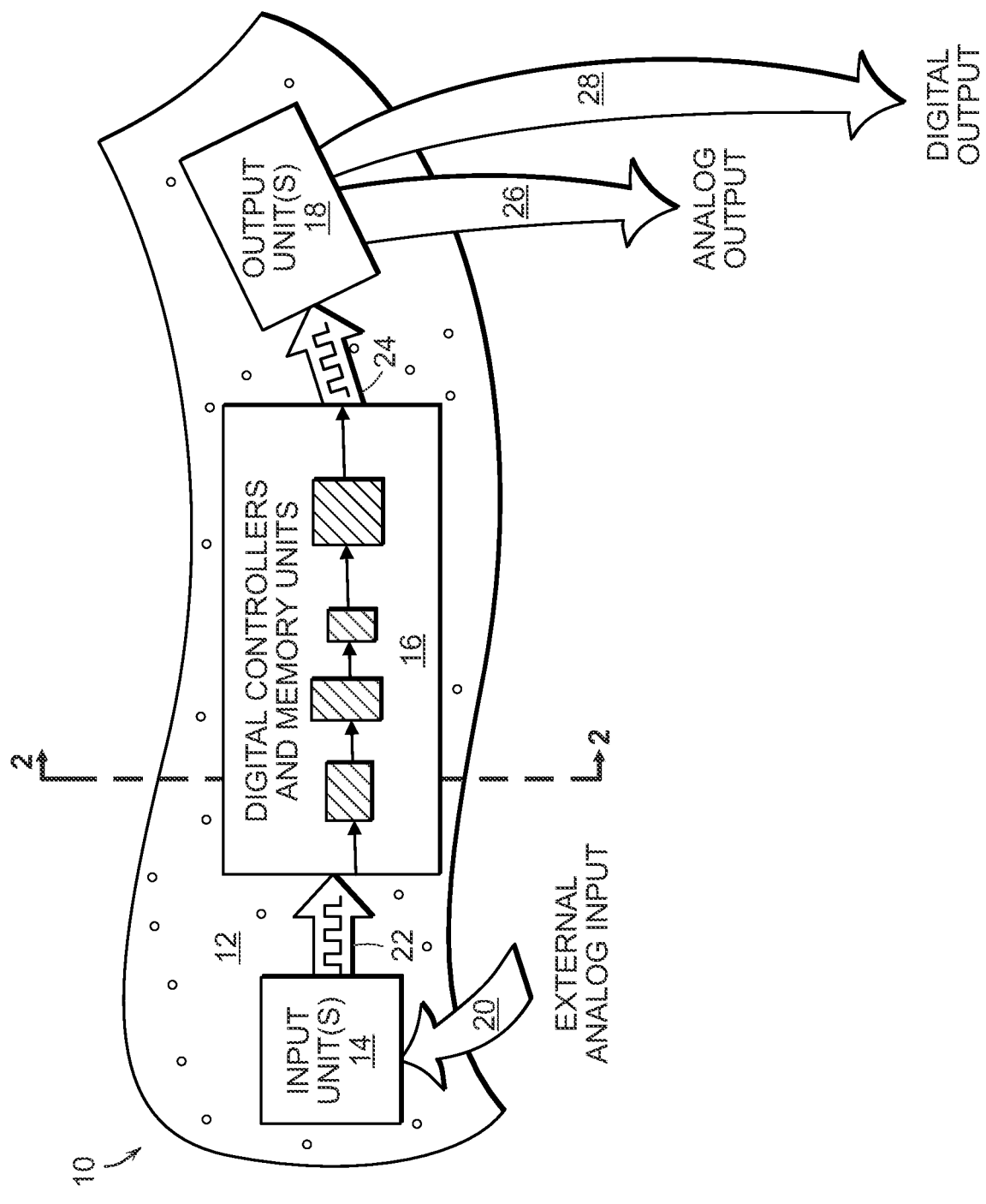
FIG. 1 is a schematic view of the components of a fiber computer provided herein.
Figure 2:
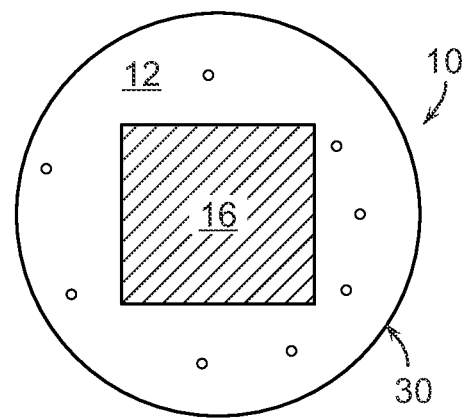
FIG. 2 is an axial cross-sectional view of a component of the fiber computer of FIG. 1.

Referring to FIG. 1, there is schematically shown a fiber computer as-provided herein; the fiber is not shown to scale in this figure for clarity of detail. The fiber computer 10 includes fiber body material 12 that is disposed along the length of the fiber; in preferred embodiments, the fiber body material is disposed along the full fiber length. The fiber body material 12 encapsulates one or more computer components that are disposed within the fiber body. In one embodiment, the computer components include one or more input units 14, one or more digital processing units 16 such as digital microcontrollers and/or digital memory modules, and one or more output units 18. In preferred embodiments, each of the computer components are disposed fully within the fiber body, as shown in the cross-sectional schematic of FIG. 2, showing a digital processing unit 16 encapsulated by fiber body material 12.

As shown in FIG. 1, analog input 20 that is external to the fiber computer 10 is accepted within the fiber by one or more input units 14. At least one input unit or other fiber computer component digitizes the analog input to produce an in-fiber digital signal 22. The in-fiber digital signal is communicated to at least one digital processing unit 16 for digital signal processing, for digital computation and/or manipulation, such as combinatorial logic, digital analysis, neural network analysis, or for other digital function. The original digital signal 22 and/or digital signals resulting from the digital functionality of the digital processing unit can be stored in memory modules of the digital processing unit. The digital signal 24 resulting from the digital functionality of the digital processing unit can also be communicated to at least one output unit 18. The output unit 18 is operative to produce an analog output 26 that is received externally from the fiber computer, i.e., that is provided to the fiber exterior, and/or to produce a digital output 28 that is provided to the fiber exterior.

This fiber computer configuration provides a computer input, analog-to-digital processing of the input, in-fiber digital communication and memory storage, in-fiber digital processing, and digital and/or analog computer output, for full computer functionality in the form factor of a fiber. In other words, a single strand of fiber provides all computer functionality. The fiber computer interfaces with an analog environment, accepts analog input, digitizes the analog input, processes the resulting internal digital signals, and stores as well as delivers output resulting from the internal digital processing. External analog information is thereby collected, digitally processed, stored, and communicated, all within a single fiber strand. The computer fiber thereby communicates with the analog world and digitally processes information from the analog world in a shape and configuration that is so elegantly simple as to be easily integrated into and with the analog world. With the fiber computer provided herein, a single fiber strand can be integrated throughout the environment to provide digital computing. Digital processing of analog information is thereby made ubiquitous by the fiber computer. As explained in detail below, the each of the fiber computer units can be implemented in any of a wide range of alternatives for achieving a desired fiber computer functionality and application.

Figure 3:
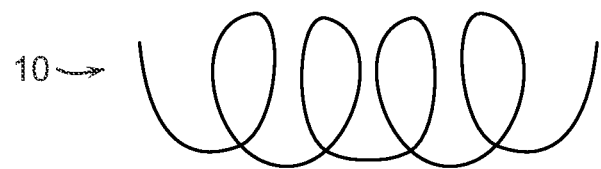
FIG. 3 is a schematic view of a coiled length the fiber computer of FIG. 1.

Referring also to FIG. 3, the fiber computer 10 is an elongated, macroscopic structure for which the longitudinal dimension is substantially larger than the other two fiber computer dimensions, defined as the axial cross-sectional dimensions. The body length, l, of the fiber computer is on the order of meters, e.g., 10 m, 20 m, 50 m, 100 m, 1000 m or longer, while the largest axial cross sectional extent of the fiber computer is on the order of millimeters, resulting in a fiber computer longitudinal-to-cross-sectional ratio that is in embodiments herein above 1000. The generally circular fiber computer cross-section shown in FIG. 2 is not limiting, and indeed is not preferred for all applications. For many applications, a generally rectangular fiber computer cross section can be preferred, but such is not required. Any suitable cross-sectional fiber computer geometry, e.g., circular, elliptical, rectangular, square, triangular, or other cross-sectional geometry, can be employed. The fiber computer body 12 is mechanically flexible and is not fixedly rigid.

In embodiments provided herein, the fiber computer is produced by incorporating computer units directly into a thin, flexible fiber body, resulting in the fiber computer properties given above. In preferred embodiments, the flexible fiber body includes a polymeric material. Most preferably, the fiber computer is produced by thermally drawing a fiber preform including the computer units into the fiber computer, in the manner described in detail below.

It is discovered herein that contrary to expectation, computer components can be thermally drawn internal to a fiber form, with physical in-fiber connections for power and communication transmission simultaneously formed during thermal drawing, even for many quite different computer units. It is further discovered herein that communication between disparate in-fiber computer units can be achieved with the thermal drawing process. The thermal drawing process interconnects the computer units and all connections and interconnections within the fiber body in a process that is scalable, to produce a fiber computer spanning tens or hundreds of meters; and includes analog-to-digital input, sensing, output, and digital processing along the length of the fiber. The fiber computer is operative for remote input, sensing, and output, and is operative for distributed digital processing and storage along the portions of the fiber computer length or along the entire fiber computer length.

The fiber computer units are disposed within the fiber body, interior to the surface of the fiber body, as shown in FIG. 2; the computer units are not disposed on the fiber surface 30. Preferably the fiber body material 12 is at the fiber surface 30. As a result, the computer units of the fiber computer are fully protected from the external environment of the fiber, and the fiber computer can operate in a range of environments in which conventional computers cannot. The fiber body material 12 is therefore a protective fiber computer exterior, and can be considered as the external wall of the fiber computer. The fiber body material in preferred embodiments is the mechanical interface of interaction between the fiber computer and the external environment; the fiber body material is the physical, material fiber computer housing. In embodiments herein in which the fiber body material is a mechanically flexible material, and further a flexible polymeric material, the fiber computer is a computer in a flexible polymer strand. Digital computing power can be provided in an enormous range of applications with the flexible polymer fiber computer.

Figure 4A:
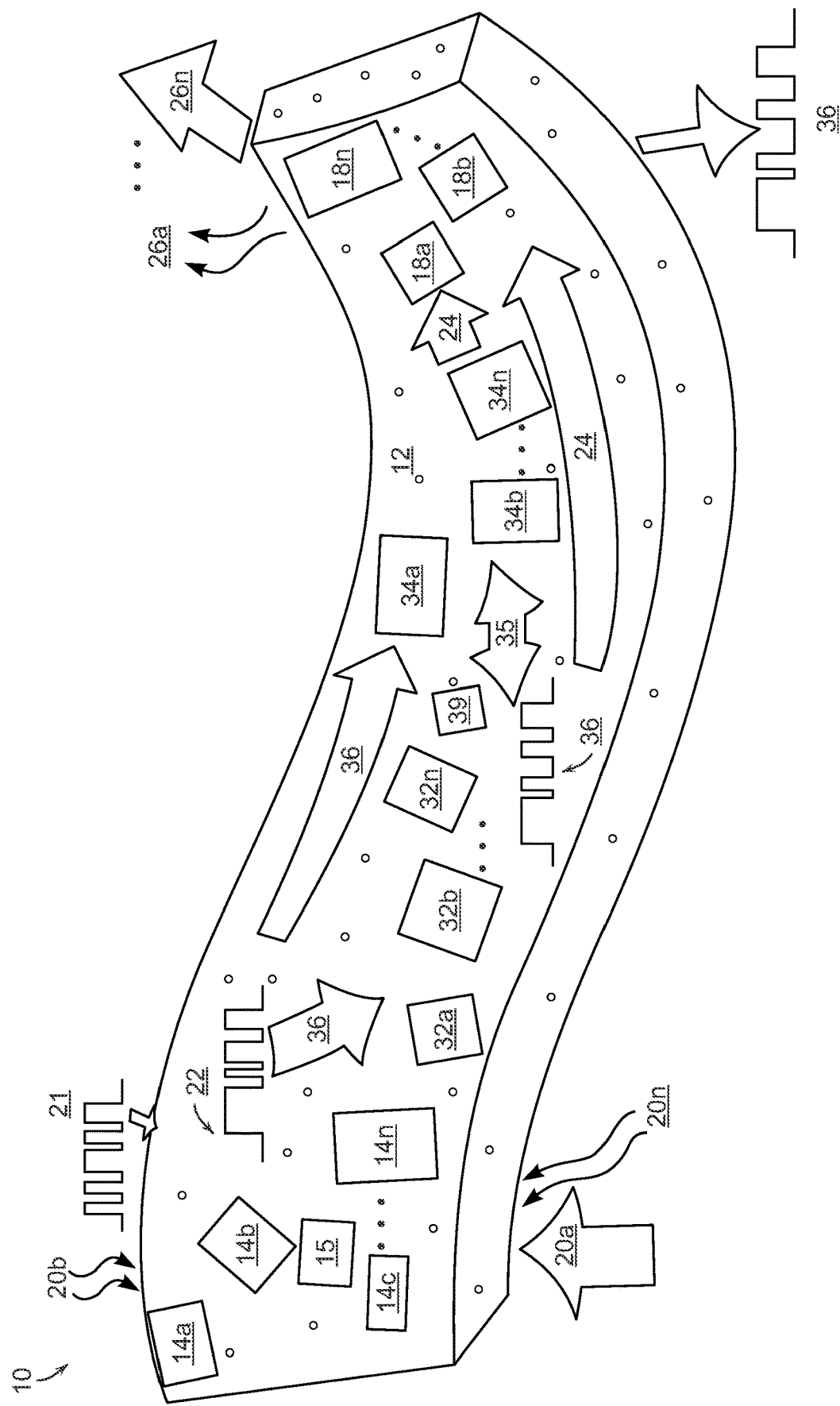
FIG. 4A is a schematic view of a first embodiments of fiber computer components and communication into, out of, and within the fiber computer of FIG. 1.

Turning to FIG. 4A, there is shown a schematic of one embodiment of the fiber computer 10 and the computer components therein. As explained above, external analog inputs are accepted by the fiber computer for digitization and processing within the fiber computer. The fiber computer can be disposed in an environment for receipt of one or a plurality 20a, 20b, . . . , 20n of analog inputs. Digital input 21 can also be directed to the fiber computer. Fiber computer input units 14a, 14b, . . . , 14n accept the analog input and/or digital input. In one embodiment, a plurality of different input units is provided for accepting, sensing, or otherwise detecting different inputs, either analog or digital. In a further embodiment, a plurality of the same input units is provided for accepting input to the fiber computer. In either case, the input units can be disposed along a selected one or more sections, or portions, of the fiber computer length, e.g., in one or more sequences of input units. The fiber computer can be populated with input units that are disposed at selected sites along the fiber computer length, in a distributed fashion. Thus, in embodiments herein, input units are provided at both ends of the fiber computer, at one end of the fiber computer, and/or at selected sites along the length of the fiber computer.

In embodiments herein, an input unit is provided as one or more sensors, for, e.g., temperature sensing, humidity sensing, touch sensing, acoustic sensing, pressure sensing, radiation sensing such as light-sensing, and other suitable sensing. In one embodiment, input sensory stimuli, from the environment around the fiber computer, is analog in nature. In this embodiment, the input unit accepts analog input and produces an analog signal indicative of the stimuli. This analog signal is converted to a digital signal either by an input unit itself or by an accompanying analog-to-digital converter unit 15. Such an analog-to-digital conversion unit is in embodiments herein either implicitly included in the signal generation function of the input unit or is implemented separate from the input unit. Digitization of the signal indicative of external analog stimuli can be completed by an input unit or by an analog-to-digital convertor. As shown in FIG. 4A, in embodiments herein, external digital information 21 can also be delivered to and accepted as an input by the fiber computer. In some embodiments, input digital stimuli 21 are accepted by input units of the fiber computer that are operative to intake digital signals. In alternative embodiments, external digital information 21 is accepted not by input units but by other fiber computer components directly, without the need for processing by an input unit.

Referring also back to FIG. 1, the fiber computer includes a population 16 of digital microcontrollers and memory units that accept digital signals from input units, or that accept external digital signals directly, as explained above. As shown in FIG. 4A, in embodiments herein, the digital controllers of this population are provided as at least one microcontroller or a plurality of microcontrollers 32a, 32b, . . . , 32n, and the memory units of this population are provided as at least one or a plurality of memory modules 34a, 34b, . . . , 34n. The microcontrollers 32a, . . . , 32n, and memory modules 34a, . . . , 34n are operatively connected to accept digital data within the fiber computer body from the input units 14a, . . . , 14n, and in embodiments herein, are connected to accept digital data from external digital stimuli 21. The microcontrollers and memory modules are also operatively connected for bi-directional communication 35 there between. Digital processing algorithms, comparative or analytical data, digital addressing, as explained below, and other information is provided by one or more memory modules to one or more microcontrollers.

As shown in FIG. 4A, digital signals 21 input to the fiber computer and/or digital signals 22 produced by one or more input units 14a, . . . , 14n, are communicated 36 within the fiber computer body to the population of microcontrollers 32a, . . . , 32n and/or memory modules 34a, . . . , 34n of the fiber computer. In embodiments herein, each microcontroller carries out microcontroller programs to process the inputs to the fiber computer, resulting in the production of output information such as information about the input stimuli, and/or output signals to be provided by the fiber computer. The microcontroller program instructions, stored, e.g., within the internal memory of each microcontroller, are run and operated by a microprocessor internal to the microcontroller. The microcontroller programs also provide instructions for conducting a digital communication sequence between the various units of the fiber computer.

A clock signal generator 39 can be included for clock generation if microcontroller does not provide such. Whatever form the clock signal generator takes, the clock signal generator is connected and operates to synchronize operation of the fiber computer componentry. In embodiments herein, one or more of the microcontrollers includes a master device that instructs the operation of other fiber computer units, termed for this purpose slave devices; e.g., enabling and controller the operation of the fiber computer slave devices. Each microcontroller can operate independently and asynchronously or synchronously, and can include extended memory space to operative for parallel processing operations, e.g., to enhance processing speed.

One or more memory modules 34a, . . . , 34n of the fiber computer can be employed for a data storage task directed to the fiber computer operation. In embodiments herein, input sensory data, such as images or audio data, or other input sensor data, is stored in one or more memory modules, e.g., for communication 35 within the fiber computer body to one or more microcontrollers. In other embodiments herein, one or more memory modules store microcontroller program instructions for use by the fiber computer microcontrollers, by communication within the fiber computer body to one or more microcontrollers. In further embodiments herein, memory modules store neural network data. In further embodiments herein, one or more memory modules store data that results from microcontroller computations; one or more of the microcontrollers 32a, . . . , 32n is operatively connected to communicate, within the fiber computer body, with one or more memory modules 34a, ..., 34n, to transfer 35 data to the memory modules. Such data can be then accessed by output units for output unit control, for digital data output, and/or for separate operation of other componentry within the fiber computer body. Memory modules can also extend the memory space of the microcontrollers for storing larger programs than could be accommodated in one or more microcontrollers alone. Therefore, the transfer of data 35 between microcontrollers and memory modules is in many embodiments bidirectional, as shown in FIG. 4A.

Also as shown in FIG. 4A, digital signals 24 in one or more memory modules 34a, ..., 34n, and/or digital signals 24 in one or more microcontrollers 32a, ..., 32n, are communicated within the fiber computer body from the memory modules and microcontrollers to one or more output units 18a, ..., 18n. The output units include one or more devices, circuits, systems, transducers, and other elements for output from the fiber computer to the surrounding environment and to the computer user. In one embodiment, the fiber computer output includes one or more analog outputs 26a, ..., 26n. In this embodiment, in-fiber digital signals are converted to analog signals for output as such or for control of an analog output device. In further embodiments, in-fiber digital signals are output as one or more digital outputs 36. The fiber computer output can include, e.g., light emittance, audible sound generation, transduction, actuation, or other output.

In embodiments herein, at least some of the in-fiber components of the fiber computer are mechanically rigid structures held within and encapsulated by flexible fiber body material. Even with rigid structures sited along at least a portion of the fiber computer length, or along substantially the entire fiber computer length, the fiber body maintains significant mechanical flexibility; the fiber computer is sufficiently flexible, e.g., to be coiled around a spool in the manner of FIG. 3. Thus, the fiber computer is a mechanically flexible strand that transforms rigid digital computing components into a flexible, substantially one-dimensional digital computer.

In embodiments herein, the in-fiber components of the fiber computer within the fiber body can include microelectronic components, photonic components, opto-electronic devices, microelectromechanical devices, or other devices, such as sensing, actuating, or other devices, such as microphones and audio speakers. Computer components and devices included can be fully functional outside of the fiber; that is, they do not require the fiber configuration for operation and thus are conventional stand-alone componentry, such as a microfabricated microelectronic devices. Examples of microelectronic devices employed in the fiber computer are semiconductor devices, electrooptic devices, transistors, diodes, junction-based devices, such as semiconductor junction devices, acoustic devices, and other microelectronic devices that can be incorporated into the fiber. The devices can be formed of any suitable material, e.g., including II-VI semiconductors, III-V semiconductors, metals, glasses, polymers, and other materials. The devices can include all of electrically conducting, semiconducting, and insulating materials, including crystalline materials such as monocrystalline and polycrystalline materials, as well as amorphous materials. The devices can be two-terminal devices, three-terminal devices, four-terminal devices, or other device configurations.

In preferred embodiments, the in-fiber components of the fiber computer within the fiber body include at least a portion of the architecture for functionality of a digital computer, providing digital computation, digital signal control, digital data storage, e.g., RAM, ROM, and SRAM, EEPROM, analog-to-digital conversion, digital-to-analog conversion, clock signal generation, and other digital computer functionality, including the digital computer functionality of the fiber computer of FIG. 1 and FIG. 4A.

One or more of such in-fiber computer components, as well as the devices described above, can be provided as a 'chip,' i.e., a microelectronic chip, known as a 'microchip.' A term "microchip" is herein given to include a physical structure that can contain one microelectronic device, many microelectronic devices, one microelectronic integrated circuit, many microelectronic integrated circuits, transistors and other microelectronic circuit elements, input/output componentry, electrical connections, contact pads, and other features. A microchip can embody a digital microprocessor, a central digital processor, a digital graphics processor, analog and/or digital computational modules, digital combinatorial logic modules, a digital microcontroller, digital memory, clock signal generation circuitry, input and output devices and circuits, communication receivers and transmitters, input/output control circuitry, sensors, actuators, transducers, input ports, output ports, and other elements of a computer system, each including and/or implemented as one or more microelectronic devices, microelectromechanical devices and/or systems, microelectronic integrated circuits, and other componentry.

An integrated circuit is herein given as a micro-scale, monolithic, microelectronic circuit that is microfabricated including one or more semiconducting materials. An integrated circuit often performs an electrical function like that of a macro-scale device or circuit that would be composed of corresponding macro-sized, discrete electrical components. A microchip is thereby given herein as embodying a microelectronic or microelectromechanical device, circuit, or system that is supported, embedded, or otherwise disposed on or in a structural material, such as a piece of microelectronic material, e.g., a semiconductor wafer die or other semiconducting platform, generally produced by semiconductor microfabrication processing technology.

In embodiments herein, the fiber computer includes microchips that are operative as sensors, input units, microcontrollers, memory modules, and/or output units. The microchips included in the fiber computer can be custom-microfabricated for the fiber computer and/or can be commercially-available microchips. Table I below provides examples of commercial microchips that can be employed in the fiber computer herein. This listing is in no way limiting and is meant instead to provide examples of microchips that can be employed.

Table I

Example Commercial Microchip Fiber Computer Componentry

Fiber Computer Input Componentry

MAX31875 Digital Temperature Sensor, Maxim Integrated, San Jose, CA
OPT3007 Digital Light Sensor, Texas Instruments, Dallas, TX
VEML6075 Digital UV Sensor, Vishay Semiconductors, Shelton, CT
NanEye Digital Camera, AMS Sensors, Cupertino, CA HDC2010 Digital Humidity Sensor, Texas Instruments, Dallas, TX
IQS231A Digital Touch Sensor, Azoteq, Austin, TX
MXC6255XC Digital Accelerometer, MEMSIC Semiconductor, San Jose, CA
DA14531 Digital Bluetooth, Dialog Semiconductor, Santa Clara, CA
ST25TA512B Digital Near Field Communication Unit, STMicroelectronics, El Paso, TX
NT3H2111 Near-Field Contactless Comm. System, NXP Semiconductors, Woburn, MA Fiber Computer Output Componentry DRV201A Digital Motor Driver, Texas Instruments, Dallas, TX
LC898302AXA Digital Linear Vibrator Driver, ON Semiconductor, Phoenix, AZ
FAN5646 Digital LED driver, ON Semiconductor, Phoenix, AZ
LP5560 Digital LED driver, Texas Instruments, Dallas, TX
DA14531 Digital Bluetooth, Dialog Semiconductor, Santa Clara, CA
ST25TA512B Digital Near Field Communication Unit, STMicroelectronics, El Paso, TX
NT3H2111 Near-Field Contactless Comm. System, NXP Semiconductors, Woburn, MA Fiber Computer Microcontrollers MAX32660 Maxim Integrated, San Jose, CA
PSoC 4 Programmable System-On-Chip, Cypress Semiconductor, San Jose, CA Fiber Computer Clock Oscillators SiT8021 Clock Oscillator, SiTime, Santa Clara, CA
ASAKMPD8 Clock Oscillator, Abracon, Spicewood, TX Fiber Computer Memory Modules 24CW640, 24CW1280 EEPROM, Microchip Technology Inc., Chandler, AZ
M24C64T, M24C64M, M24128S EEPROM, STMicroelectronics, Burlington, MA
CAT24S128, CAT24S64, CAT24C64 EEPROM, ON Semiconductor, Phoenix, AZ
CAT24C64BAC4, N24S64 EEPROM, ON Semiconductor, Phoenix, AZ
CAV24C128, CAV24C32 EEPROM, ON Semiconductor, Phoenix, AZ The microelectronic microchips identified in Table I above are examples of commercial microelectronic componentry that can be disposed internal to the fiber computer fiber body, encapsulated in fiber body material, and interconnected, within the fiber body, to operate together for the fiber computer. Other microchips, both commercial and custom, can be included as taught in U.S. Pat. No. 10,509,186, issued Dec. 17, 2019, the entirety of which is hereby incorporated by reference.

Referring to FIG. 4B, in other embodiments provided herein, one or more of the fiber computer units are formed of fiber materials themselves rather than being provided by a microchip. In other words, the computer units are formed in situ in the fiber body of fiber materials, and are an integral part of the fiber body, rather than an external component that is integrated within the fiber body. In an example of such, the fiber computer input units can include fiber materials 17, 19, that are arranged as an input sensor, an input transducer, and/or an input device. Such an input unit has a continuous expanse of device materials along an extent of the fiber computer length and therefore is a continuous device, not a discrete component. The device here is not necessarily a rigid device but can include rigid material layers, rigid device elements, and other rigid in-fiber arrangements; but computer units are in this embodiment configured as a continuous extent of materials.

Such fiber computer input unit materials and devices are interconnected within the fiber computer body to deliver in-fiber signals 33 to one or more microcontrollers 32a, for processing, and communication 35 with one or memory modules 34a as explained above. Also shown in FIG. 4B, fiber computer output units can be formed in situ in the fiber body, of fiber materials 17, 19, rather than as an external component that is integrated within the fiber body. In-fiber signals 37 are communicated from one or more memory modules 34a and microcontrollers 32a to the fiber computer output unit materials and devices.

The fiber computer input units that are formed integrally of fiber material in embodiments herein provide any suitable sensing functionality, such as chemical sensing, piezoelectric sensing, acoustic sensing, thermal sensing, radiation sensing, pressure sensing, and other sensing. The fiber computer output units that are formed integrally of fiber material in embodiments herein provide outputs such as microphone output, piezoelectric output, and other device outputs. These input and output units are provided in the fiber computer as taught in U.S. Pat. No. 10,509,186, issued Dec. 17, 2019; as described in U.S. Pat. No. 7,295,734, issued Nov. 13, 2007; as described in U.S. Pat. No. 7,292,758, issued Nov. 6, 2007; U.S. Pat. No. 7,567,740, issued Jul. 28, 2009; U.S. Pat. No. 10,338,000, issued Jul. 2, 2019; U.S. Pat. No. 9,365,013, issued Jun. 14, 2016; U.S. Pat. No. 9,263,614, issued Feb. 16, 2016; U.S. Pat. No. 9,512,036, issued Dec. 6, 2016; U.S. Pat. No. 10,112,321, issued Oct. 30, 2018; U.S. Pat. No. 10,406,723, issued Sep. 10, 2019; and U.S. Patent Application Publication No. 2019/0136413, published May 9, 2019; the entirety of each of which is hereby incorporated by reference.

Figure 5:
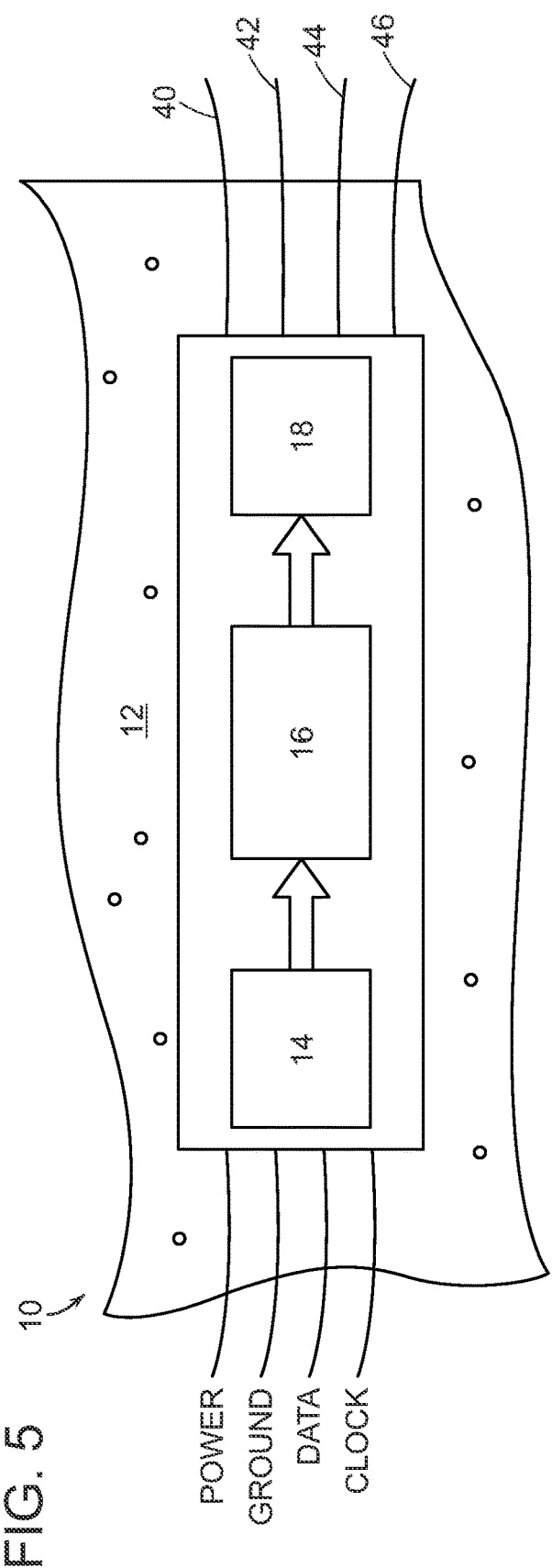
FIG. 5 is a schematic view of the components of a fiber computer provided herein including in-fiber power, ground, data transmission, and clock signal lines.

Referring to FIG. 5, integral input and output devices and material arrangements within the fiber computer fiber body, and microchips that are integrated within the fiber body material encapsulation 12, including selected input units 14, digital controllers, clock signal generators, and memory modules 16 and output units 18, are configured for communication there between, within the fiber body, and for communication to and from the fiber computer. In one embodiment, there are provided multiple different lines of transmission, including, e.g., an electrical power transmission line 40, an electrical ground line 42, a data transmission line 44, and a clock signal line 46. Each of these transmission lines are provided as electrical conductors within the fiber body.

In embodiments provided herein, any number of electrical conductors can be included in the fiber computer and those shown in FIG. 5 are not intended to be limiting. Not all lines are required in every embodiment of the fiber computer; those in FIG. 5 are examples of lines that can be employed in embodiments herein. It is to be recognized that in some embodiments, two or more different signals can be transmitted over a single in-fiber electrical conductor. For example, power and data signal transmission can for some applications be provided on a common in-fiber electrical conductor. Four electrical conductors are shown here as an example embodiment only. The fiber computer requires internal communication of these signals but such can be accomplished in any convenient arrangement with any suitable number of in-fiber electrical conductors. Three or two electrical conductors can be employed; five or more electrical conductors can be employed.

Figure 6:
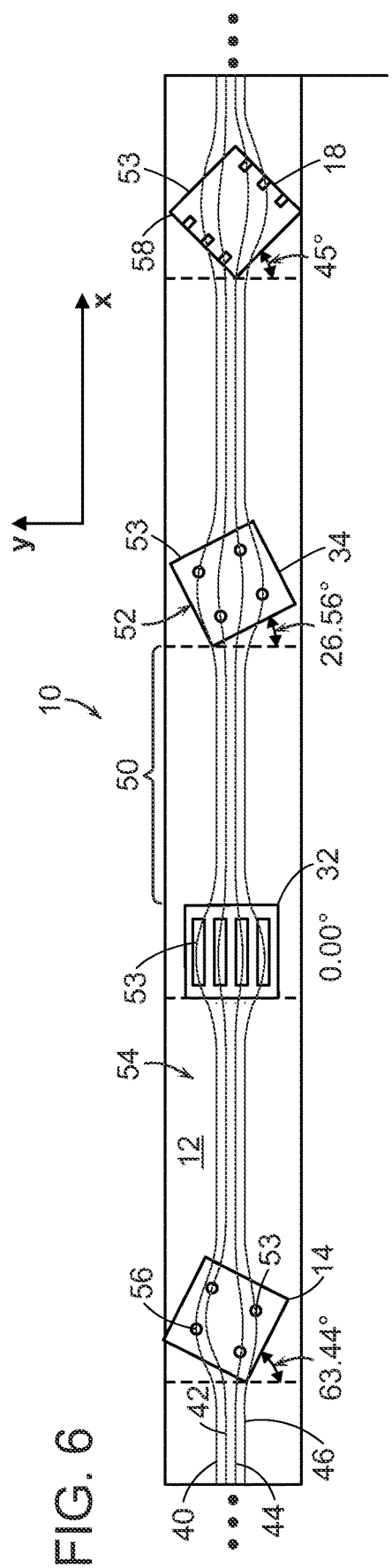
FIG. 6 is a longitudinal cross sectional view of a section of a fiber computer provided herein including computer input microchips, microcontroller microchips, memory module microchips, and output unit microchips.

In embodiments herein, e.g., as shown in FIG. 6, external connection and internal in-fiber digital interconnection to and between the components of the fiber computer is enabled by the arrangement of the computer components in a linear sequence, i.e., single file, along at least a portion of the fiber body length. No particular sequence order is required. There is spacing 50, along the fiber longitudinal axis (x-axis in FIG. 6), between adjacent components along the component sequence. The component-to-component spacing 50 along the longitudinal axis can be uniform along the sequence, or can be non-uniform along the sequence. There can be large extents of spacing 50 between subsequences of components. Fiber body material 12 is disposed in the spacing 50 between adjacent components. As a result, each component is physically separated and isolated from the other in-fiber components by the fiber body material 12. The components have discrete siting points along the fiber body; they are not a continuous material.

As explained above, the fiber computer in embodiments herein can include one or more extents of continuous material layers along the fiber length as input units, output units, or other fiber computer componentry. Such can be disposed along the sequence of components shown in FIG. 6, in an arrangement that is a combination of continuous device sections and sequences of discrete components, as in FIG. 4B. The arrangement can be imposed with a selected component sequence for optimizing fiber computer performance. For example, the sequence of fiber computer input, digital processing, and output components of FIG. 4A, FIG. 4B, and FIG. 5 can be repeated along the fiber computer length to reduce signal propagation latency and RC time constant, and to provide, e.g., distributed fiber computer input sites, fiber computer computation sites, and fiber computer output sites, the sites provided at points along the fiber computer length.

In embodiments herein, one or more fiber computer components can be employed in the fiber computer body as microchips, as explained above. Preferably, the microchips are un-packaged; i.e., the microchips are individual microfabrication die or substrates, not microchip packages having die therein. The microchips are in these embodiments planar structures. In one embodiment, the physical plane 52 of each microchip 53, such as input unit 14, microcontroller 32, memory module 34, and output unit 18, is as shown in FIG. 6, parallel to the longitudinal x-axis of the fiber body, defined here also as the long axis of the fiber body. The transverse cross-section of each microchip 53 is parallel to the short axis of the fiber body (y-axis in FIG. 6).

As shown in FIG. 6, in the space 50 between microchips 53, the in-fiber lines 54, such as electrical power transmission line 40, electrical ground line 42, data transmission line 44, and clock signal line 46 are non-varying in their path along the longitudinal axis of the fiber; the position of the lines is fixed in the cross section of the fiber. In one embodiment, the lines 54 in at least one plurality of lines are arranged side-by-side, as shown in FIG. 6. Given that each line 54 has one or more dedicated transmission functions along the entire fiber length, the inventors discovered that the electrical bond pads of microchips, such as bonding pads 56, 58 shown in FIG. 6, do not automatically allow for connection between a given line 54 and the corresponding bonding pad of a given microchip. The power, ground, data, and clock bonding pads of one microchip are often in a very different arrangement than that of another microchip. But the lines 54 are each unvarying in their dedicated functionality and position within the fiber computer.

It is discovered herein that this limitation can be overcome with a thermal drawing process in which microchips are arranged in a preform with an angular orientation in the plane of each microchip. Rather than a uniform orientation along the sequence of microchips, the microchips of the fiber computer are disposed at different angles within the fiber body while remaining parallel in the plane of the fiber body, i.e., planar along the longitudinal axis of the fiber computer. Each microchip can be disposed at a different rotational angle, groups of microchips can have a common rotational angle, and one or more microchips can have no rotational angle. For example, as shown in FIG. 6, microchips can be oriented in any required angle, such as an angle of 63.44° with the normal, an angle of 0° with the normal, an angle of 26.56° with the normal, and an angle of 45° with the normal. Unused microchip bond pads 58 are disposed out of the path of the in-fiber lines 54, and the correct pairing of bond pads and lines is enabled along the fiber length. As explained in detail below, the angular orientation of microchips along the sequence of microchips is selected based on an understanding of the spreading-apart of in-fiber lines during the thermal fiber draw process. With this orientation control, each in-fiber microchip of the fiber computer can be accessed for communication to and within and for operation of the fiber computer.

Figure 7:
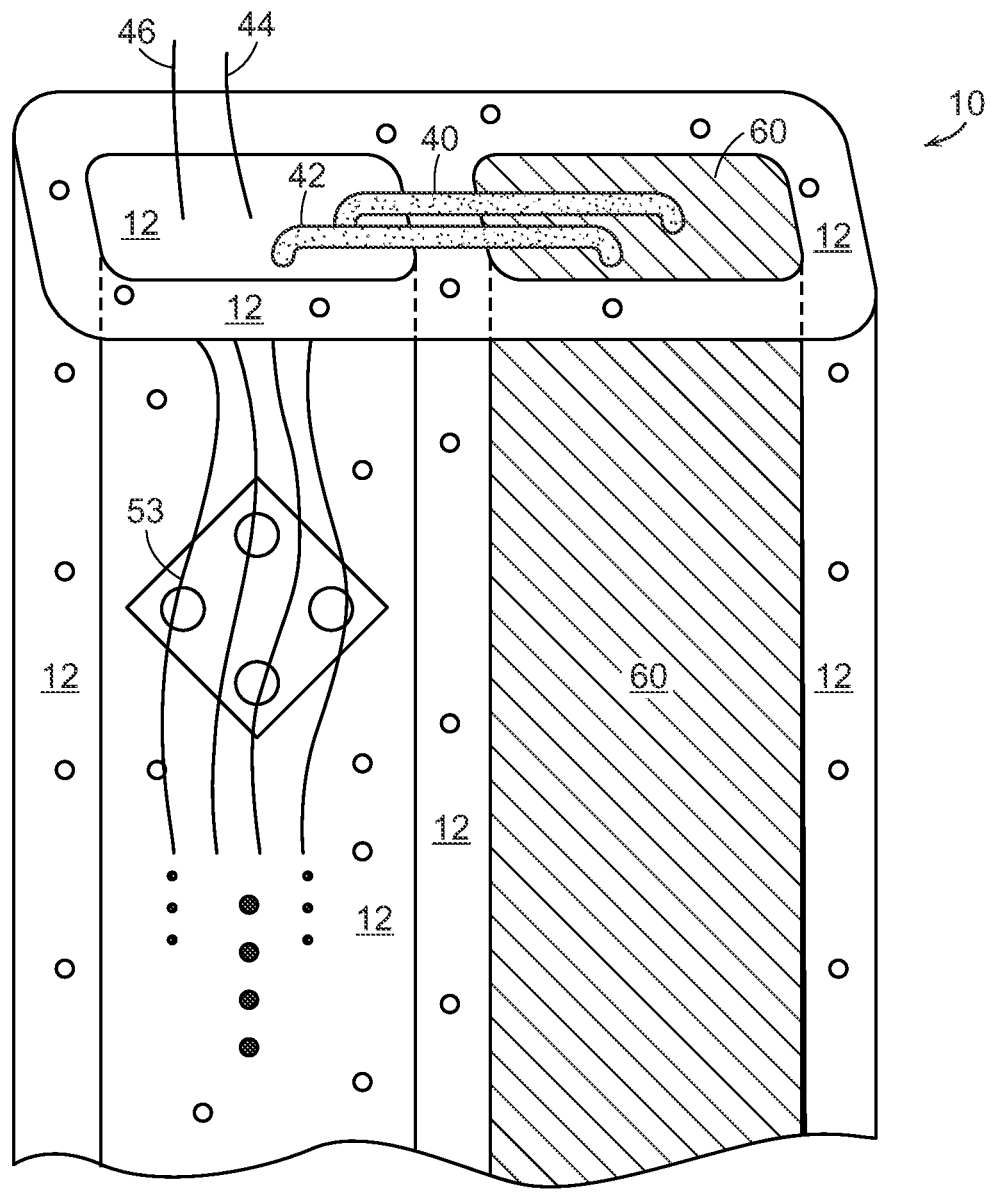
FIG. 7 is a schematic view of a fiber computer provided herein with an integral in-fiber battery.

Fiber computer access to power is supplied to the in-fiber power line 40 of the fiber computer from within the fiber, from an adjacent fiber, or from an external power source; any suitable power source and power source connection can be employed. Referring to FIG. 7, in one embodiment herein, the fiber computer 10 includes an in-fiber computer battery domain 60; the battery is itself within the fiber body material 12. In other words, the fiber computer body includes all of the computer units and digital microchips and memory modules as well as the source of power for the units and modules. The battery domain can be implemented in any suitable fashion. In preferred embodiments herein, the battery within the fiber computer is an electrolytic battery. Whatever battery type is implemented, in this embodiment, there is provided a fully self-contained digital fiber computer and computer power source all together in a fiber form, all within, i.e., internal to, an exterior flexible fiber body material that in preferred embodiments is a polymeric material. Contrary to expectation, there is herein provided the simultaneous thermal drawing of microchips and other computer unit materials with battery materials and with all electrical conductors internal to the fiber. This enables the fiber computer herein with fully functional input units, output units, microcontroller microchips, memory modules, electrical conductors, clock generation circuitry, and a battery.

As shown in FIG. 7, the battery domain 60 of the fiber computer 10 includes a connection to the power line 40 for providing power to the in-fiber computer units, such as microchips 53. The power line 40 can be connected to the battery domain 60 at an end of the fiber computer and the battery, or at a convenient internal site of either, along the computer length. Similarly, the ground line 42 can be connected to the battery domain 60 at an end of the fiber computer and battery, or at another convenient site.

The arrangement shown in FIG. 7 for including a battery domain within the fiber computer body, extends to continuous devices like those described above. In such embodiments, continuous device material can be arranged as a continuous domain like the battery domain 60 in FIG. 7, and then arranged in the fiber computer with fiber computer components.

The fiber computer battery is provided, in embodiments herein, as a thermally drawn electrolytic battery domain or thermally drawn electrolytic supercapacitor domain including a polymeric material that is a gel, and is implemented as taught in U.S. Application Publication No. 2020/0028198, published Jan. 23, 2020, and in U.S. Application Publication No. 2016/0155534, published Jun. 2, 2016, the entirety of both of which are hereby incorporated by reference.

Figure 8:
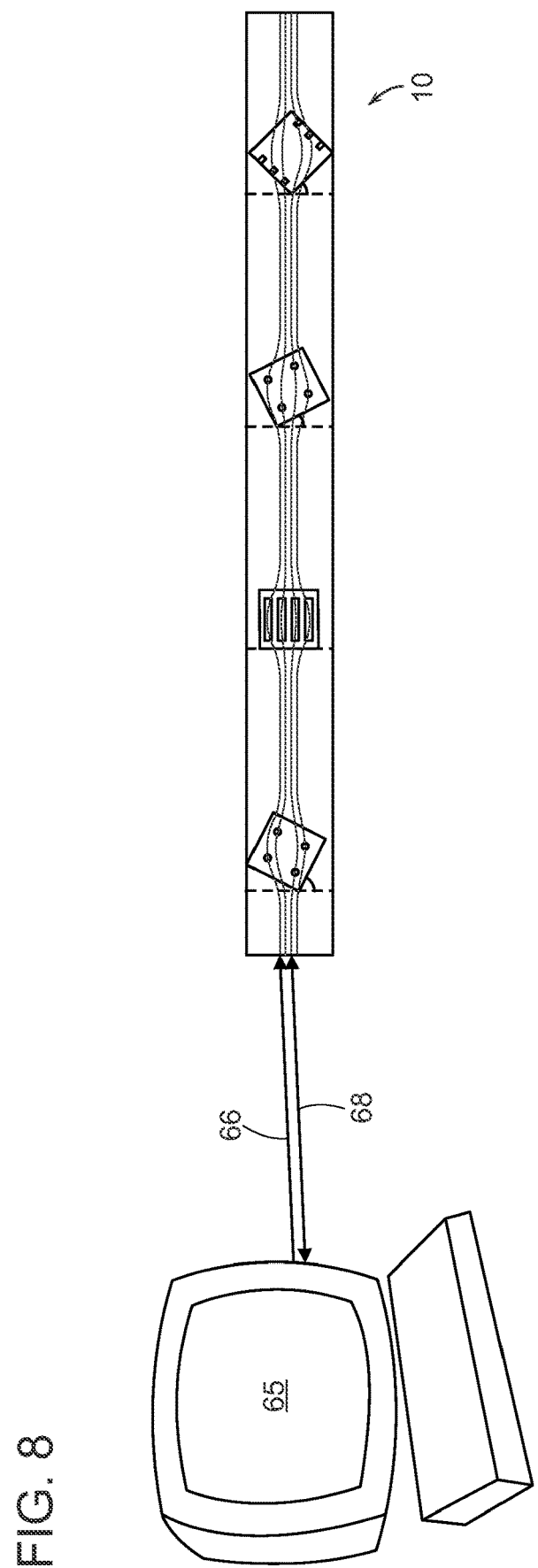
FIG. 8 is a schematic view of a fiber computer provided herein and connected to an external computer system.

In other embodiments herein, referring to FIG. 8, the fiber computer 10 is operatively connected to communicate with external systems, such as a computer system 65. The external system 65 can provide a link 66 that delivers power to the power line 40 of the fiber computer. The external system 65 can also be arranged with a bi-directional communication link 68 to the fiber computer, as described below. The link 66 for power delivery and the communication link 68 and either or both be implemented wirelessly or with a hardware connection. Other external sources of power, such as a portable battery pack, can be connected to the fiber computer for delivering power to the fiber computer. With power supplied to the power line 40 of the fiber computer, all in-fiber units of the fiber computer are operational.

The fiber computer power line 40, as well as the electrical ground line 42, data transmission line 44, clock signal line 46, and other lines of the fiber computer are each a continuous and single in-fiber line dedicated to one or more functionalities, such as data transmission and power transmission. And each single line is connected to a plurality of in-fiber units or all in-fiber units of the fiber computer. As a result, a line's functionality, e.g., delivery of data on the data transmission line 44, is not in-fiber microchip-specific and instead is delivered to every in-fiber microchip connected to the data transmission line. The common data transmission line cannot separately physically connect to a selected one or more in-fiber computer microchips. As a result, the data transmission line delivers the same data to all in-fiber microchips. But for operation of the fiber computer, specific fiber computer microchips, such as the fiber computer microcontrollers, require particular data, such as program instructions, while other fiber computer microchips, such as the fiber computer memory modules, require other particular data.

Figure 9A:
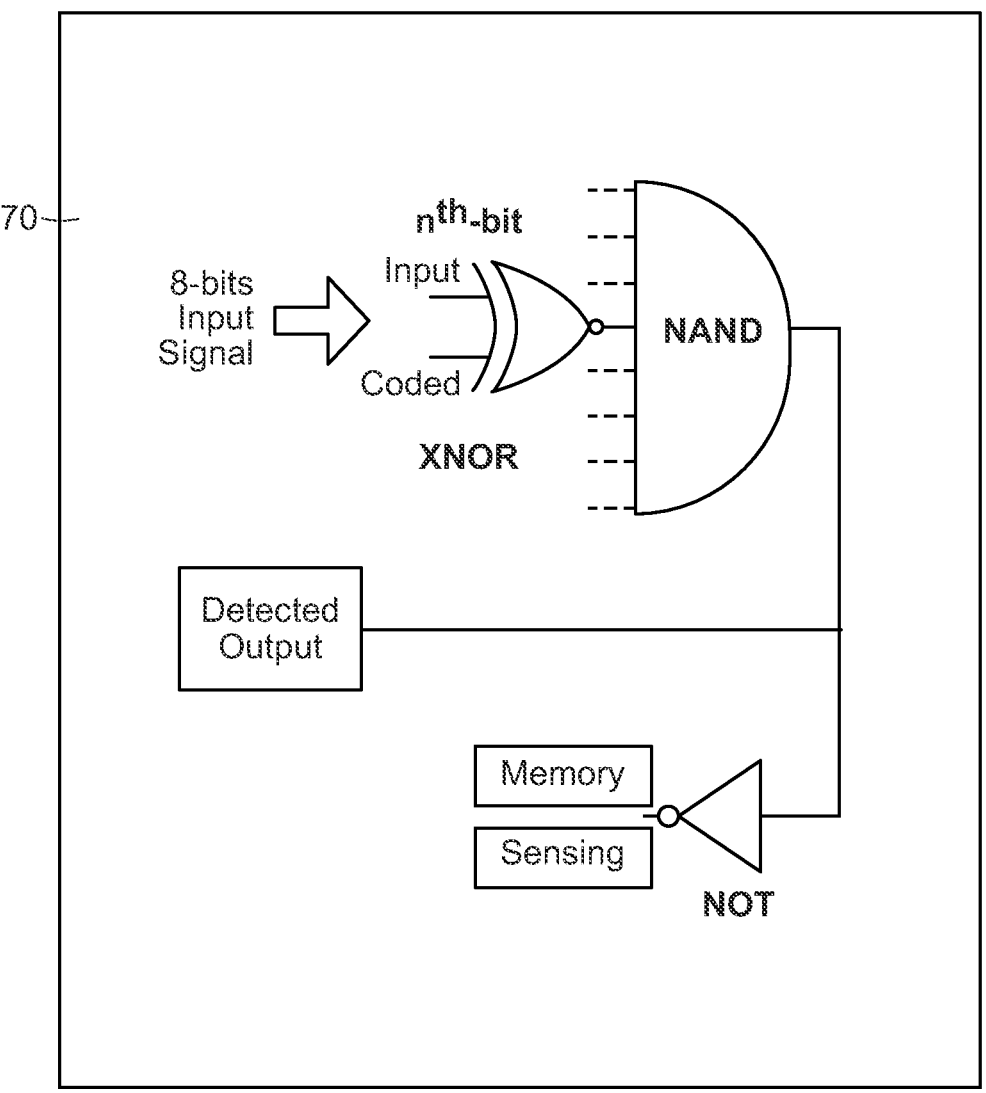
FIG. 9A is a diagram of digital combinatorial logic embodied in components in the fiber computer of FIG. 1 and FIG. 4 for independently addressing components in the fiber computer.

The fiber computer herein overcomes this impasse in directed data communication by providing in-fiber digital logic for each fiber computer microchip in the population of fiber computer microchips. In one embodiment of such, referring to FIG. 9A, one or more fiber computer units, such as a microchip, includes digital combinatorial logic 70. The combinatorial logic 70 is the same for each microchip, but each microchip owns an internal identifier address that is unique to that microchip across a population of microchips in the fiber computer. With this digital logic circuit, an input address value, e.g., an 8-bit input signal, "Input," as shown in FIG. 9A, is processed with a coded internal 8-bit identifier value, "Coded," and if the input matches the coded internal identifier value, then the microchip is turned 'on' and activates its internal functionality based on the data transmission. Just two of the fiber computer units, 'memory' and 'sensing' are shown in FIG. 9A; the logic circuit determines if the units are operated by a given input signal. If the input does not match the coded internal identifier value, then the microchip remains 'off'. The quiescent state of all microchips is 'off' and each microchip is activated by a digital input that matches its coded internal identifier.

Figures 9B, 9C:
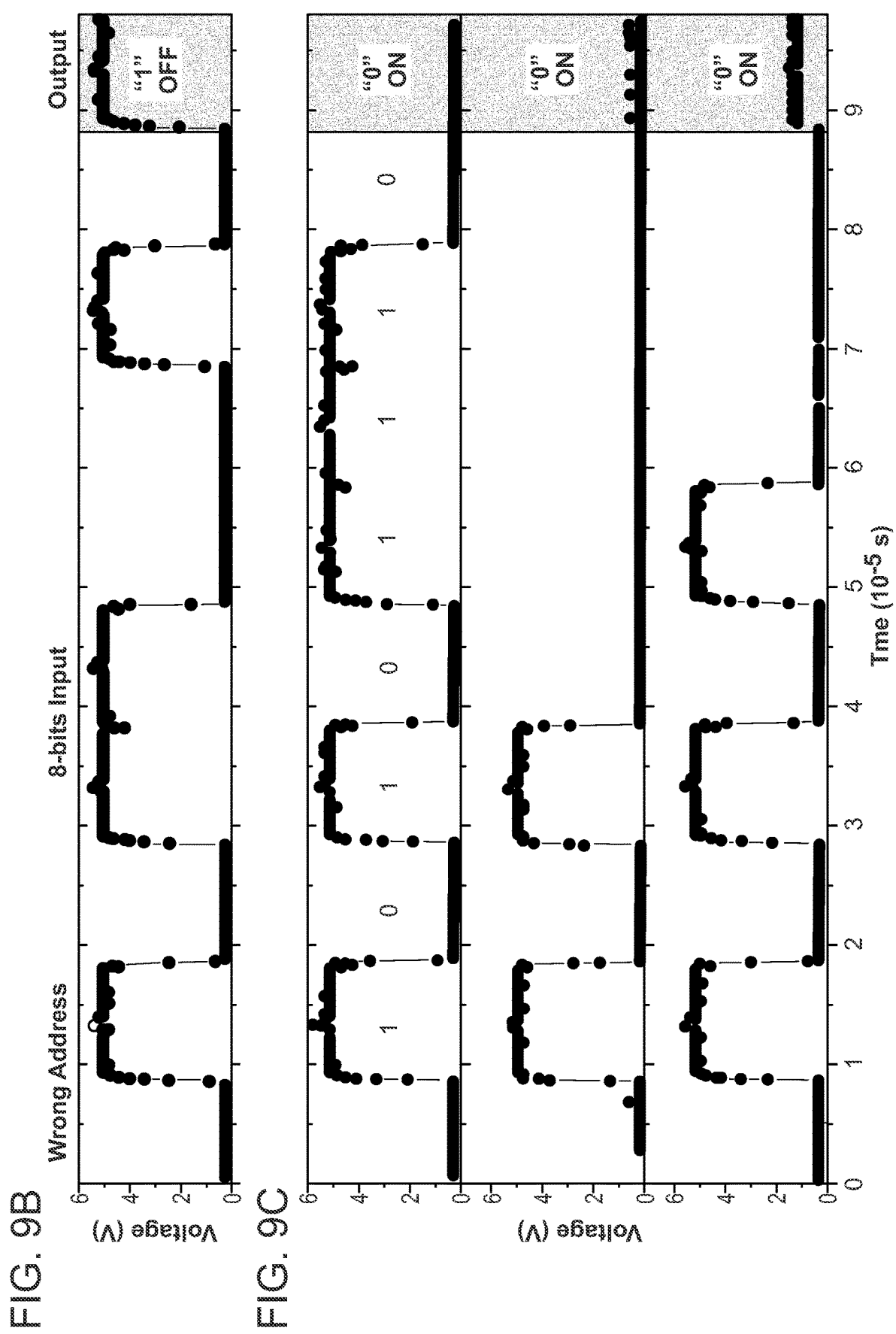
FIGS. 9B and 9C are a plot of an example 8-bit digital input and output indicating that no fiber computer component identifier address matches the digital input, and three plots of an example 8-bit digital input and three outputs indicating three fiber computer component identifier addresses that match the digital input, respectively.

In an example of this logic methodology, consider four different 8-bit logic addresses, three of which match the identifier values of three different computer microchips and one address of which is wrong and does not match any identifier. FIG. 9B is an example of an 8-bit digital input to a given microchip that results in a "1" output from the digital logic circuit, corresponding to the "off" state for the microchip. The "1" output signifies that there is no matching computer microchip within the fiber. Note that a '1' value is used because the signal line is pulled up by the power line, meaning that signal line is in a quiescent high state. FIG. 9C is an example of an 8-bit input to three different microchips that results in a "0" output from the digital logic circuit for a different unique identifier for each of the three microchips, thereby setting all three microchips to the "on" state. The "0" output pulls down the signal line from a '1' to a '0', signifying the detection of a matching microchip; the microchip is switched 'on' upon signal receipt. The fiber computer thereby individually and separately controls each microchip by its distinct digital address, controlling different microchips at different sites along the fiber computer. There is no requirement for the siting of specific microchips, and the fiber computer can internally control microchips disposed at any site along the fiber computer length. All of the fiber computer input units, microcontrollers, memory modules, and output units are thereby enabled to share the electrodes for selected functionality, such as power, ground, clock and data lines, yet the fiber computer components are identified with logical differences, enabling independent addressing and activating of each computer component, at any location along the length of the fiber computer.

In one embodiment, a digital addressing protocol, such as the I$^2$C protocol, NXP Semiconductors, NV, Austin, TX, is employed in the fiber computer for implementing the microchip addressing control. By the inclusion of a digital identification protocol in the fiber computer, the fiber computer microchips share the same transmission lines but are independently addressed and accessed, and separately controlled. The functionality of each microchip in the population of fiber computer microchips is separately controlled over time, and the fiber computer is controlled at sites along the fiber length. Hundreds of individually-identified digital microchips can be incorporated into the fiber computer, all accessible at a single data transmission line and connection point. Interconnected and disparate fiber computer functionalities are thereby addressable at any selected sites along the fiber length.

With this in-fiber microchip activation control, in one embodiment the fiber computer is controlled to store a large quantity of digital information in the fiber computer memory. Data input to the fiber computer, e.g., from a fiber input or an external device or system, can be split into data chunks and each data chunk stored at a different memory module of the fiber computer, at sites along the fiber computer length. With this arrangement, the fiber computer can store, e.g., 1 Mbit/m of fiber computer length, i.e., for each meter of fiber computer length, 1 Mbit of data is stored, enabling very high data storage in the compact form of a fiber.

The fiber computer can be arranged in any convenient configuration for operation and for bi-directional communication with the environment and with data in the vicinity of the fiber computer. This extends to the embodiment of a fabric computer, two examples of which are shown in FIG. 10A and FIG. 10B. In embodiments herein, the fiber computer 10 is itself woven into a fabric computer 74, with the fabric computer 74 configured for an intended use, e.g., as a garment. FIG. 10A shows the sleeve of a garment from which a fabric computer 74 is woven from a fiber computer 10. In such an arrangement, the fabric embodies a fabric computer 74. FIG. 10B shows an inset of FIG. 10A, clearly identifying microchips 53 disposed at sites of the fabric computer 74.

In the fabric computer 74 of FIGS. 10A and 10B, a length of fiber computer 10 is woven alone or, e.g., together with a secondary filament, yarn, thread, or other fiber, to form a matrix that includes computer microchips disposed entirely within a fiber body or fiber bodies and that includes one or more continuous extents of device materials. FIG. 10C shows a section of a fabric computer in which a length of fiber computer 10 is attached to yarns 72 with a secondary filament, yarn, thread, or other fiber. In both of these embodiments, the resulting fabric is a fabric computer. Microchips 53 are disposed at sites across the fabric, within fiber, and digital computer processing is carried out at sites across the fabric, with input and output units, including continuous device extents, microcontrollers, and memory modules, along with a battery, all provided in-fiber as the fabric computer.

In preferred embodiments, the fiber or fibers in which the fabric computer microchips 53 are disposed are mechanically flexible, and preferably are ultra-flexible, enabling them to be machine woven into fabrics, grids, cloth, textiles, and other arrangements in the manner of thread and yarn. The thermal drawing process provided herein produces such flexible fibers. Even with planar, rigid microchips disposed along a fiber computer length, the thermally drawn fiber computer maintains significant mechanical flexibility and is a weavable or knittable yarn or textile fiber, meaning that the fiber can be employed in textile fabrication processes, like weaving, that are designed to employ conventional yarns, fibers, filaments, or thread, and are entirely compatible with conventional fabric manufacturing methods. The fiber computer therefore embodied herein as both woven and non-woven textiles, cloth, and other such materials.

A fabric computer can be woven out of many fiber computers or out of one continuous fiber computer. In either scenario, the fiber computer can in embodiments herein be arranged with other fibers that are not fiber computers, including pure cotton, or can be attached to or combined within the matrix of a fabric, such as Endumax fabric, a fabric having a weft and warp, such as Edumax weft and Twaron warp, a Twaron region of a more complex fabric of Twaron warp and weft and Cotton weft, as well as a pure Cotton fabric or other suitable fabric. Other fabric materials include Mylar, Twaron, Endumax, UHMWPE, Kevlar, and other suitable fabric materials. A hybrid fabric computer material is therefore provided as embodiments herein, as a fabric that includes a plurality of fiber computers along with non-fiber-computer fiber woven together in an arrangement of a selected fabric weave pattern, and including non-functional fibers, e.g., for sewing or interconnecting edges of fabric to render the fabric as a garment. The fabric computer is therefore a matrix of fibers with digital computer microchip units and continuous device materials disposed entirely within one or a plurality of fibers of the matrix. No post weaving processing is needed; and no microchips are subsequently applied externally to fibers of the fabric.

In embodiments herein, the matrix of fibers arranged as a fabric computer includes one or more functional fibers having a range of functionality, such as piezoelectric sensitivity, chemical sensitivity, or other functionality, e.g., for fiber computer input or output. Such functional fibers are preferably mechanically flexible and thermally drawn. Example functional fibers as embodied herein as described in U.S. Pat. No. 10,509,186, issued Dec. 17, 2019; as described in U.S. Pat. No. 7,295,734, issued Nov. 13, 2007; as described in U.S. Pat. No. 7,292,758, issued Nov. 6, 2007; U.S. Pat. No. 7,567,740, issued Jul. 28, 2009; U.S. Pat. No. 10,338,000, issued Jul. 2, 2019; and U.S. Pat. No. 9,365,013, issued Jun. 14, 2016; the entirety of each of which is hereby incorporated by reference.

In further embodiments herein, the matrix of fibers arranged as a fabric computer includes one or more fibers that provide features for fashion and aesthetics as well as providing a range of functionality. Example functional fibers as embodied herein as described in U.S. Pat. No. 9,263,614, issued Feb. 16, 2016; U.S. Pat. No. 9,512,036, issued Dec. 6, 2016; U.S. Pat. No. 10,112,321, issued Oct. 30, 2018; U.S. Pat. No. 10,406,723, issued Sep. 10, 2019; and U.S. Patent Application Publication No. 2019/0136413, published May 9, 2019; the entirety of each of which is hereby incorporated by reference.

Figure 11:
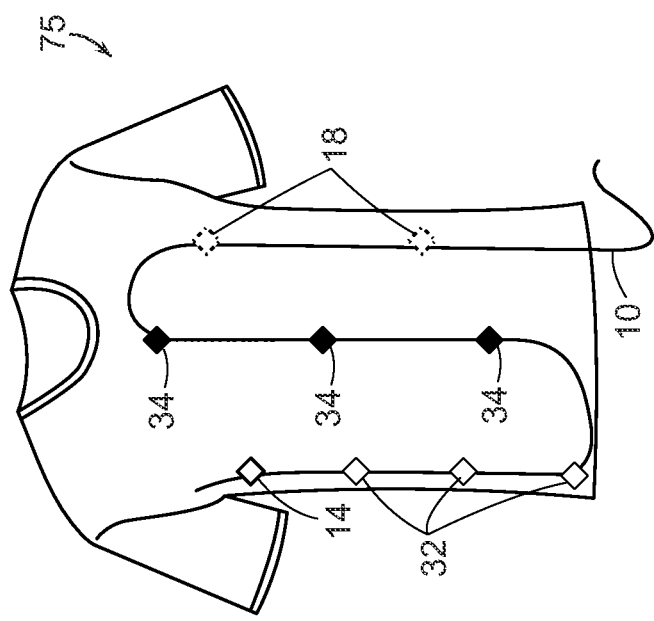
FIG. 11 is a schematic view of a fabric shirt computer provided herein.

A garment including the fabric computer thereby embodies a fabric garment computer. For example, referring to FIG. 11, a fabric shirt computer 75 includes microchips or other computer units, whether discrete or continuous, as one or more input units 14, microcontrollers 32, memory modules 34, and output units 18. The microchips are sited across the fabric shirt computer 75. In one embodiment, this garment computer arrangement includes one or more fiber computers 10 integrated into a fabric, resulting in the fabric shirt computer 75. Integration of the fiber computer 10 is by weaving or other method as described above; the fiber is integral to the matrix of the cloth of the shirt and results in a garment including a computer environment with sensing, processing, internal communication, storage, and output. In-fiber power can be included, as described above and shown in FIG. 7, and/or provided with an additional one or more fibers, as described just below.

Figure 12:
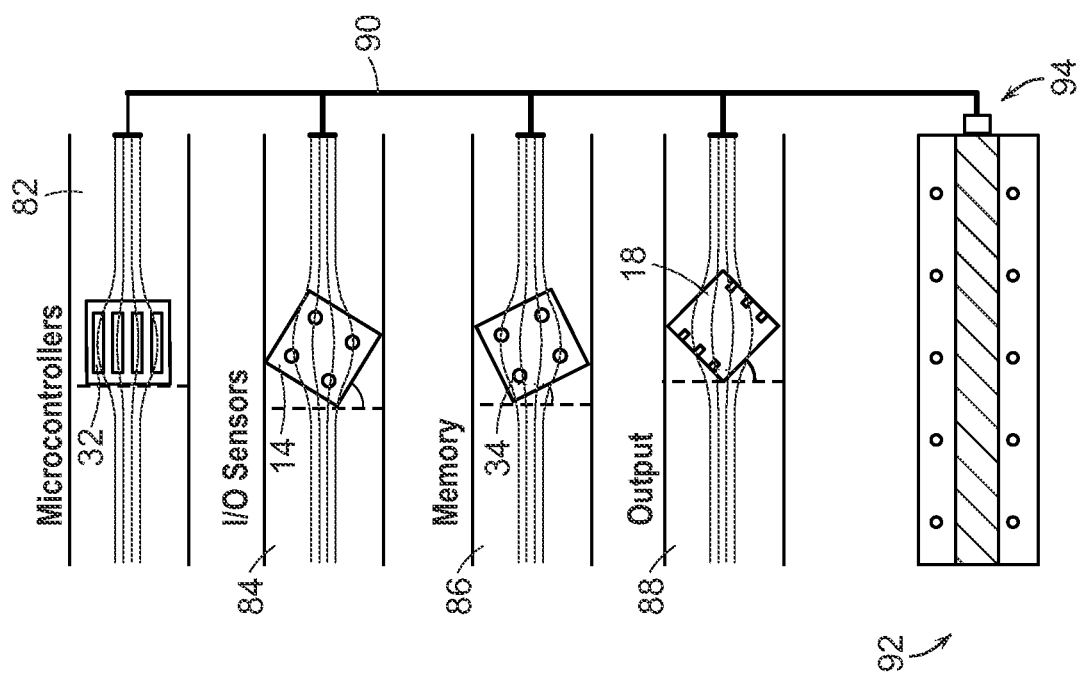
FIG. 12 is a schematic view of a population of fibers together providing input, output, microcontroller, and memory microchips and a fiber battery for a fabric computer provided herein.

Referring to FIG. 12, a fabric computer 80 provided in a further embodiment herein includes a population of different fibers that each internally include computer microchip units for one or more computer functions. In one example of such, one or more fibers of a first fiber type 82 of the fabric computer includes a population of microcontrollers 32, one or more fibers of a second fiber type 84 of the fabric computer includes a population of input units 14, one or more fibers of a third fiber type 86 of the fabric computer includes a population of memory modules 34, and one or more fibers of a fourth fiber type 88 of the fabric computer includes a population of output units 18. Additional fibers with additional computer units can be included.

This paradigm is extended in embodiments herein to a fabric computer in which one or more fibers includes one or a plurality of each of two different types of computer units, such as microcontroller and memory module, one or more fibers includes one or a plurality of each of three different types computer units, such as input unit, output unit, and memory module, or one or fibers includes one or a plurality of each of four different types of computer units such as input unit, output unit, microcontroller, and memory module. A plurality of fibers that are sited across or woven into, or embedded in a fabric computer together provide at least one full set of computer units required for the fabric computer, and therefore more than one, or a plurality of fibers, can together embody a fabric computer; and indeed, can provide a plurality of fabric computers across one continuous extent of fabric or at sites on a fabric garment computer.

As shown in FIG. 12, each fiber 82, 84, 86, 88 is connected to the other fibers in a suitable fashion; in one embodiment, shown here, the inter-fiber connection is external to the fibers and is physical wiring 90. This example of inter-fiber connection is not limiting; any suitable inter-fiber connection can be employed. The inter-fiber connection 90 enables communication between each of the fibers so that all computer units are accessible by the full computer system. Each fiber 82, 84, 86, 88 can include a power source, in the manner described above and shown in FIG. 7. In alternative embodiments, one or more instances of a battery fiber 92 is included in the fabric computer matrix. Here, electrical connections 94 are provided between the fiber battery 92 and the fibers 82, 84, 86, 88 of the fabric computer. The fiber battery is implemented and embodied herein as described in U.S. Application Publication No. 2020/0028198, published Jan. 23, 2020, and in U.S. Application Publication No. 2016/0155534, published Jun. 2, 2016, the entirety of both of which are hereby incorporated by reference.

Figure 13:
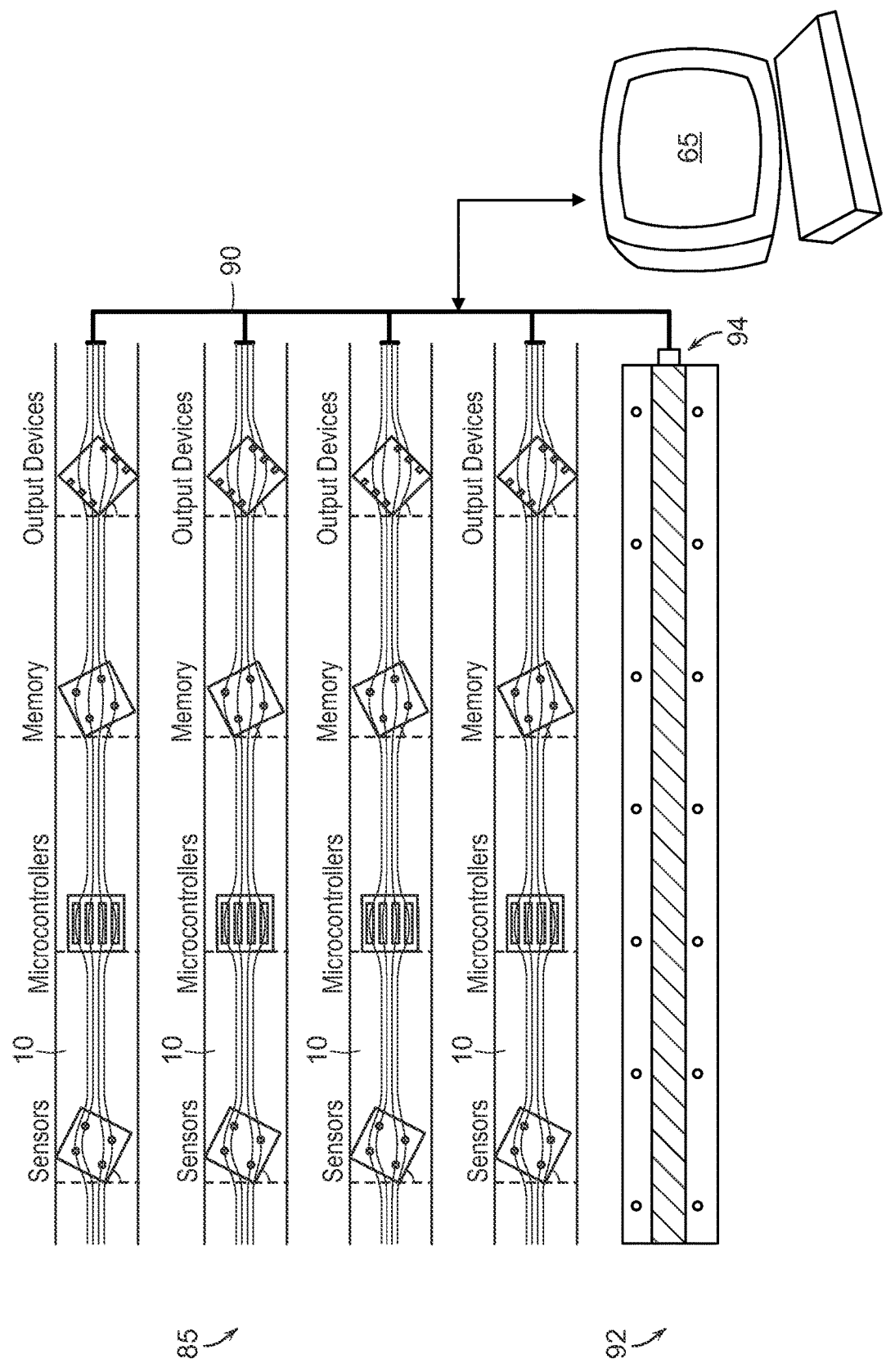
FIG. 13 is a schematic view of a population of fibers each providing input, output, microcontroller, and memory microchips for a fabric computer provided herein and a fiber battery for the fabric computer, with the fabric computer connected to an external computer 65.

Referring also to FIG. 13, in one embodiment, a plurality of fiber computers 10 are woven together or otherwise disposed in or on a fabric matrix as a fabric computer 85 or parallel fabric multi-computer, including redundancy of microchips for input sensors, microcontrollers, memory modules, and output units or devices. Inter-fiber connection 90 can be external, as in the previous embodiment, or provided in another suitable connection. One or more of the instances of fiber computer 10 can include a power source, in the manner described above and shown in FIG. 7. In alternative embodiments, one or more instances of a battery fiber 92 is included in the fabric computer matrix. Here, electrical connections 94 are provided between the fiber battery 92 and the fiber computers 10 of the fabric computer.

In both the multi-fiber fabric computer embodiment 80 of FIG. 12 and the multi-fiber fabric computer embodiment 85 of FIG. 13, an external computer 65 or other external controller, circuit, or input can be connected to the network of fibers for control and access to individual computer units of the fabric computer. The external computer can also provide power to the microchips in the fabric computer. Information transferred from the external computer to fiber computers in the fabric or the fabric computer itself is stored in either microcontrollers or memory modules of the fiber or fabric computers. In embodiments herein, such as those of FIG. 12 and FIG. 13, a unique digital identifier is ascribed to each computer unit in each of the plurality of fibers, in the manner described above, whereby across all fibers each microchip can be uniquely accessed and its fabric computer functionality activated. The resulting fabric computer or computers therefore can operate as an addressable architecture of digital computer components.

Figure 14:
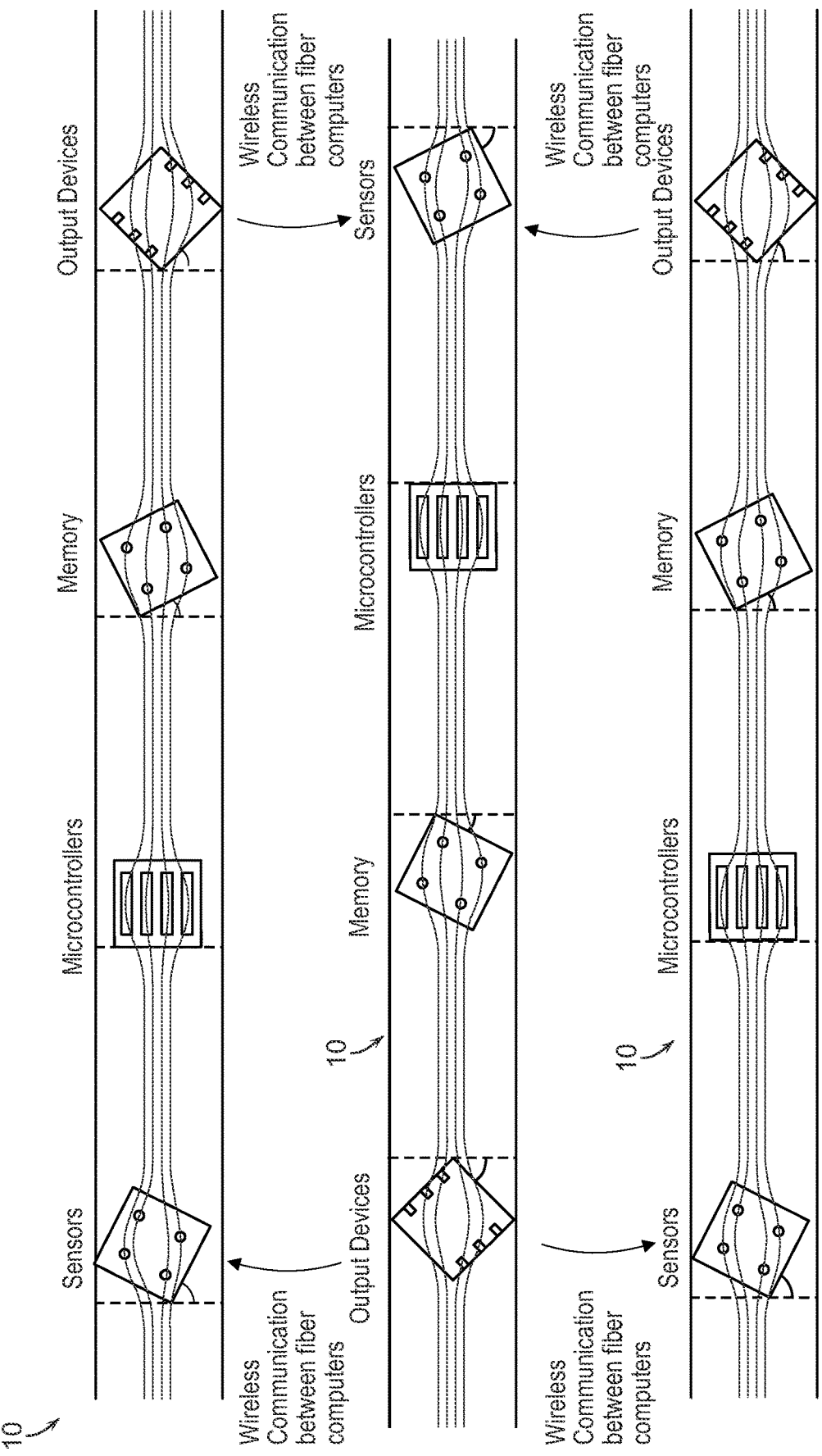
FIG. 14 is a schematic view of a population of fibers each providing input, output, microcontroller, and memory microchips for a fabric computer provided herein, with wireless communication between the fibers of the population.

As shown in FIG. 14, individual fiber computers 10 can be arranged together in a fabric for an interconnected multi-computer fabric. In one embodiment, each fiber computer 10 in the fabric communicates with other fiber computers by way of wireless communication. For example, fiber computer output units, such as light-emitting devices, antennas, or electromagnetic transmission devices, communicate with other fiber computer sensors, such as photodetectors and antennas. Other wireless communication embodiments can be employed, through selection of input units 14 and output units 18 of the fiber computers. Each fiber computer 10 here can include a dedicated power supply, such as an internal battery domain, as in FIG. 7. In alternate embodiments, one or more fiber batteries can be included in the fabric and connected to one or more of the fiber computers, in the manner of FIG. 12 and FIG. 13. External power source connectivity can also be made, e.g., as shown in FIG. 13. It is to be understood that the fibers represented in FIG. 12, FIG. 13, and FIG. 14 are arranged in a fabric matrix, as shown in FIG. 10B or FIG. 10C. For clarity there are shown in these figures fibers with internal microchips. But the fibers are an integral part of a fabric matrix, thereby providing fabric computers.

Figure 15:
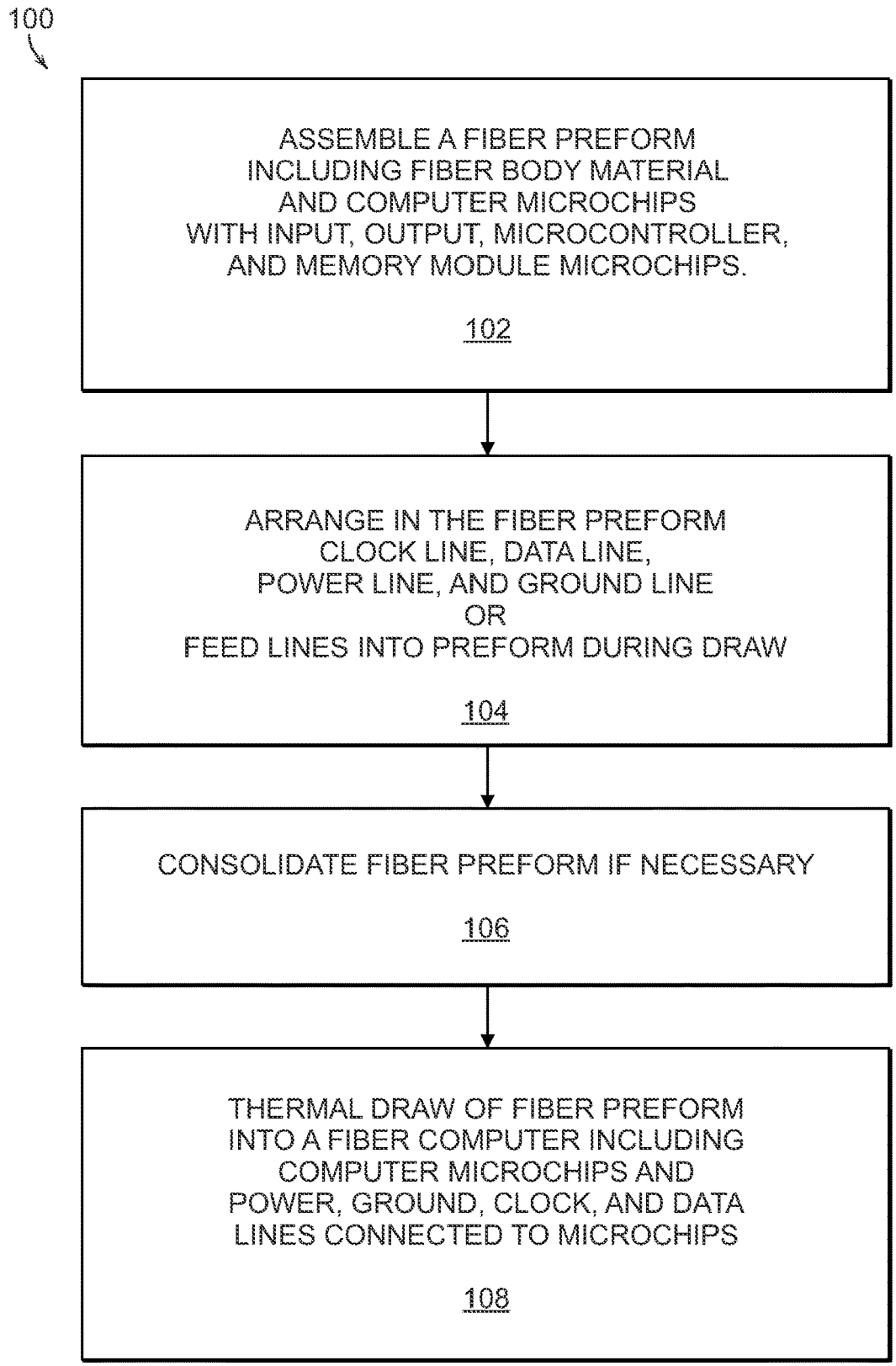
FIG. 15 is a flow chart of steps for the thermal draw of a fiber computer provided herein.

Turning to fabrication of the fiber computer and fabric computer, any suitable methodology can be employed to produce the fibers with digital computer microchips therein. In embodiments provided herein, a fiber computer is thermally drawn from a fiber preform. Referring to the flow chart of FIG. 15, in this method 100 for production of a fiber computer 10, in a first step 102 there is assembled a macroscopic fiber preform structure that includes fiber body material and that includes computer microchips, with one or more input units, one or more microcontroller microchips, one or more memory modules, and one or more output units. As explained above, input units and output units can be formed in situ of fiber body materials that are arranged in the preform. The microchips have or are provided with electrical contact pads, and are arranged with fiber body material in the fiber preform structure. In a next step 104 electrical conductors are arranged in the fiber preform for a fiber computer power line, a ground line, a clock line, and a data line, or other number of electrical conductors for other transmission, to be put in contact with the fiber computer microchips. These two steps can be accomplished in reverse order or simultaneously. Rather than arranging the electrical conductors in the preform, the conductors can be fed into the fiber preform as the fiber preform is thermally drawn into a fiber, as explained below.

In a next step 106, the fiber preform is thermally consolidated, if necessary, e.g., to form intimate material interfaces between materials arranged in the fiber preform. As explained below, this consolidation step can be conducted multiple times, e.g., after each of fiber body materials, microchips, and electrical conductors are introduced into the preform. Then in a final step 108, the preform is thermally drawn into a fiber computer having a fiber body within which are disposed computer microchips, continuous devices, and electrical conductors connected with contact pads of the microchips. The thermal drawing process produces extended lengths of fiber computer along which are sited the rigid computer microchips and continuous devices, and along which are provided the electrically conducting lines for operating the fiber computer, all internal to the fiber body.

Figure 17:
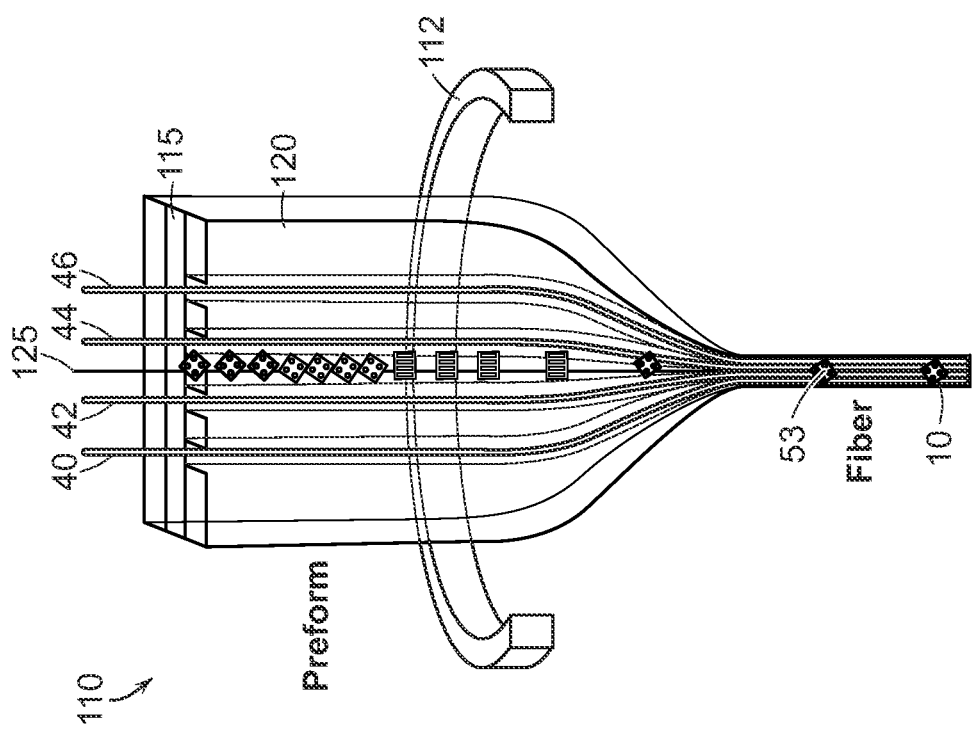
FIG. 17 is a schematic view of the preform of FIG. 16 being thermally drawn into a fiber computer provided herein.
Figure 16:
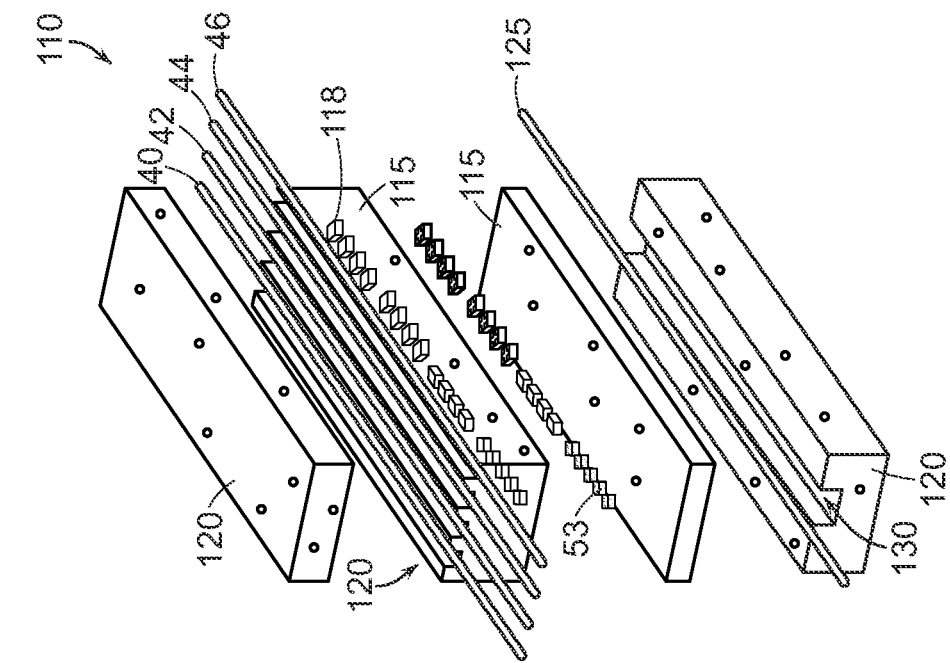
FIG. 16 is an exploded schematic view of a preform assembly for the thermal draw of a fiber computer provided herein.

FIG. 16 is a schematic exploded representation of the components included in an example fiber computer preform 110. FIG. 17 is a schematic representation of the process in which the fiber preform 110 is thermally drawn into a fiber computer 10. As the preform 110 is drawn through a furnace 112 of a fiber draw tower, the preform necks down and is elongated into the fiber computer including computer microchips and internal connections.

In one embodiment, microchips are oriented within the fiber preform to ensure that the correct electrical conductor line is electrically connected to the corresponding contact pad of each microchip. As explained above, there is discovered an arrangement that enables the power line to be connected to the power contact pad of every fiber computer microchip, the electrical ground line to be connected to the ground contact pad of every fiber computer microchip, the data signal propagation line to be connected to the input-output contact pad of every microchip, and the clock signal propagation line to be connected to the oscillator contact pad of every microchip, even though each microchip has very different contact pad arrangements.

It is discovered herein that during the thermal drawing of a preform to cause a preform-to-fiber transition, the electrically conducting lines in the preform remain fixed in position across the transverse axis of the fiber where no microchips are located, but the conducting lines tend to spread out at the site of an object, such as a bond pads protruding from a microchip, that is disposed in the transverse cross section of the fiber with the conducting lines. In other words, along the fiber length, during the fiber draw, the four electrically conducting lines spread away from each other in the transverse cross section. At sections along the fiber length that that do not include microchips, the electrical conductors remain in-line, but at a section of fiber at which a microchip is sited, the wires spread out.

Figure 18C:
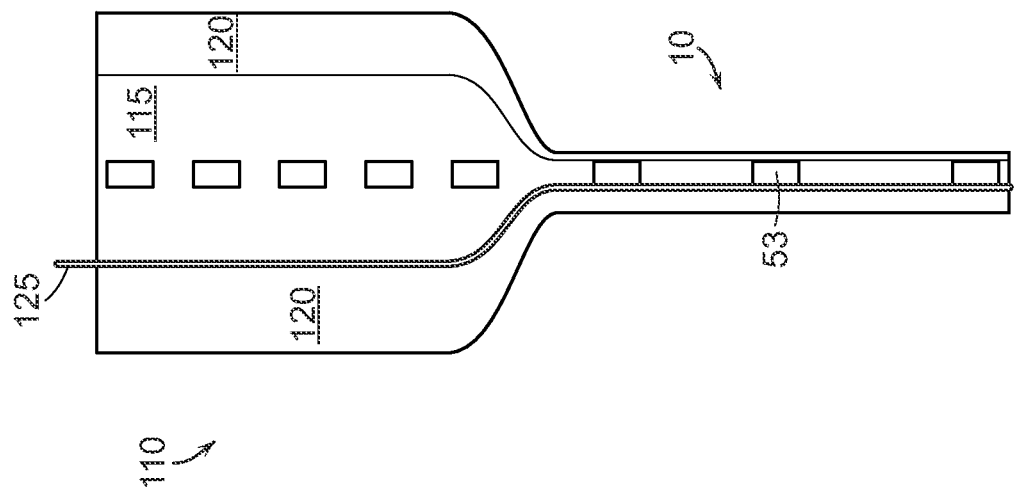
FIG. 18C is an axial cross-sectional view of in-fiber electrically conducting lines before and after making connections to bond pads a microchip in a computer fiber provided herein.

With this discovery, it is determined that the in-fiber electrically conducting lines move outwardly towards microchip contact pads. This phenomenon is shown in FIGS. 18A-18B. As the fiber preform 110 necks down, the lines 40, 42, 44, 46 move outwardly toward the electrical pads of a microchip 53. Through analysis of this phenomenon, there is determined herein the correct orientation of each microchip in the fiber preform to cause conducting lines to match up with the corresponding contact pads of a microchip. This results, as shown in FIG. 18B and FIG. 18C, in the four lines 40, 42, 44, 46, remaining in a fixed, non-varying path along the fiber 10 along fiber computer extents having no microchips, and results in the four lines being correctly connected to bond pads 56 of microchips 53 that are sited along the fiber computer length.

Figure 19A:
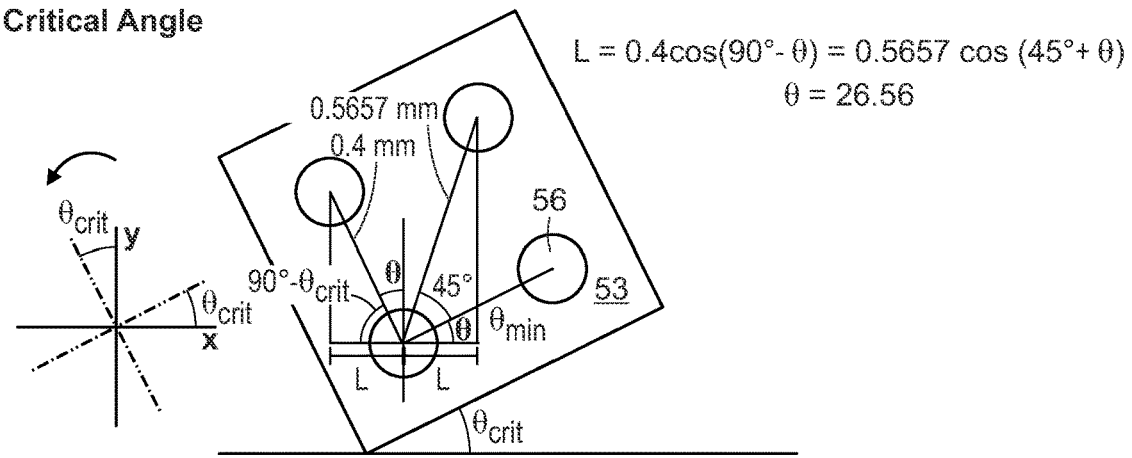
FIGS. 19A, 19B, and 19C are schematic views of a microchip face having four bond pads and the geometric considerations for determining the critical angle, the minimum angle, and the maximum angle, respectively for angular orientation of the microchip in the fiber computer provided herein to guarantee connections of the bond pads to in-fiber conducting lines.
Figure 19B:
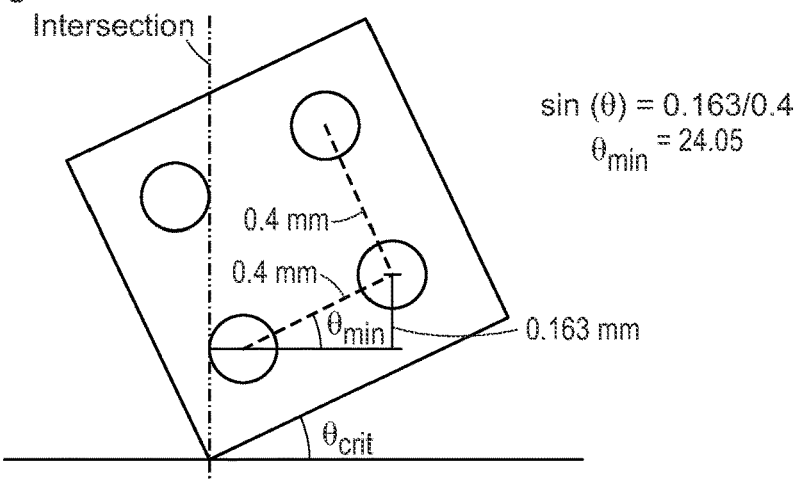
Figure 19C:
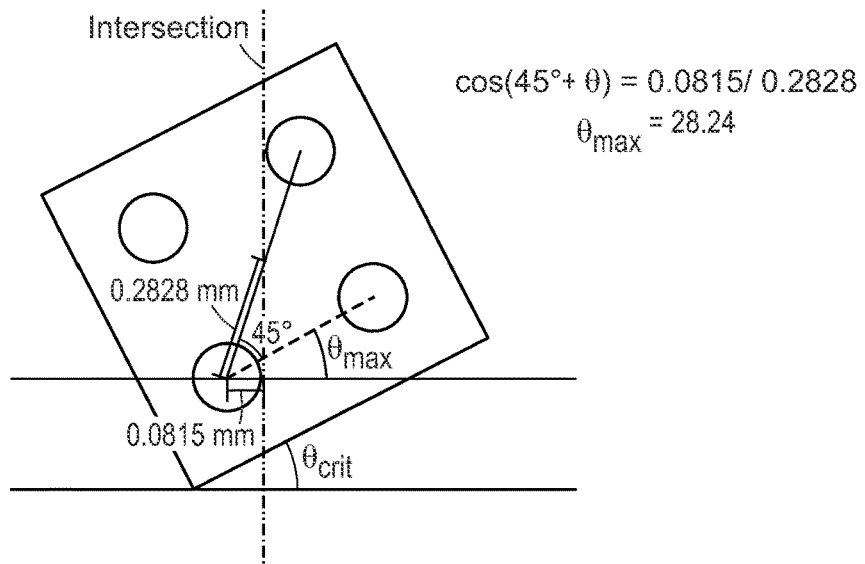

FIGS. 19A-19C illustrate the considerations for this analysis for an example microchip 53 having four bond pads 56. Referring to FIG. 19A, a critical angle, $\theta_{crit}$, is determined for a given microchip based on two considerations. First, it is required that the connection between in-fiber conductors and the contact pads of the microchip be un-shorted, meaning that one conductor alone is connected to one contact pad alone. To achieve this condition, each microchip rotation is set by defining a vertical line down the microchip, as in FIG. 19B, that does not intersect two or more contact pads. Secondly, there is a range of angular values that can achieve the first factor, and therefore, to determine the optimum angular value, it is specified that the microchip orientation causes two adjacent contact pads to be spaced at equidistance from each other in the x-direction. If the microchip is rotated too much, the middle two contact pads will be closer to each other, approaching the maximum angle that meets the un-shorted criterion. If the microchip is rotated too little, the outer two contact pads will be closer to each other, approaching the minimum angle that meets the un-shorted criterion.

In the example shown in FIGS. 19A-19C, a critical rotational angle of 26.56° is determined for the example 4-pad microchip. To determine the critical rotational value, the microchip angle is increased until the x-distance, L, between two adjacent pads are the same. The geometric relationship equating the x-distances is then solved together to determine the critical rotational angle. To find the minimum angle at which the microchip can be rotated while remaining un-shorted, the microchip angle is increased until the edges of the leftmost two pads intersect. The corresponding geometric relation is then solved for the minimum angle. To determine the maximum angle at which microchip can be rotated while remaining un-shorted, the device is rotated until the edges of the inner two pads intersect. The corresponding geometric relations is then solved to obtain the maximum angle.

This angular orientation analysis is completed for each type of microchip included in the fiber computer, to determine the angle at which the microchip is to be placed within the fiber preform for achieving this angle. This analysis is applicable to any number of microchip contact pads and any number of in-fiber electrical conductors. For example, a 6-pad microchip can be connected to six in-fiber lines. Referring to FIG. 16 and FIG. 17, the preform 110 includes an orientation structure 115 in which are provided cavities 118 that are each formed at the selected angular orientation for each microchip of the fiber computer. During the fiber draw, the orientation structure 115 aids in maintaining the desired microchip orientation, for connection with the in-fiber power, ground, clock, and data transmission lines.

The orientation structure 115 also includes channels 120 in which the four electrical conductors are disposed in the fiber preform 110. In preferred embodiments, the channels 120 are sited in the orientation structure closer to each other than would be prescribed by each microchip contact pad position, so that the spreading effect produced by the thermal draw causes the electrical conductors to move to the contact pad positions. This results, as shown in FIG. 18C, in the four lines 40, 42, 44, 46 each shifting, during the fiber draw, to a prespecified position of the resulting fiber computer.

Figure 18D:
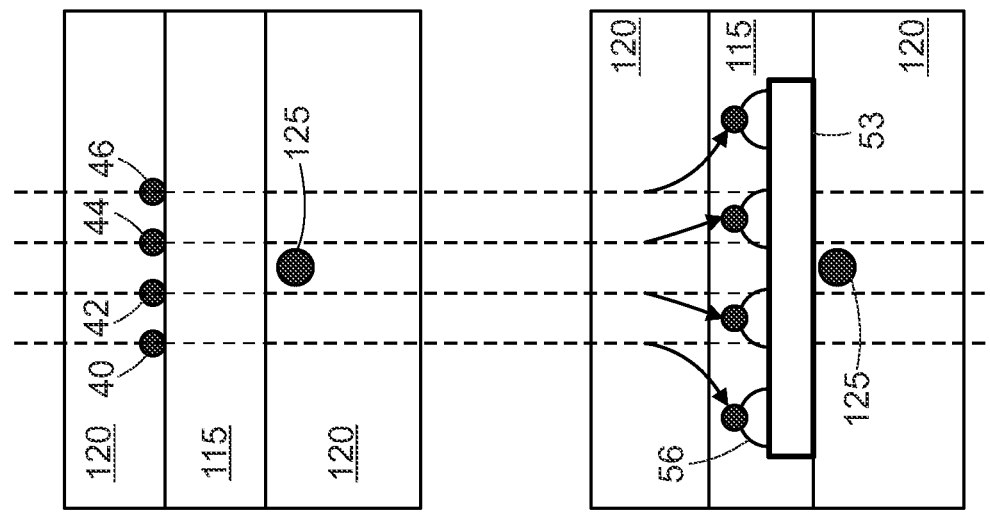
FIG. 18D is a longitudinal cross-sectional view of the preform of FIG. 16 being thermally drawn into a fiber computer provided herein.

It is further discovered herein that a very high-yield electrical connection can be achieved between the in-fiber microchips and the in-fiber electrical conductors with a fiber preform material composition that enables movement of the electrical conductors toward the microchip contacts. In one embodiment of such, shown in FIG. 16, in FIG. 18C, and in FIG. 18D, the fiber preform includes a relatively soft material, such as poly(methyl methacrylate) (PMMA), sandwiched between outer relatively harder material, such as polycarbonate (PC). A sandwich design refers herein to the arrangement of two higher softening-temperature sandwiching material regions outside of one or more lower softening-temperature sandwiched materials. In this way, the sandwiching material is at a relatively higher viscosity than that of the sandwiched layer during the fiber draw. Hence, the outer sandwiching material is said to be a relatively harder material and the inner sandwiched material is said to be a relatively softer material.

The soft sandwiched material can be provided as the orientation structure 115, as well as other internal sandwiched layers 115, such as spacer layers, of the preform. The harder sandwiching material regions 120 are provided adjacent to and outwardly of the inner sandwiched layers 115. With this sandwich configuration, there exists a compressive pressure from the harder material directed toward the softer material during the fiber draw. This compressive pressure pushes the electrical connectors towards the contact pads of the microchips in the axial cross section, enforcing a strong mechanical contact, and hence lower electrical interfacial resistance, between the contact pads and the electrical conductors. In addition, with the support of the harder, and more viscous, material regions 120 around the softer material regions 115, the thermal draw of the fiber computer can be conducted at a temperature that is higher than that which would be employed to draw a homogeneous preform of only soft material. At the relatively higher draw temperature, the softer material, which constitutes a barrier between the electrical conductors and the microchip contact pads, becomes even softer and more susceptible to the movement of the electrical conductors towards the pads. The resulting connections between the electrical conductors and the microchip contact are thereby robust, and the probability that all contact pads of a microchip are in connection with electrical conductors is increased.

In embodiments herein, there can be included a back-support structure for further enhancing the connection of in-fiber microchips with in-fiber electrical conductors. The back-support structure is implemented, in one example, as an elongated wire-shaped structure 125, as shown in FIG. 16, FIG. 17, FIG. 18A, and FIG. 18C. The back-support structure is sufficiently mechanically rigid to provide a hard platform that compresses each microchip, on underlying side of the microchip, while the four electrical conductors are compressed onto the microchip contact pads from the opposite side of the microchip. This compressing effect increases the yield of successful connection between electrical conductors and microchip contact pads. The back-support additionally prohibits tilting of each microchip along the fiber computer length, in the axial cross section of the fiber computer; the back-support straightens each microchip along the fiber length.

In general, in embodiments herein the back-support 125 is provided as any selected I-dimensional structure, including, e.g., ribbon-shaped, disc-shaped, having a cylindrical or oval disc geometry, wire-shaped, or other suitable shape. A ribbon shape, due to its relatively larger area for mechanical support to a planar microchip, can be preferred for many applications to facilitate a particularly stable support to an overlying microchip. The back-support size can range from a few microns to millimeters, and is selected by the desired fiber computer diameter, to maintain the back-support internal to the outer surface of the fiber computer. Under these requirements, back-support material, size, and shape can be any in a wide range of materials, sizes, and shapes, but in general is required to be sufficiently strong and flexible to apply microchip pressure and to be heat-resistant to a selected fiber drawing temperature.

In embodiments herein, one or more types of microchips of the fiber computer embody commercially-available microchips. Employing four in-fiber electrical connectors for power, ground, clock signal transmission, and data signal transmission, there may exist contact pads on microchips that are not to be employed. In one embodiment herein, shown in FIG. 6, a microchip 53 including additional, unused contact pads, e.g., six contact pads 58, can be oriented, e.g., at 45°, so that unused contact pads are not in the path of any of the four electrical conductors.

In other embodiments herein, there can arise a condition in which no angular orientation of a microchip can move unused contact pads out of the path of any of the four conductors in the route of the conductors to connect to corresponding contact pads. This can particularly be the case for microcontroller microchips. Many microcontroller microchips, such as those listed in the Table I above, include a large number of contact pads, for example, sixteen contact pads, but for many applications only the four power, ground, clock, and data lines, or other lines, need to be connected to the microcontroller. In embodiments such as this, there are can be employed any suitable configuration to aid in the connection between a subset of microcontroller contact pads and the electrical conductors running along the fiber computer length.

Referring to FIG. 20A, in one embodiment, a microcontroller microchip 130 including an array 130 of contact pads is adjusted so that only the needed contact pads of the microcontroller 32 are maintained, and the unnecessary contact pads are removed from the chip, e.g., by removal of solder balls. This removal can be done via a heated solder tip or other suitable technique. The remaining contact pads can then be directly accessed for connection to the corresponding one of the power, ground, clock, and data transmission lines.

Referring to FIG. 20B, in alternative embodiments, a microchip-to-electrically conductor interposer 135 is employed. The interposer is implemented as a suitable material, in the form of a thin flexible layer, e.g., approximately 0.05 mm-0.1 mm in thickness, that includes electrical pads disposed on both its top and bottom surfaces. On the interposer, the top electrical pads 136 are arranged to be electrically connected to the bottom electrical pads 138 by way of vias through the layer. The top electrical pads 136 are arranged for ease of connection with the four in-fiber electrical conductors. The bottom electrical pads 138 are arranged in a configuration that matches the pattern of microcontroller contact pads that are to be employed, to make bonds to the microcontroller. The top electrical pads 136 are parallel to each other, in order to match the electrical conductor paths along the fiber, while the lower electrical pads take on a configuration of the microcontroller contact pads to be employed. The interposer-microcontroller combination is arranged in the fiber preform and drawn into the fiber. The resulting arrangement is shown for a microcontroller microchip 32 in FIG. 6. With this interposer arrangement, in combination with the microchip orientation technique just described, and the with the control of the fiber draw process, enables microelectronic microchips of arbitrary contact pad position to be included in the fiber computer.

Turning to particulars of the fiber computer production methodology, in one embodiment, a fiber computer preform 110, FIG. 16, is arranged in a generally rectangular shape, having thickness, width, and length dimensions of, e.g., about 11 mm, 12 mm, and 200 mm, respectively. The fiber body material, including the inner sandwiched material 115, the outer sandwiching material 120, and any continuous device material, is provided as any suitable material or materials that can flow at the selected thermal draw temperature. A reasonable criterion for this condition is that all fiber body materials flow during the fiber draw by having a viscosity lower than about $10^8$ Poise at the selected draw temperature. For example, a polymer viscosity of between about $10^1$ Poise and about $10^8$ Poise can be acceptable, with a viscosity of between about 104 Poise and about 107 Poise more preferred, at the selected fiber draw temperature. All fiber body material preferably retains both its structural integrity and its chemical composition at the fiber draw temperature. Although the fiber body material elongates during the fiber draw, when the fiber body material cools and solidifies the elemental composition of the material in the drawn fiber computer is the same as the elemental composition of the fiber body material in the preform. Because the fiber body material encapsulates the microchips and the electrical conductors along the length of the fiber computer, it can be preferred that the fiber body material be an electrically insulating material. The fiber body material is also preferably transparent to wavelengths of radiation of interest, e.g., for operation of photonic or opto-electronic sensors and/or input/output units of the fiber computer.

With these considerations, the fiber body material can be provided as, e.g., a thermoplastic polymer, a glass, an elastomer, a thermoset, or other material that can flow during thermal fiber drawing. Conventional fiber cladding materials can be employed as the fiber body material, including, e.g., Polycarbonate (PC), Poly-ethylene (PE), Cyclic Olefin copolymers (COC) including elastomeric COC, Polymethyl methacrylate (PMMA) or any other acrylic, Polysulfone (PSU), Polyetherimide (PEI), Polystyrene (PS), Polyethylene (PE), Poly-ether ether ketone (PEEK), polyether sulfone (PES), or other suitable material. Poly-tetrafluoroethylene (PTFE or Teflon™) and other fluorinated polymers or copolymers can also be employed as fiber body materials in configurations in which their characteristically poor surface adhesion properties can be accommodated. While amorphous polymer materials can be preferred for many applications, it is also recognized that some semicrystalline polymers, e.g., branched PTFE, PE, can be employed as a fiber body material. A necessary condition for any suitable polymeric fiber body material is that there exists a fiber draw temperature at which the polymer can be drawn into a fiber at a reasonable speed, e.g., greater than about 1 mm/minute, without decomposition. The fiber body material can also be provided as silica or any glassy material such as borosilicate glass, chalcogenide glass, or other suitable glassy material.

In one embodiment herein, there is employed transparent thermoplastic polycarbonate (PC) as the outer sandwiching material 120, due to its excellent mechanical properties for fiber computer and fabric computer applications and its role of top and bottom outer sandwiching layer during the thermal fiber drawing. As an inner sandwiched middle fiber body material layer there can then be employed poly(methyl methacrylate) (PMMA). PMMA has lower viscosity than PC at a common draw temperature, which provides the relatively soft sandwiched material 115 for the in-fiber electrical conductors to cut through during the thermal draw.

Considering a fiber computer having a fiber body material composition that is entirely polycarbonate and a fiber body material composition with a sandwich PC-PMMA-PC arrangement like that shown in FIG. 16 and FIG. 17, it is discovered herein that the yield percentage of microchip-electrical conductor contact for the prior is approximately 20%, while that of the latter is approximately 90%. In other words, with the use of outer sandwiching layers and one or more inner sandwiched layers, there is achieved a 90% yield of successful connections between microchip contact pads and in-fiber power, ground, clock, and data transmission lines. The fiber computer arrangement herein thereby overcomes the complicated challenge of making in-fiber connections during the thermal draw. Other than PC-PMMA-PC fiber body material arrangement, there are many other material sets that satisfy the sandwich material configuration, like PC-COC-PC, PC-eCOC-PC, PEI-PC-PEI, and PEI-PMMA-PEI.

For any selected fiber body materials, in formation of the fiber computer preform, the fiber body materials are mechanically shaped, e.g., by milling, to produce cavities, or pockets, for holding the microchips, and to produce channels for holding the in-fiber electrical conductors. In preferable embodiments, computer numerical control milling (CNC milling) is employed with a function that produces microchip pockets each having a prescribed microchip angular orientation. In one example, a microchip pocket depth is about 0.4 mm, and pocket dimensions for each microchip are custom-specified; for example, pocket dimensions for a temperature-sensor microchip and memory module are 0.84×0.84 mm and 0.84×0.90 mm, respectively. The intermicrochip spacing can be programmed to any suitable distance, e.g., 1.15 mm. Any number of microchips can be included in the fiber computer preform, including hundreds of microchips and thousands of microchips.

On one face of the soft fiber body material that is to be sandwiched, e.g., a PMMA slab, there are formed the channels for the in-fiber electrical conductors. The channel dimensions are selected based on the dimensions of the electrical conductors to be employed. For example, given a 25 µm-diameter tungsten wire for each in-fiber electrical conductor, then each channel can be formed with dimensions of, e.g., 0.25 mm×0.25 mm×200 mm. The center-to-center distance between channels is for this example about 0.84 mm. The center-to-center distance between channels in the fiber computer preform is discovered herein to be critical for achieving simultaneous and accurate self-aligned connection between in-fiber electrical connectors and the microchip contact pads without electrical short or mismatching. The preferred center-to-center distance between preform channels is determined herein by considering the drawdown ratio from preform to fiber computer and by considering the flow behavior of the electrical conductors around the devices during preform to fiber transition. The ability to make contact to a range of microchips by all four in-fiber lines, as shown in FIG. 6, is achieved by measuring the change from preform to fiber to determine the required channel-to-channel spacing.

When producing the preform pockets and channels, it can be convenient to utilize, e.g., a 0.5 mm endmill for rough and fast milling and a 0.125 mm endmill for fine milling, to ensure that each microchip firmly sits in its pocket at the correct angle. The soft inner fiber body material sections of the preform are preferably substantially centered in the preform sandwich of layers to facilitate a uniform application of force by the outer, harder layers during the fiber draw. Referring to FIG. 16, in one example, a top sandwiching PC layer 120 is a bare slab with a thickness of 4.8 mm, a width of 12 mm and a length of 200 mm and approaches the inner sandwiched layer 115 from the contact pad-side of the microchips. The bottom sandwiching PC layer 120 can have a thickness of, e.g., about 5.2 mm and a length of about 200 mm, and includes a channel 130 for the back-wire 125. In one example, the channel 130 has dimensions of 0.52 mm×0.52 mm×200 mm for a 50 µm-diameter tungsten back-wire. To prevent direct contact of the back-support wire 125 to microchips there is included another layer 115, e.g., a 0.25 mm-thick PC layer, of 12 mm×200 mm, between the bottom PC layer 120 and the inner PMMA layer 115. In further embodiments herein, there can be included an excess outer fiber body material section or sections, e.g., two 50 mm-long PC layer sections, having the same width and thickness as the inner PMMA layer. The excess sections, placed on the left and right of PMMA layer, aid in preventing deformation of this soft layer during the consolidation process, given that at most consolidation temperatures, the viscosity of PMMA is lower than that of PC.

Whatever microchips are included within the fiber computer body, it can be preferable that most, if not all, components, regions, materials, and structures of the microchips do not flow during the thermal draw of the fiber preform into the fiber computer, and it is preferable that the entirety of each microchip withstand the temperature and mechanical stress of the thermal fiber draw process. Semiconducting, conducting, and insulating materials all can be included in the microchips. The microchips can include materials that are polycrystalline, monocrystalline, amorphous, or some combination of morphology or microstructure. But the microchips do not melt or change their dimensions to any substantially extent during the thermal fiber draw process. In one example, this condition requires that at least some or all microchip components and/or materials have a viscosity, at the selected fiber draw temperature, that is much greater than the viscosity of the fiber body materials at the selected fiber draw temperature; a viscosity that is greater than about $10^8$ Poise characterizes this high-viscosity condition of the microchips.

The extent of each microchip in the axial cross section of the fiber computer is less than the cross-sectional extent of the fiber computer; in other words, the microchips sited along the fiber computer length are completely encapsulated by the fiber body material and do not protrude from the fiber computer surface. Because the thermal draw conditions can be adjusted to control fiber body diameter, a wide range of microchip sizes can be accommodated to meet this requirement. The microchips do not reside on the surface of the fiber and do not employ fiber surface materials. The term 'fiber body' is accordingly herein used to refer to a fiber material that encapsulates the microchips within the fiber.

The electrical conductors disposed in the fiber computer for making electrical contact to the microchip contact pads and to continuous device regions can be provided of materials that co-flow with the fiber body material at a common fiber draw temperature, or can be provided of materials that do not flow at the fiber draw temperature. In either case, the conductors are electrical conductive connection media. For materials that do co-flow with the fiber body material, the electrical conductors are preferably formed of a material or materials that melt at the fiber draw temperature. Here, low melting-temperature metals such as Bi—Sn alloys, In-based alloys, Sn—Pb alloys, or any other suitable conducting materials, preferably that are liquid at a selected fiber draw temperature, can be employed.

For electrical conductor materials that do not flow during thermal fiber draw, the conductors can be fed into the fiber during the fiber draw. These conductors can be made of, for example, a metallic material, preferably in a wire form, ribbon form, or other suitable geometry. The wires that are fed into the fiber preferably do not melt during the fiber draw. Example suitable wire materials include W, Cu, Fe, Al, Ti, Cr, Ni, Au, Ag or any other alloys of these materials. In general, any conductive material, including metallic materials, but also including electrically conductive organic and inorganic materials, can be employed. For example, indium tin oxide, lanthanum-doped strontium titanate, yttrium-doped strontium titanate, polyaniline, polypyrrole, PEDOT: PSS, and other materials can be employed. The conductors preferably do not include a surface insulation layer and can withstand the mechanical stress of the thermal draw process.

Whatever material is selected for electrical conductors, the selected material preferably demonstrates sufficient conductivity and mechanical strength and is the correct size for the fiber computer configuration. Wires, ribbons, or other structures to be employed as electrical conductors in the fiber computer preferably do not include an insulating surface layer and preferably can withstand the mechanical stress of the thermal draw process.

For any electrical conductor material provided within the fiber computer, the electrical conductors preferably exist along at least a portion of the fiber computer length, and more preferably exist along the entire length of the fiber computer, connected to the microchips and continuous devices extents along the fiber computer length. To make the electrical connection from the electrical conductors within the fiber computer to elements that are external to the fiber computer, such as a power source, current source, sensing circuit, or computational element, the wires are exposed from the encapsulating fiber body material at an end of the fiber computer, in a manner similar to that employed conventionally for exposing electrical wires that are coated in outer insulation layer, or any method suitable for exposing wires in fibers or cables, e.g., by cutting, chemical dissolution and removal, plasma and laser etching, or other suitable method.

The back-support material to be included for maintaining orientation of in-fiber microchips, is preferably heat-resistant at the fiber draw temperature. For instance, given an outer polycarbonate (PC) fiber body material, then a back-support material of PEI, PS, or a high melting-temperature metal wires such as Cu, W, iron, or nichrome, can be employed. Materials that are low melting-temperature metals or alloys, and relatively soft materials like PMMA or COC, which have lower softening and melting temperatures relative to PC, are not preferred. But for embodiments in which the back-support structure is exposed to the fiber draw temperature for only a short time, e.g., a few seconds, for example, in cases such as fast wire-feeding during thermal drawing, then a lower softening- or melting-temperature material can be used for the back-support.

The back-support is preferably strong and flexible enough to apply pressure towards a stiff microchip during the preform-to-fiber transition. Most metal wires, elastomers, and plastic polymers provide this capability. On the other hand, while silica fibers are strong, they are too brittle and inflexible for use as a back-support, and could result in fracturing of the fiber. In addition, while thin copper wires are flexible, copper is in general is too mechanically weak to apply sufficient pressure towards a microchip, resulting in the breakage of the copper wires.

In addition to the fiber computer microchip components that are included in the fiber preform for incorporation into the fiber computer, the fiber body of the fiber computer can include devices that are formed of preform materials during thermal drawing of the preform materials into the fiber computer. As explained above, by incorporating electrically conducting, electrically insulating, and/or electrically semi-conducting materials in a selected arrangement in a fiber computer preform, there can be formed electronic, optical, and optoelectronic devices disposed through the cross section and continuously along at least a portion of the length of the fiber computer, during the thermal fiber draw. Such devices can be designed, arranged and formed by fiber drawing in the manner taught in U.S. Pat. No. 7,295,734, issued Nov. 13, 2007; U.S. Pat. No. 8,863,556, issued Oct. 21, 2014; and U.S. Pat. No. 7,292,758, issued Nov. 6, 2007; the entirety of each of which is hereby incorporated by reference.

The fiber computer can include a solid core region or a hollow core region, and can include multiple cores, each with a different function and formed of different materials. The fiber computer can transmit optical and electrical signals separate from computer signals of the fiber computer, and can deliver optical and electrical signals. For example, optical transmission elements and/or electrical transmission elements can be included along the fiber length, within the fiber body. Given this wide range of functionality that can be achieved by the fiber computer body, the fiber computer preform can be arranged to include any suitable semiconducting, electrically insulating, and electrically conducting materials in a configuration of electrical and/or optical devices and/or transmission channels or in a configuration that forms electrical and/or optical devices during the fiber draw. The preform can have a circular, rectangular, or other thermally-drawable cross-sectional geometry. An outer fiber cladding layer can be deposited, wrapped, or otherwise applied to the surface of the preform arrangement. Other surface materials, including jacket materials, can be included as-desired for a given application.

Once a suitable preform is assembled, the preform is consolidated. In embodiments in which the electrical conductors are to be fed into the preform during the fiber draw, there can be inserted a spacer material, such as a Teflon™-coated wires, into the conductor channels in the fiber body material. This preserves the channel geometry during the consolidation. In embodiments herein, the preform can be consolidated, e.g., at a temperature of about 186° C. for a duration of about 55 min.

The electrical conductors can be fed into the consolidated preform, after consolidation and spacer removal, and more specifically, can be fed into the open preform channels as the preform is fed into a fiber draw tower, as shown schematically in FIG. 17. Spools of conductors can be employed to provide the lines 40, 42, 44, 46 for introduction into the preform. In preferred embodiments, the four electrical connections and the back-support 125 are fed into the preform during the fiber draw.

In one example thermal fiber drawing process, a draw tower is configured in a conventional three-zone draw setup, with, e.g., top zone temperature, middle-zone temperature, and bottom zone temperature each between about 100° C. and about 500° C. The middle-zone temperature should be the highest of the three zone temperatures, and is considered to be a stated draw temperature. One or more drawing zones are sufficient if three are not available. The drawing temperature should be primarily selected based on the outer fiber body material to be used. The higher the glass transition temperature of the outer fiber body material to be used, the higher the required draw temperature. In order to start the bait-off process and successfully draw fiber, the oven temperature must meet the glass transition temperature of the fiber body material. The drawing temperature is in general lower than the bait-off temperature; a middle zone bait-off temperature can be, e.g., about 270° C. A successful drawing temperature can depend on the preform dimensions as well as the room temperature. In preferred embodiments, the draw temperature is that which maintains the stress level of the drawing fiber be in the range of 50 grams/mm$^2$–100 grams/mm$^2$. For example, for a PC-PMMA-PC fiber body configuration, a drawing temperature between about 230° C. and about 250° C. can be preferred.

Example outer fiber body materials and corresponding middle-zone fiber drawing temperature ranges are as follows: PC-draw temperature between about 145° C. and about 400° C.; PSU-draw temperature between about 180° C. and about 400° C.; PEI-draw temperature between about 217° C. and about 400° C.; PE-draw temperature between about 100° C. and about 400° C.; COC-draw temperature between about 70° C. and about 400° C.; PMMA-draw temperature between about 85° C. and about 400° C.; PS-draw temperature between about 100° C. and about 400° C.; PEEK-draw temperature between about 140° C. and about 500° C.; and PES-draw temperature between about 200° C. and about 500° C. Other fiber body materials and fiber draw temperatures can be employed as-suitable for a given application. In one example of a PC-PMMA-PC fiber body combination, a draw tower temperature profile having a top-zone temperature of about 110° C., a middle-zone temperature of 248° C., with a bait-off temperature of about 270° C., and a bottom-zone temperature of about 110° C. is employed.

It is discovered herein that for thermal draw conditions which produce a relatively high in-fiber stress level, the thermal draw process can cause in-fiber microchips to favor a square, 90° alignment, not the prescribed rotational orientation of the fiber preform arrangement. Conversely, for thermal draw conditions which produce a relatively low in-fiber stress level, there can be induced random flow perturbations that randomly re-orient in-fiber components, leading to a random distribution of microchip orientation angles. To preserve the microchip orientation angle from preform to final fiber computer during the thermal draw, there is discovered herein an optimal range of stress values, or tension, of 50-100 grams/mm$^2$, that enables the preservation of fiber computer componentry and electrical connections. In embodiments herein, a preform feed rate of about 1 mm/min and capstan speed of about 0.207 m/min are suitable, with a fiber production speed of about 10 m/min.

To further preserve the orientation and angle of microchips in the preform as the preform is thermally drawn into a fiber computer, the draw-down ratio is preferably selected based on the fiber body materials. In one example, the selected draw-down ratio is about fifteen. In general, if the draw-down ratio is too high, microchips will tend to reorient to a 90° square orientation during the thermal draw process. The draw down ratio is considered based on the stress in the higher glass transition-temperature fiber body material, which is the outer material.

TABLE II

DRAW DOWN RATIO AND STRESS OF FIBER BODY MATERIAL

| Outer Fiber Body Material | Draw down ratio* | Stress (g/mm$^2$) outer fiber body material |
|---|---|---|
| PC | 10-100 | 50-100 |
| PMMA | 10-100 | 75-125 |
| PEI | 10-100 | 50-100 |
| COC (8007-S grade) | 10-100 | 100-150 |
| eCOC (E140 grade) | 10-100 | 20-40 |
| SEBS | 10-100 | 15-30 |

If solid power, ground, clock, and data transmission lines and a back-support wire are guided into the preform during the draw, the tension to be used is highly dependent on the turn of the wire spool, given that the spool will oscillate according to the spin of the spool. In the draw, solid wires that are inserted into the preform can be tied to the bate-off weight of the preform. Once the bate-off occurs, the fiber body material clamps around the wires and wires become embedded in the fiber body material. The wires are pulled into the preform from a spool just by the pulling on the fiber through the draw tower, since the lines and wire are embedded inside the fiber and do not slip. No external feeding mechanisms are required, although use of ball bearings or a feeding motor can be employed, if desired, to decrease the stress fluctuation, since there is no dependence on spool spinning intervals.

Considering production of the fiber computer configuration of FIG. 7, in which the fiber computer includes an in-fiber power supply, the fiber draw process described above can be employed for producing the domain of the fiber computer including microchips and interconnections. The domain of the fiber including a battery, supercapacitor, or other power source is similarly produced by thermal fiber draw, in a separate draw process tailored to the composition of the power source materials, as prescribed by U.S. Patent Application Publication No. 2020/0028198, published Jan. 23, 2020, the entirety of which is hereby incorporated by reference.

Referring back to FIG. 7, once the power source domain is thermally drawn and a domain including computer microchips and interconnections is thermally drawn, then the final fiber computer is thermally drawn. In one embodiment provided herein for this process, each of the power source and microchip domains are fed into an assembler preform as the assembler preform is thermally drawn. The assembler preform includes channels for the domains, in the manner of the electrical conductor channels in the preform of FIG. 16. During the draw, the assembler preform material at the edge of the channels converges around the domains fed into the channels. This draw process can be extended to produce the fiber computer including a continuous device domain, like the battery domain 60, that is a continuous material-device, such as an input sensor, an output device, or other device.

The assembler preform includes fiber body material that preferably has a glass transition temperature that is lower than that around the domains fed into the assembler preform. For example, if the fiber domain having microchips includes PC fiber body material and the fiber domain with a battery includes COC fiber body material, then elastomeric COC, having a comparatively lower glass transition temperature, and therefore requiring a comparatively lower draw temperature, can be preferred as the assembler preform body material. This lower draw temperature is preferred so that the fiber microchip domain and the fiber battery domain are not melted, softened, or broken during the draw. PC and COC require a draw temperature of about 1800 and 240°, respectively, while elastomeric COC is drawable at about 140°. The final fiber computer fiber body material, at the surface of the fiber computer, therefore preferably has a lower glass transition temperature than fiber body material more internal to the fiber computer, to achieve this condition.

In the thermal draw of the fiber computer with in-fiber battery, it can be preferred to operate with a draw down ratio that ensures that the fiber microchip domain and the fiber battery domain each achieve an interfacial fusing with the assembler preform fiber body material. The diameter of the fiber microchip domain and the diameter of the fiber battery domain should each be at least the diameter of the channel into which each is fed, after the draw, and can be larger, e.g., 1× or 1.2× larger. But if the diameters of the domain fibers exceed the channel diameters by more than a factor of about 1.2, over-converging can occur, which can break the fiber. Conversely, if the diameters of the domain fibers are less than the diameter of the assembler preform channels, then pre-converging can occur, resulting in an air gap within the assembled fiber computer. The draw down ratio is therefore preferably selected to achieve the level of interfacial fusing that produces functional fiber computer componentry. The capstan speed and down-feed speed can be any suitable speeds, e.g., a capstan speed of about 0.4 m/min and a down-feed speed of about 1 mm/min.

The thermal draw of a fiber computer including in-fiber computer microchips that are automatically connected to in-fiber power, ground, clock, and data transmission lines enables the integration of computers and digital computation into fabrics, woven and non-woven textiles, cloth, and other such materials, and presents enormous opportunity to address a wide range of fiber-based applications. Of particular importance is the high mechanical flexibility and the long lengths achieved by the thermally drawn fiber computer. Even with planar, rigid microchips disposed along a fiber computer length, the fiber computer maintains significant mechanical flexibility and thus is a weavable or knittable yarn or textile fiber, meaning that the fiber can be employed in textile fabrication processes, like weaving, that are designed to employ conventional yarns, fibers, filaments, or thread. "Wearable" computers thus are truly wearable with the in-fiber digital computer achieved herein.

The capability of the fiber computer to interpret digital logic enables the fiber computer and fabric computer to read and write binary information, in and out of the fiber computer and fabric computer, via digital signals communicated through the data signal transmission line. FIG. 21A is a plot of binary information, here the word 'memories', sent in and out of an experimental embodiment of the fiber computer produced in the manner described above. The clock frequency was set at 100 KHz. The signal spike at the end of the letter 'r' is due to the reflection of the signal at the end of the fiber computer back to the fiber computer output.

After machine washing this fiber computer in ten cycles of a washing machine, the fiber computer performed just as well, as shown in FIG. 21B. Mechanical bending of the fiber computer to a curvature radius of 12 mm similarly did not result in any data loss, as shown in FIG. 21C; the fiber computer retained a sharp on-off voltage switching performance with no loss in stored information. This demonstrates the robustness of the fiber computer and fabric computer interconnects and their successful use in fabric computers. Indeed, it was found that the fiber computer and fabric computer withstands 100 washing cycles with little degradation in voltage sharpness and with absolutely no loss in memory information.

Figure 22:
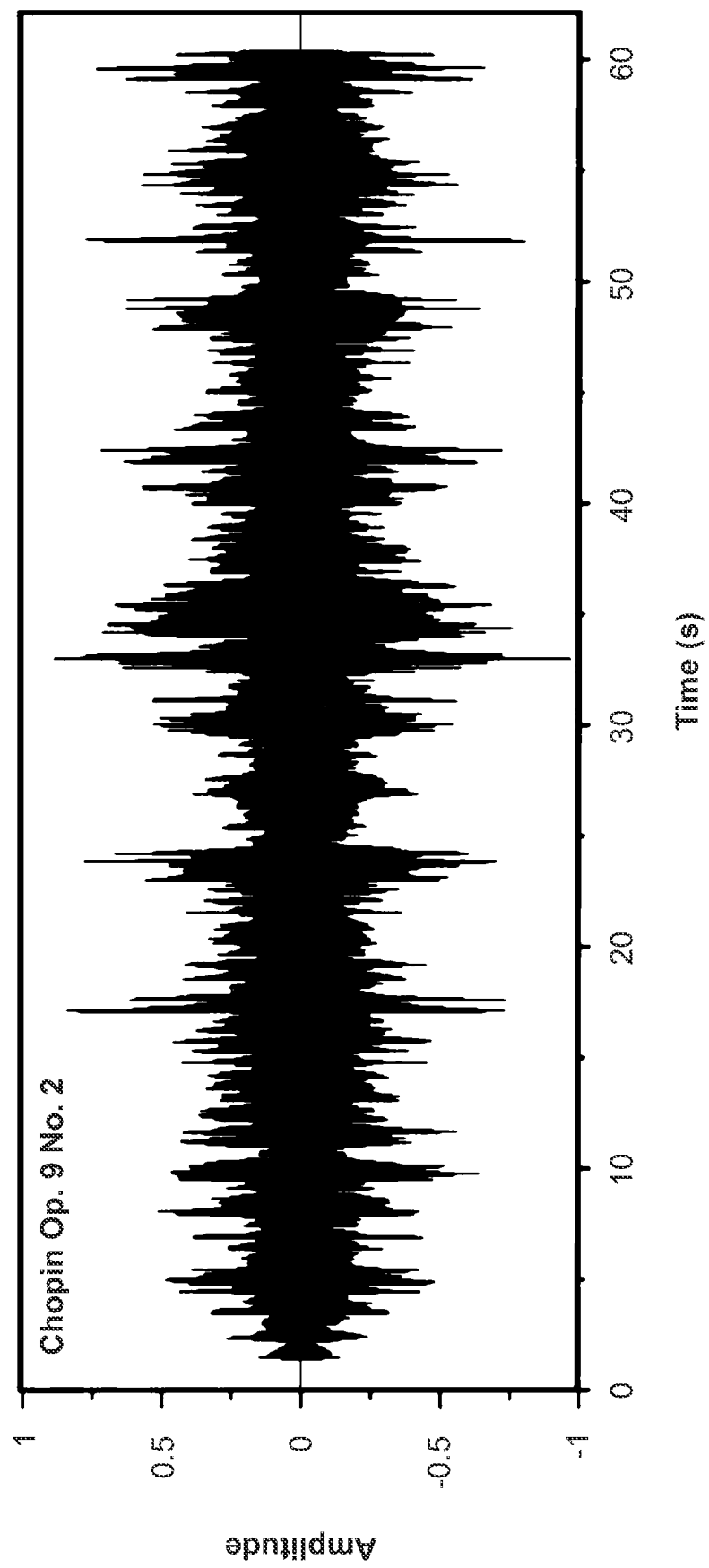
FIG. 22 is a plot of signals representing the digital storage of music as-read out of a fiber computer provided herein.

Data that is input to a fiber computer or fabric computer herein can be partitioned into data segments, with different data segments stored at different memory modules and/or memory locations of the fiber computer or fabric computer along the computer length. In one example of such, FIG. 22 shows a plot of about 0.5 Mb of music read out of the memory of a fabric computer. After storage of the Chopin Op. 9 No. 2 piece in the fabric computer memory modules for two months, with no power supplied to the memory modules, the fabric computer produced the data as-shown. This demonstrates that fabric computers can be integrated into garments and other functional structures for long-term computer operation in the garment or other functional structure. To achieve this music storage in the fabric computer, the music was first pre-processed to 16 bit-values at a sample rate of 4000 Hz. The 16 bit-values were then transmitted over the in-fiber data transmission line to the memory of the fabric computer. The visualization of the stored music data in FIG. 22 was produced with a platform such as the open-source digital audio editor and recording application software Audacity.

The fiber and fabric computers herein further enable storage of video as well as music in a fabric. In an example of such, the frames of a video are split into separate video frames, and the RGB intensity value, between 0 and 255, of each pixel of each frame, is input to the fiber computer or fabric computer, e.g., in a list format. Each intensity value can be represented by, e.g., one byte, which is stored by a single memory address within an 8-bit memory module of the computer, such as an EEPROM. At a later time, months or years later, the data can be read out of the EEPROMs. The intensity value list can then be reconstructed into individual RGB frame data. Almost 100,000 RGB pixel values can be stored in one meter of fiber computer. As a result, a fabric computer can store within, e.g., a single fiber or in a garment, an extensive video length. Such could not be achieved with conventional analog fibers. Analog fibers inherently result in attenuation of signals and are more susceptible to noise and drift, creating corruption and loss in data across centimeters of fiber length. In great contrast, a signal to noise ratio of at least about 100 is provided by the fiber computer herein, reflecting the required fiber computer 'on' voltage over the standard deviation of noise. As a result, the fiber computer and fabric computer can detect and process signals over very large lengths, such as 5 m or greater, of the fiber computer extent.

The digital logic-based fiber and fabric computers also provide higher switching performance and a lower power requirement than conventional fiber. Digital switching from a '0' value to '1' value requires only about 3.3 V in the fiber computer herein. This is about two orders of magnitude lower than that required by conventional field-effect fiber devices. Further, the power consumed by write and read functions is about 5.5 mW, as compared to 475 mW power consumption by conventional ovonic-switching fibers.

The digital logic implementation of the fiber computer enables the fiber computer to perform operations similar to the multifunctions of the human body in detecting, communicating, analyzing, and memorizing information via neuronal signals in the nervous system. In embodiments herein, the fiber computer includes, within the fiber body, one or more digital combinatorial logic circuits, logic microchips, and stored logic programs. In one embodiment herein the fiber computer enables an example of such with one or more fiber computer input units that are temperature sensors; the fiber computer conducts sensing, analyzing, and storing of information about the temperature of the environment of the fiber computer. Analog temperature stimuli external to the fiber computer are detected and converted to a digital signal within the fiber computer. The digital signal values are processed by the microcontroller and communicated to the fiber computer memory modules, with output information provided to a user.

Figure 23B:
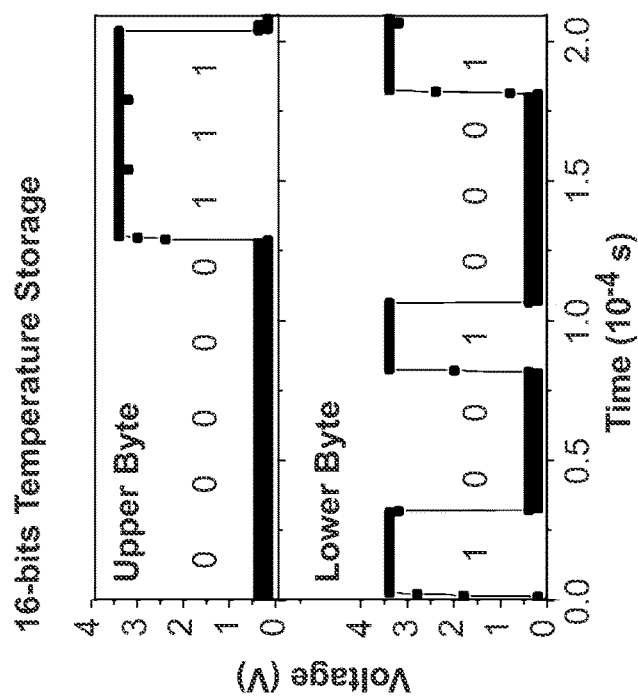
FIG. 23B is a plot of 16-bit digitized temperature measurements produced by the fiber computer provided herein.
Figure 23A:
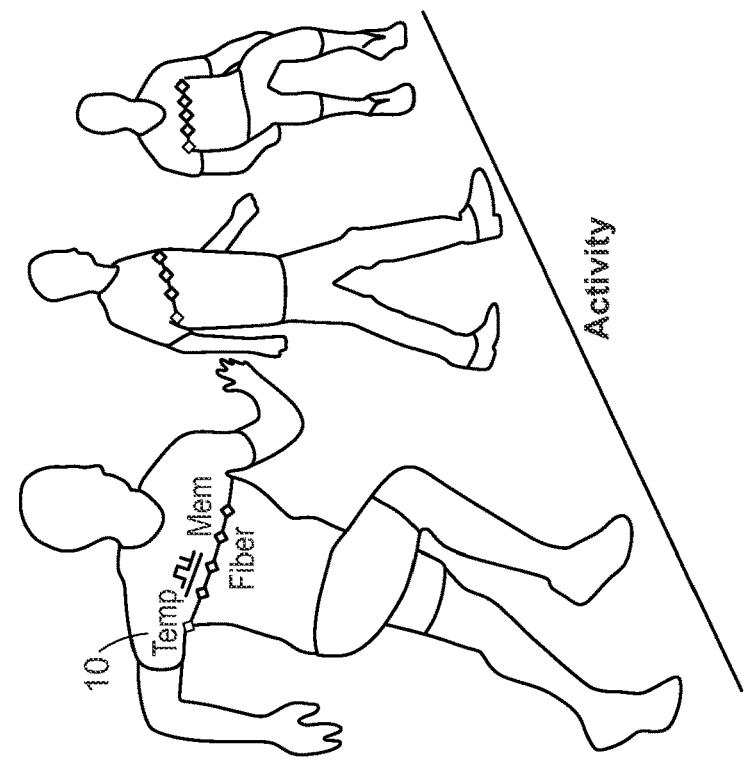
FIG. 23A is a schematic representation of a user wearing a garment fashioned out of the fabric computer provided herein during various activities.

As a result, as shown in FIG. 23A, with the fiber computer 10 integrated into a garment, as a fabric computer, the computer can provide information and analysis of human activity both in real time and as data for future analysis. The fabric computer thereby embodies a digital fabric assistant for a range of applications, including, e.g., personalized health monitoring, human activity recognition, and autonomous physiological feedback. In personalized health monitoring, the fiber computer, configured within the construction of a garment's fabric, as a fabric computer, remembers the garment wearer's body sensory inputs. Due to the mechanical flexibility, water-resilience and high signal-to-noise ratio of the fiber computer, the fabric computer is highly suited as a skin-interfaced computer for extracting and analyzing useful body information such as temperature. For example, core body temperature can be stably collected from placement of the fiber computer at garment sites at which it is conventionally inconvenient for temperature monitoring, such as under the armpits, which constantly experience high mechanical strains such as cyclic movements from walking and running, and chemical agitation such as sweat.

Figure 23C:
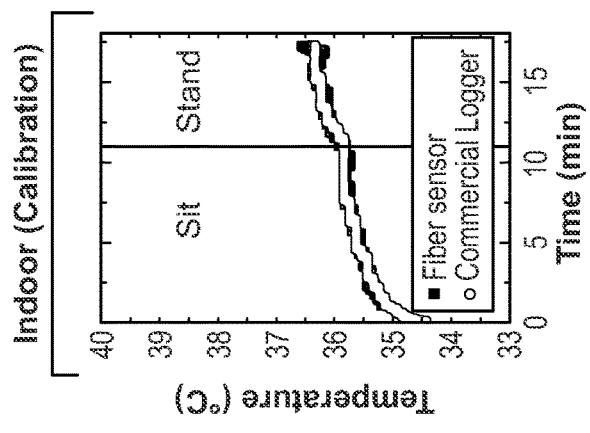
FIG. 23C is a plot of digitized temperature measurements produced by the fiber computer provided herein and compared with the temperature measurements produced by a commercial thermal logger.
Figure 23D:
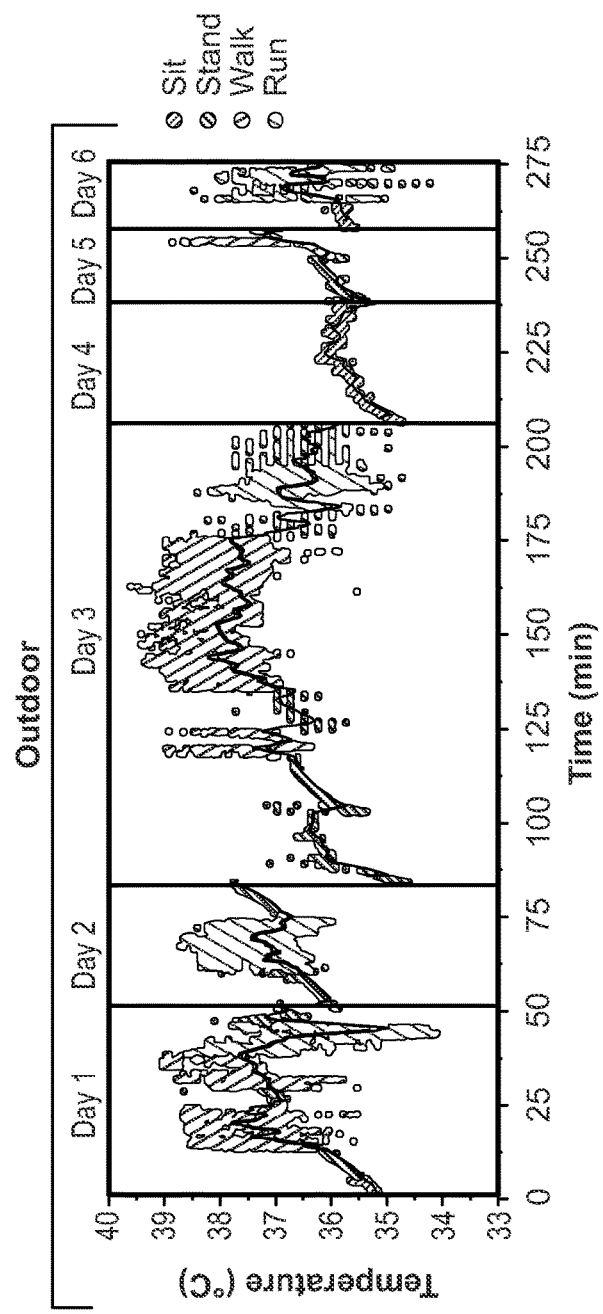
FIG. 23D is a plot of digitized temperature data produced and stored by the fiber computer provided herein.

FIG. 23B is a plot of an example 16-bit digitized temperature measurement acquired and produced by the fiber computer. This reading corresponds to a value of 1937 in decimal form, which is converted to the correct form of 19.37 during data analysis. FIG. 23C is a plot of acquired, digitized, and stored temperature measurements produced by the fiber computer, as-calibrated with a commercial logger in an indoor environment. The temperature-time plot produced by the fiber computer closely matches that of the commercial logger. FIG. 23D is a plot of in-fiber temperature data stored over time. The data is correlated to different activities, namely sitting, standing, walking and running, and can be further processed and analyzed by the fiber computer.

The entire temperature data in-take, data recording, and data processing by the fiber computer is untethered and can be employed in any environment without intruding upon daily activities. In addition, the data is collected and memorized, continuously from the same fiber computer, over extended durations of time, enabling functions such as determination of normal average body temperature of the user across different activities; healthcare applications where patients and users are required to track core temperature, outside of hospital settings, to prevent conditions such as infection, fever and inflammation are thereby enabled by the fiber computer. Moreover, this collected data details markers such as cooling from sweating during running, a useful indicator for sports and military applications where users need to ensure that body sweating occurs to prevent heatstroke. All such biometric data are stored locally within the user's clothing and are not wirelessly communicated to the cloud or any central database, hence ensuring that the privacy of the user is preserved.

Figure 24:
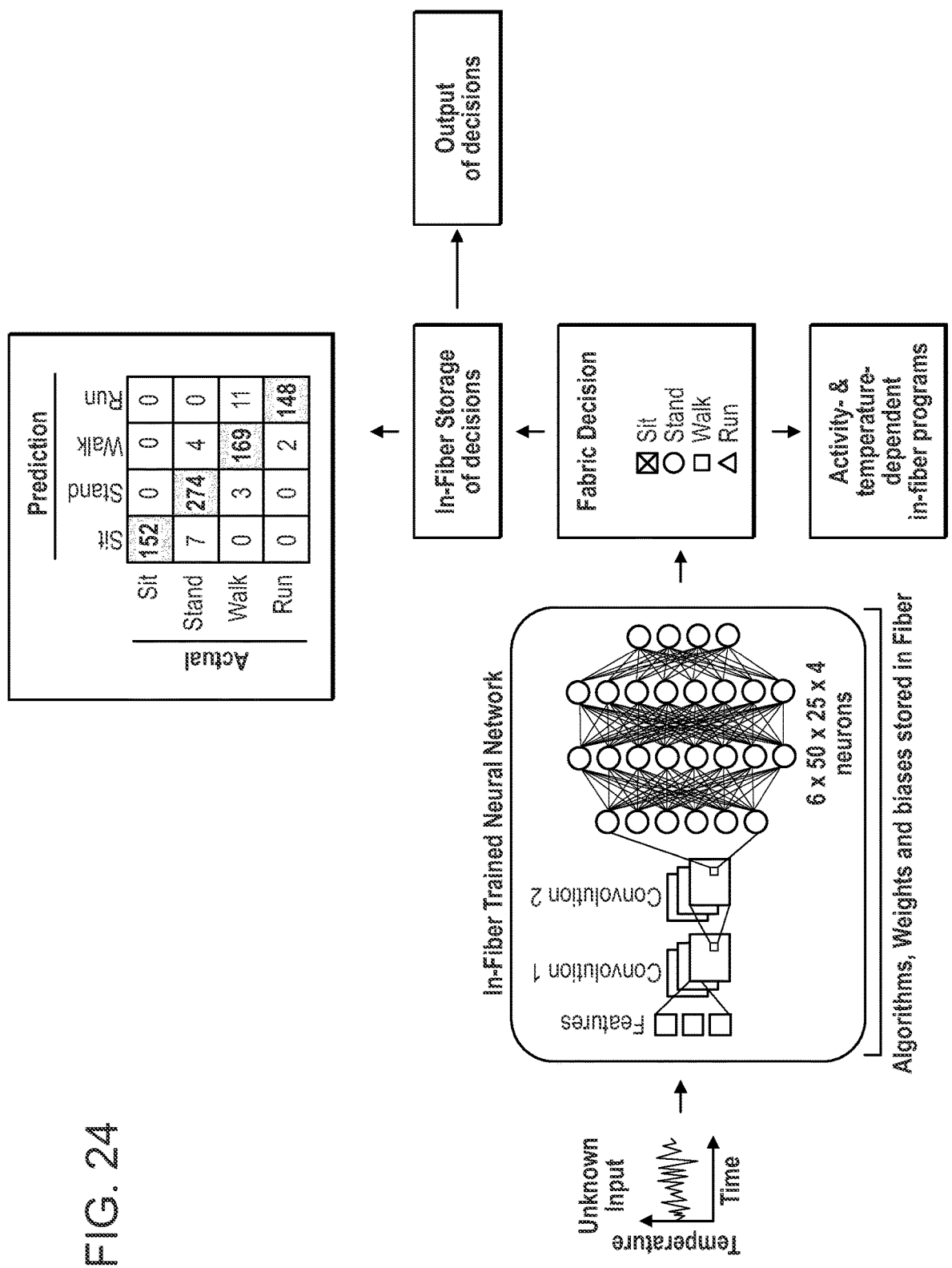
FIG. 24 is a schematic representation of an in-fiber trained neural network stored in the memory of a fiber computer provided herein and the input and outputs for the fiber computer employing the neural network for decision making.

Processing, analysis, and manipulation of external stimuli are enabled by the fiber and fabric computers with advanced in-fiber logic capabilities. The large amount of biomedical data that can be collected into the fiber and fabric computers allow for the training of the fabric memory to learn about and analyze the signatures of sensory inputs. In one embodiment of such provided herein, the fiber computer includes, within the fiber body, one or more neural networks, and therefore embodies a fiber neural network. The neural network is programmed, trained, and stored within the fiber extent. The in-fiber trained neural network is employed for data analysis, decision making, and user output. Referring to FIG. 24, in an example of such, a neural network of 50 and 25 neurons, together with convolutional pre-processing layers, is programmed to recognize and differentiate different human activities in real-time.

As shown in FIG. 24, in an example of the operation of such, an unknown temperature input is measured in real time and input to the fiber computer by, e.g., a thermistor input unit. The fiber or fabric computer memory then performs programmed operations on the measurement. In one example, selected features, such as standard deviation (STD), averaged positive difference (PCX), and averaged negative difference (NCX), are calculated from the external measurement. Next, these three input features are fed into two sequential layers of convolution with six filters, before flattening and max pooling. The outputs are then fed into an in-fiber neural network of any suitable configures.

In one example embodiment, the in-fiber neural network, as shown in FIG. 24, includes two layers. These layers are programmed to produce a decision to recognize and differentiate between different selected activities, here sitting, standing, walking, and running. The fiber computer then provides a decision as to the activity that is indicated by the measured temperature input. This decision is stored in-fiber and is output from the fiber computer as an indication for the user, in any suitable output format as described above. The resulting data can be further analyzed in-fiber; for example, as shown in FIG. 24, the accuracy of the fiber computer activity recognition can be analyzed in a prediction table, here indicating an average accuracy of about 96%.

To train an in-fiber neural network, any suitable methodology can be employed. In one embodiment herein, training data that is input to the fiber computer, e.g., user temperature measurement, is identified according to the decisions of interest, e.g., different activities. In one example, input stored data can be segmented into sections of desired durations, e.g., split into sample sections of consecutive 12 second-duration, with an overlap of 6 seconds between each section. Each 12 second-section includes 24 data points for a temperature measurement that is logged every 0.5 seconds. For each data section a number of features, e.g., three features, are calculated, standard deviation (STD), average positive difference (PCX), and average negative difference (NCX). The average difference is computed by first computing the difference between the n and n+1 temperature values. If the value of the difference is positive, the value is set in a 'positive' list from which the list average is calculated to be PCS. If the value of the difference is negative, the value is set in a 'negative' list from which the list average is calculated to be NCX.

In this current example, to train the in-fiber neural network, 1794 sections are labelled with their corresponding activity for input to the neural network. Any suitable neural network can be arranged; for example, a 1D convolutional neural network (CNN). In one embodiment herein there is provided in-fiber a CNN with two convolution layers, max pooling, flattening, and four neuronal layers. As shown in FIG. 24, the inputs to the CNN are the features, STD, PCS, NCS. The 1794 sections are split into 90% training data and 10% validation data. 1000 epochs can be used, stopping where there are signs of overfitting, i.e., when the train loss curve diverges away from the validation loss curve. In one embodiment, both convolution layers have a filter size of six and a kernel size of one; the activation type is ReLu. For max pooling, the pool size is, e.g., 2. In one embodiment, as shown in FIG. 24, the first layer includes six neurons, the second layer includes fifty neurons, the third layer includes 25 neurons, and the fourth layers includes four neurons, with all four layers utilizing ReLu as the activation function.

The four fabric computer decision outputs in this example, sit, stand, walk, run, are converted into probabilities by the softmax function. The neural network can be optimized using the categorical cross-entropy loss function and Adam Optimization Algorithm. In preferred embodiments, the above parameters are optimized to fit the model within the data storage capacity of the in-fiber computer memory modules, and are optimized to reduce decision-making latency while preventing accuracy loss that could result from over-compression. For example, the STD, PCX and NCS features can be preferred, rather than other statistical measurements, because they result in the highest accuracy for a relatively small neural network size. After training, the trained neural network weights and biases are compressed, e.g., to two significant digits, to reduce the in-fiber memory requirements.

The resulting compressed neural network, including mathematical equations for features selection, including weights, biases and ReLu functions used in the convolutional filters, including the microcontroller program instructions for matrix multiplication and addition, and including the weights and biases for the network, e.g., for the 6×50× 25×4 neural network layers shown in FIG. 24, are all stored in-fiber in memory. The prediction accuracy shown in FIG. 24 can be obtained by, e.g., inputting test data through the compressed in-fiber neural network and comparing the fiber computer output with actual activity information. In the example shown in FIG. 24, 770 test sections were employed for the activities shown.

The fiber computer provided herein thereby in one embodiment includes a fiber computer input unit, one or more neural networks, and a fiber computer output unit that communicates output information, controls output action, or presents user directives based on the neural network processing. The fiber neural network provided herein is in a one-dimensional form of, e.g., a strand, that can be integrated into any suitable structure, including garments, and any application of textiles, as well as other applications. With in-fiber power supplied to the fiber neural network, the fiber computer provides a stand-alone, portable fiber neural network that can be easily employed in the natural environment.

Figure 25:
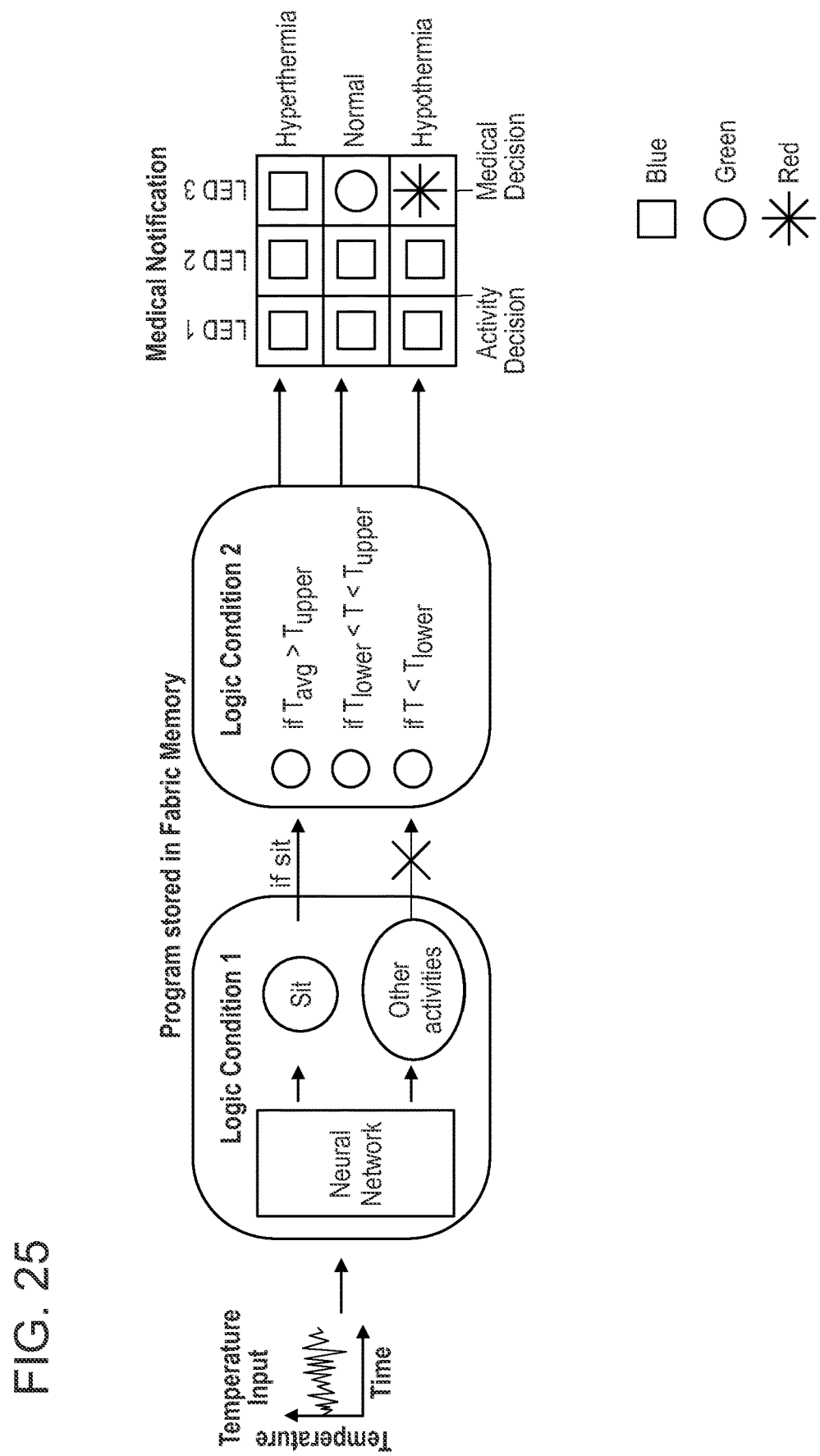
FIG. 25 is a schematic representation of in-fiber logic conditions stored in the memory of a fiber computer provided herein and the input and outputs for the fiber computer employing the logic conditions for decision making.

In embodiments herein, the information output from the fiber computer to the user for indication of the data analysis by the computer, e.g., activity state and health status corresponding to temperature measurement, can be provided with in-fiber computer output units. For example, fiber computer output LED units can be employed to alert a user to various conditions. Different LED colors from the fabric thereby can indicate different output decisions, e.g., Blue-Blue representing 'Sit', Blue-Green representing 'Stand', Blue-Red representing 'Walk' and Green-Red representing 'Run'. By recognizing the human activity, decisions on users' health can then be predicted more accurately. This can be extended to any selected medical notification, thereby provided personalized medicine to the fiber computer user. For example, referring to FIG. 25, with in-fiber computer logic-processing of temperature input, the fabric computer recognizes that a user is sitting, and based on learned knowledge about a user, can predict or alert for selected health conditions, such as fever and inform users of their health status. For instance, output LEDs can light up green for normal body temperature, red for high body temperature, e.g., hyperthermia, and blue for low body temperature, e.g., hypothermia.

Figure 26:
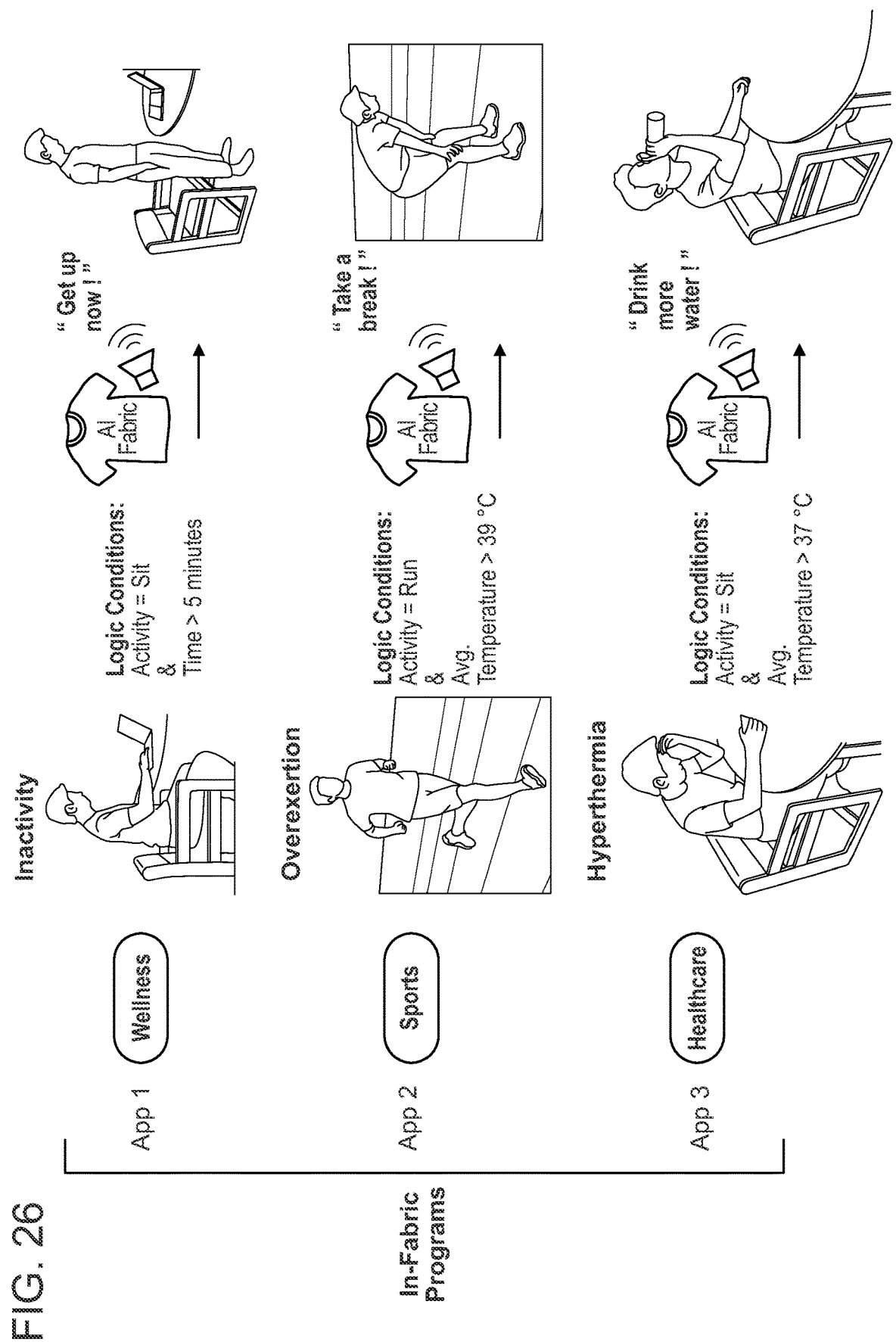
FIG. 26 is a schematic representation of the digital logic, decision making, and output of an in-fiber wellness application, in-fiber sports application, and in-fiber healthcare application, supported by a fiber computer and fabric computer provided herein.

This paradigm is expanded herein for a wide range of wellness, sports, and healthcare embodiments. Referring to FIG. 26, the fiber and fabric computers are in embodiments herein programmed with any of a selected software application (app) to implement an autonomous fabric assistant with the fiber and fabric computers. In a first example, a fiber or fabric computer is installed with an app for wellness, providing programming of the fiber or fabric computer for AI-fabric to determine if an AI-fabric wearer is inactive, e.g., sitting for an extended duration. The fiber or fabric computer output autonomously prompts the wearer with a voice command to get up from his seat or move around. In a second example, the fiber or fabric computer is programmed with an app for sports, in which the AI-fabric automatically recognizes, e.g., that an AI-fabric wearer is running, and starts interrogating the wearer's core temperature. Upon measurement of an average temperature that is higher than the a prespecified running temperature, and therefore that indicates heat exhaustion, the AI-fabric prompts the wearer to stop and take a break. In a third example, the fiber or fabric computer is installed with an app for healthcare, in which the AI-Fabric predicts potential dehydration, hyperthermia, or fever.

The fiber and fabric computers can be programmed to enable highly sensitive and highly accurate indication of the fabric wearer's state. For example, dynamic activities such as walking or running increase the rest state-body temperature, and a measurement of such could result in an inaccurate indicator of hyperthermia. The fiber or fabric computer can prohibit this occurrence by recognizing that the AI-fabric wearer is sitting and continuing to compare the wearer's core temperature with the normal rest-state body temperature. Upon sensing that the temperature is higher than the normal average temperature, the AI-fabric prompts the wearer to drink more water. It is the inclusion of memory modules, that enables the fiber and fabric computers to make intelligent measurements, such as average measurements. For example, a baseline, "normal" fabric wearer temperature for different activities can be determined by the fiber and fabric computer by averaging multiday data for the activities as-memorized by the fiber and fabric computer. Thus, baseline temperature values can be personalized to each wearer. As a result, the fiber and fabric computers provide highly customized, autonomous, intelligent, and real-time computing for an individual user.

With the description above and the accompanying figures it is demonstrated that the fiber and fabric computers provided herein enable digital logic capability in the form of a fiber, as well as a functional fabric shape, such as a garment. An input to the fiber and fabric computers, such as a stimulus from the fiber and fabric computers' external environment, can be accepted by the fiber and fabric computers, often in analog form, and converted to a digital representation that is internally processed by the fiber fabric computer. In-fiber memory communicates with a microcontroller, and there is produced a fiber and fabric computer output that can be a digital or analog signal, or some other output indication. The fiber and fabric computers thereby conduct digital logic operations on inputs; analog input stimuli are converted into a digital data stream that is processed for an output action or indication.

Through in-fiber angular control of fiber computer microchips, the fiber and fabric computers can include microchips with arbitrary contact pad configurations and numbers of contact pads. Individual microchips along a fiber computer length and throughout a fabric computer can be independently accessed, activated, and controlled by the identifier protocol employed herein. With the ability to direct the exchange digital signals within as well as in and out of the fiber computer components, the fiber and fabric computer provides very large scale, logic-based memory functionality. And a multiplicity of functionalities can co-exist along the fiber computer and fabric computer length, overcoming the conventional limit of a single functionality across a fiber length.

Due to the high signal-to-noise ratio, high mechanical flexibility, and high degree of water-resilience of the fiber computer and the fibers of the fabric computer, the fiber and fabric computers can be configured into a garment, such as a shirt, to provide computational functionality for any in a wide range of applications. For example, as described herein a temperature sensor can be placed at a selected location, e.g., under the armpit, to collect body temperature across multiple static and dynamic activities such as sitting, standing, walking and running. Further, the fiber and fabric computers provide advanced logic capabilities with an in-fiber neural network that can predict and recognize, in real-time, human activity. As a result, the fiber and fabric computers can operate autonomously and as an integral, inherent element of a user's environment.

It is recognized that those skilled in the art may make various modifications and additions to the embodiments described above without departing from the spirit and scope of the present contribution to the art. Accordingly, it is to be understood that the protection sought to be afforded hereby should be deemed to extend to the subject matter claims and all equivalents thereof fairly within the scope of the invention.

We claim:
1. A fiber computer comprising:
a fiber body comprising at least one electrically insulating fiber body material and having a longitudinal axis along a fiber body length;
a plurality of electrical conductors disposed within the fiber body along at least a portion of the fiber body length and operative to transmit electrical power, electrical ground, clock signals, and data signals through the fiber body;
at least one fiber computer input unit disposed within the fiber body and arranged to accept stimuli external to the fiber body;
at least one microcontroller microchip disposed within the fiber body and operatively connected to process stimuli accepted by the at least one fiber computer input unit;
at least one memory module microchip disposed within the fiber body and operatively connected to store data and communicate with the at least one microcontroller microchip;
at least one fiber computer output unit disposed within the fiber body and arranged to produce a fiber computer output directed out of the fiber body;
a clock signal generator disposed within the fiber body to synchronize operation of said at least one fiber computer input unit, at least one microcontroller microchip, at least one memory module microchip, and at least one fiber computer output unit; and
wherein each of said at least one computer input unit, at least one microcontroller microchip, at least one memory module microchip, and at least one computer output unit are each disposed in electrical connection with the plurality of electrical conductors for fiber computer operation within the fiber body.

2. The fiber computer of claim 1 wherein the at least one electrically insulating fiber body material comprises a polymeric material.

3. The fiber computer of claim 1 wherein the at least one electrically insulating fiber body material includes at least one material selected from a thermoplastic material, a polyimide material, a thermoset material, a glass material, a polysulfone material, a polycarbonate material, a polymethyl methacrylate material, a polyethylene material, a polyether sulfone material, a polyether ether ketone material, a cyclic olefin copolymer material, and a fluorinated polymer material.

4. The fiber computer of claim 1 wherein the at least one electrically insulating fiber body material is transparent to at least one wavelength of radiation.

5. The fiber computer of claim 1 wherein the at least one electrically insulating fiber body material comprises a first fiber body material and a second fiber body material that is disposed outwardly of the first fiber body material, and wherein at a common fiber draw temperature, the second fiber body material has a viscosity greater than the first fiber body material.

6. The fiber computer of claim 5 wherein at a common fiber draw temperature, the second fiber body material has a viscosity that is greater than about 104 Poise and that is less than about 107 Poise.

7. The fiber computer of claim 1 wherein the electrical conductors each comprise a wire disposed within the fiber body.

8. The fiber computer of claim 1 further comprising a battery disposed within the fiber body and operatively connected to deliver electrical power and ground to said electrical conductors for fiber computer operation.

9. The fiber computer of claim 1 wherein the fiber body has an axial cross-sectional extent and wherein a ratio of fiber body length to axial fiber body cross-sectional extent is greater than about 1000.

10. The fiber computer of claim 1 wherein the fiber body has a cross-sectional geometry that is selected from the group consisting of generally circular, generally elliptical, generally rectangular, and generally triangular.

11. The fiber computer of claim 1 wherein said microcontroller microchips and said memory module microchips are disposed at different angular orientations along said longitudinal fiber body axis for electrical connection within the fiber body to the electrical conductors.

12. The fiber computer of claim 1 wherein at least one fiber computer output unit comprises an audio speaker.

13. The fiber computer of claim 1 wherein at least one fiber computer input unit comprises a microphone.

14. The fiber computer of claim 1 wherein said plurality of electrical conductors comprises at least four electrical conductors.

15. The fiber computer of claim 1 wherein at least one fiber computer input unit comprises a thermistor.

16. The fiber computer of claim 1 wherein said clock signal generator comprises a clock signal generator microchip disposed within the fiber body in electrical connection with electrical conductors within the fiber body for fiber computer operation.

17. The fiber computer of claim 1 wherein the electrical conductors each comprise a material selected from metals, metal alloys, tungsten, copper, iron, aluminum, titanium, chromium, nickel, gold, and silver.

18. The fiber computer of claim 1 further comprising an analog-to-digital converter unit disposed within the fiber body and operatively connected to digitize analog stimuli accepted by at least one of said fiber computer input units.

19. The fiber computer of claim 1 wherein at least one fiber computer output unit comprises fiber materials arranged continuously along an extent of the fiber body length as an electronic device.

20. The fiber computer of claim 1 further comprising a back-support structure within the fiber body along the fiber body length and operatively disposed at a back surface of said microchips for enforcing electrical connection between microchips and the plurality of electrical conductors for fiber computer operation.

21. A fiber computer comprising:
a fiber body comprising at least one electrically insulating fiber body material and having a longitudinal axis along a fiber body length;
a plurality of electrical conductors disposed within the fiber body along at least a portion of the fiber body length and operative to transmit electrical power, electrical ground, clock signals, and data signals through the fiber body;
a fiber battery domain disposed within the fiber body and operatively connected to deliver electrical power and ground to electrical conductors disposed within the fiber body;
at least one fiber computer input unit disposed within the fiber body and arranged to accept stimuli external to the fiber body;
at least one microcontroller microchip disposed within the fiber body and operatively connected to process stimuli accepted by the at least one fiber computer input unit;
at least one memory module microchip disposed within the fiber body and operatively connected to store data and communicate with the at least one microcontroller microchip;
at least one fiber computer output unit disposed within the fiber body and arranged to produce a fiber computer output directed out of the fiber body;
each of said at least one computer input unit, at least one microcontroller microchip, at least one memory module microchip, and at least one computer output unit disposed in electrical connection with the plurality of electrical conductors for fiber computer operation within the fiber body.

22. The fiber computer of claim 21 wherein said fiber battery domain comprises an electrolytic battery.

23. The fiber computer of claim 21 wherein said fiber battery domain extends within said fiber body for said fiber body length.

24. The fiber computer of claim 21 wherein said fiber battery domain comprises a polymeric material.

25. The fiber computer of claim 21 wherein said fiber battery domain comprises a gel.

26. The fiber computer of claim 21 wherein said at least one electrically insulating fiber body material comprises a polymeric material.

27. A fiber computer comprising:
a fiber body comprising at least one electrically insulating fiber body material and having a longitudinal axis along a fiber body length;
a plurality of electrical conductors disposed within the fiber body along at least a portion of the fiber body length and operative to transmit electrical power, electrical ground, clock signals, and data signals through the fiber body;
at least one fiber computer input unit disposed within the fiber body and arranged to accept stimuli external to the fiber body;
at least one microcontroller microchip disposed within the fiber body and operatively connected to process stimuli accepted by the at least one fiber computer input unit;
at least one memory module microchip disposed within the fiber body and operatively connected to store data and communicate with the at least one microcontroller microchip;
at least one fiber computer output unit disposed within the fiber body and arranged to produce a fiber computer output directed out of the fiber body;
wherein each of said at least one computer input unit, at least one microcontroller microchip, and at least one memory module microchip, includes combinatorial logic with a unique digital identifier value for individual access; and
wherein each of said at least one computer input unit, at least one microcontroller microchip, at least one memory module microchip, and at least one computer output unit are disposed in electrical connection with the plurality of electrical conductors for fiber computer operation within the fiber body.

28. A fiber neural network comprising:
a fiber body comprising at least one electrically insulating fiber body material and having a longitudinal axis along a fiber body length;
a plurality of electrical conductors disposed within the fiber body along at least a portion of the fiber body length and operative to transmit electrical power, electrical ground, clock signals, and data signals through the fiber body;

at least one neural network input unit disposed within the fiber body and arranged to accept stimuli external to the fiber body;

at least one microcontroller microchip disposed within the fiber body and operatively connected to process stimuli accepted by the at least one fiber computer input unit;

at least one memory module microchip disposed within the fiber body and containing neural network data;

at least one neural network output unit disposed within the fiber body and arranged to produce a fiber computer output directed out of the fiber body;

wherein each of said at least one neural network input unit, at least one microcontroller microchip, at least one memory module microchip, and at least one neural network output unit are disposed in electrical connection with the plurality of electrical conductors for neural network operation within the fiber body.

29. The fiber neural network of claim 28 wherein said at least one electrically insulating fiber body material comprises a polymeric material.

30. The fiber neural network of claim 28 further comprising a battery disposed within the fiber body and operatively connected to deliver electrical power and ground to said electrical conductors for fiber neural network operation.

31. The fiber neural network of claim 28 wherein the fiber body has an axial cross-sectional extent and wherein a ratio of fiber body length to axial fiber body cross-sectional extent is greater than about 1000.

32. The fiber neural network of claim 28 wherein said at least one memory module microchip contains stored network weights and biases.

33. The fiber neural network of claim 28 wherein said at least one neural network input unit comprises a sensor disposed in the fiber body.

34. A fabric computer comprising:

a plurality of fibers, each fiber having a fiber body comprising at least one electrically insulating polymeric fiber body material and having a longitudinal axis along a fiber body length;

at least one fabric computer input unit disposed within at least one fiber body and arranged to accept stimuli external to said fiber body;

at least one microcontroller microchip disposed within at least one fiber body and operatively connected to process stimuli accepted by the at least one fabric computer input unit;

at least one memory module microchip disposed within at least one fiber body and operatively connected to store data and communicate with the at least one microcontroller microchip;

at least one fabric computer output unit disposed within at least one fiber body and arranged to produce a fabric computer output directed out of the fiber body;

a clock signal generator disposed within at least one fiber body to synchronize operation of said at least one fabric computer input unit, at least one microcontroller microchip, at least one memory module microchip, and at least one fabric computer output unit; and wherein each of said at least one computer input unit, at least one microcontroller microchip, at least one memory module microchip, and at least one computer output unit are disposed in electrical connection for fabric computer operation.

35. The fabric computer of claim 34 further comprising a plurality of electrical conductors disposed within each said fiber body along at least a portion of the fiber body length and operative to transmit electrical power, electrical ground, clock signals, and data signals through each said fiber body.

36. The fabric computer of claim 35 further comprising electrical connections operatively disposed to connect said electrical conductor plurality between said fibers in said plurality of fibers.

37. The fabric computer of claim 34 wherein each of said at least one computer input unit, at least one microcontroller microchip, at least one memory module microchip, and at least one computer output unit includes combinatorial logic with a unique digital identifier value for individual access.

38. The fabric computer of claim 34 further comprising a plurality of textile fibers operatively interconnected with said plurality of fibers to accept human stimuli by said at least one fabric computer input unit.

* * * * *